United States Patent [19]

Iwasaki

[11] Patent Number: 5,392,091
[45] Date of Patent: Feb. 21, 1995

[54] EXPOSURE CALCULATING APPARATUS

[75] Inventor: Hiroyuki Iwasaki, Kawasaki, Japan

[73] Assignee: Nikon Corporation, Tokyo, Japan

[21] Appl. No.: 933,819

[22] Filed: Aug. 24, 1992

[30] Foreign Application Priority Data

| Aug. 27, 1991 | [JP] | Japan | 3-215180 |
| Aug. 27, 1991 | [JP] | Japan | 3-215181 |
| Aug. 27, 1991 | [JP] | Japan | 3-215182 |

[51] Int. Cl.$^6$ .............................. G03B 7/28
[52] U.S. Cl. ................................... 354/432
[58] Field of Search ............ 354/432; 250/208.1, 250/208.2, 208.3, 208.5; 356/222; 358/228; 348/365

[56] References Cited

U.S. PATENT DOCUMENTS

| 4,445,778 | 5/1984 | Nakauchi | 354/432 X |
| 4,912,495 | 3/1990 | Ishikawa et al. | 354/432 X |
| 4,978,990 | 12/1990 | Yamasaki et al. | 354/432 |
| 5,184,172 | 2/1993 | Miyazaki | 354/432 |
| 5,253,008 | 10/1993 | Konishi et al. | 354/432 X |
| 5,255,044 | 10/1993 | Ishiguro | 354/432 X |
| 5,272,538 | 12/1993 | Homma et al. | 358/228 |

FOREIGN PATENT DOCUMENTS

63-94232 4/1988 Japan.
2-32312 2/1990 Japan.

OTHER PUBLICATIONS

Institute of Television Engineers of Japan, vol. 40, No. 2, 1986, pp. 121–128.

*Primary Examiner*—W. B. Perkey
*Attorney, Agent, or Firm*—Shapiro and Shapiro

[57] ABSTRACT

An exposure calculating apparatus includes a light-metering device, consisting of a light-metering elements corresponding to elementary areas obtained by dividing a field of a focusing optical system, for measuring a light intensity distribution in the field, a position of object detecting means for detecting a position of object in the field, a classifying means for changing a divisional pattern of light-metering areas in correspondence with the position of object, and classifying the light-metering elements of the light-metering device into a plurality of groups according to the divisional pattern, and a calculating device for calculating an exposure value by weighting the outputs from the plurality of light-metering elements in correspondence with the groups to which the light-metering elements belong, and supplying the exposure value to exposure control.

8 Claims, 35 Drawing Sheets

EXPOSURE CALCULATING APPARATUS

BACKGROUND OF THE INVENTION

1. Field of the Invention

The present invention relates to an exposure calculating apparatus for a camera.

In order to expose a photographing medium such as a film under a proper exposure condition in a camera, a diaphragm equipped in a taking lens and an exposure time need be controlled in correspondence with the light amount of an object and therearound, and this control processing is performed by an exposure calculating apparatus equipped in the camera.

The present invention also relates to a camera having a visual axis detecting device and, more particularly, to a camera having a visual axis detecting device for performing focusing control and exposure control using a position of visual axis obtained from the direction of an eyeball of a photographer as a position of object in a field.

The present invention further relates to an object perceiving apparatus for detecting a position occupied by an object seen by a photographer in a field caught by a taking lens equipped in a camera.

2. Related Background Art

As a conventional exposure control method, a method of determining an exposure value according to the light amount from the central portion of a field under an assumption that an object is present at the central portion of the field of a taking lens is known.

In this case, an exposure calculating apparatus is constituted using, as a photometric or light-metering element for measuring the light amount of the field, a photometric element having characteristics in which the sensitivity of a portion corresponding to the central portion of the field is maximal, and the sensitivity is monotonously decreased toward the surrounding portion of the field. An exposure value is determined according to an output from the photometric element.

Such an arrangement is called a center-weighted photometric system. When this system is adopted, the arrangement of the exposure calculating apparatus can be simplified.

In the case of the above-mentioned center-weighted photometric system, however, when the brightness value of the central portion is considerably different from that of the surrounding portion like in a photographing operation in a strong back-light state, a proper exposure value cannot often be obtained.

In order to solve this problem, a method of dividing the field into a plurality of photometric areas, as shown in FIG. 1, and determining an exposure value in consideration of balance of the light amounts of the respective photometric areas is also known. This method is called a divisional photometric method.

In this case, the exposure calculating apparatus is constituted by arranging photometric elements corresponding to the photometric areas, and the brightness values of the photometric areas are obtained based on the photometric results obtained by independently measuring the photometric areas. The exposure value is determined based on these brightness values.

Since the divisional photometric method is executed under an assumption that the object is present at the central portion of the field, when the exposure value is to be calculated, the photometric result from the central circular photometric area of the five photometric areas shown in FIG. 1 is weighted with a large value.

Since the above-mentioned conventional methods are executed under an assumption that the object is present at the central portion, when a photographing operation is performed while catching the object at the surrounding portion of the field, a proper exposure value cannot often be obtained depending on the above-mentioned exposure calculating apparatuses.

As a method of obtaining a proper exposure value in such a case, a technique for selecting a photometric pattern corresponding to a position of object from some photometric patterns, and obtaining an exposure value conforming to the object is disclosed in Japanese Laid-Open Patent Application No. 2-32312 entitled "Visual Axis Input Camera".

FIG. 2 is a schematic diagram showing the arrangement of an exposure calculating apparatus of the above-mentioned visual axis input camera.

In FIG. 2, the exposure calculating apparatus comprises a focusing lens 1, photometric elements 2 divided as a plurality of areas, and a microprocessor 3 for performing exposure calculating processing on the basis of photometric results from the photometric elements 2. An image formed on a focusing screen 5 provided on a prospective focal plane of a taking lens 4 is formed on the photometric elements 2 through a pentagonal prism 6 by the above-mentioned focusing lens 1.

The photometric elements 2 are divided, as shown in FIG. 3, and photometric operations can be independently performed in units of areas. The microprocessor 3 changes weights to be given to the photometric results of the above-mentioned areas to obtain photometric results corresponding to a case wherein the position of the maximal value of the photometric sensitivity distribution of the photometric elements 2 is varied, thereby calculating an exposure value.

A visual axis detecting circuit 7 observes the eyeball of a photographer through an eyepiece lens 8 to discriminate the direction of visual axis of the photographer, thereby obtaining a position of visual axis where the visual axis of the photographer crosses the field. This position of visual axis is input to the microprocessor 3 as a position of object.

Therefore, when the microprocessor 3 changes the weights to be given to the photometric results of the areas according to the input position of object, the photometric result equivalent to that obtained when the photometric operation of the field is performed using a photometric element which has the photometric sensitivity distribution having the maximal sensitivity at the position of object, can be obtained.

In this manner, exposure control can be performed to have the position of object as the central position of the center-weighted photometric method, and exposure control conforming to the object in correspondence with the brightness of the object present at the surrounding portion of the field can be performed.

This technique, however, can only vary the central position of the photometric sensitivity distribution in the center-weighted photometric system. Therefore, since the balance of the entire field is not taken into consideration, a portion surrounding the object may be overexposed in a back-light photographing operation, and a portion darker than the object may not be photographed at all.

In a conventional camera, focusing control and exposure control are performed on the basis of information of the central portion of the field under an assumption that the object is present at the central portion of the field of a taking lens equipped in the camera.

A photographing operation is often performed to have a composition in which the object is offset from the center. A demand has arisen for focusing control and exposure control on the basis of information of an object portion located at a position offset from the central portion in correspondence with the above-mentioned case.

In order to meet this demand, the following technique is proposed. That is, the direction of visual axis of a photographer is obtained based on the direction of the eyeball of the photographer by utilizing the fact that the photographer gazes at the object, and focusing control and exposure control are performed using a position of visual axis where the visual axis crosses the field as an object position.

As a technique for detecting the position of visual axis of a photographer as an object position, and performing focusing control and exposure control based on the position of visual axis, a technique disclosed in Japanese Laid-Open Patent Application No. 63-94232 entitled "Camera Controlling Apparatus" is known.

FIG. 4 shows the arrangement of the above-mentioned camera controlling apparatus.

In FIG. 4, a photographing circuit 9 comprises a two-dimensional CCD element (to be simply referred to as a CCD hereinafter) 10, and an image is formed on the CCD 10 by a photographing optical system consisting of a taking lens 4 and a diaphragm 11.

In FIG. 4, a movement of eyeball detecting device 12 discriminates the direction of the eyeball from the position of a pupil, and sends the discrimination result to a gate controlling circuit 13 (see Journal of the Institute of Television Engineers of Japan, Vol. 40, No. 2, 1986, pp. 121–128).

The gate controlling circuit 13 generates a gate controlling signal for controlling to open/close a gate 15 on the basis of the discrimination result and horizontal and vertical sync signals from a clock circuit 14, and instructs to open the gate 15 according to an output from the CCD 10 corresponding to the gazing portion of the photographer indicated by the above-mentioned discrimination result. Then, the gazing portion of the photographer is extracted from an output from the photographing circuit 9, and is supplied to an automatic focusing (AF) controlling circuit 16, and an automatic exposure (AE) controlling circuit 17. Thus, the extracted information is subjected to control processing of a lens driving device 18 and a diaphragm driving device 19.

In this manner, there is provided the camera controlling apparatus, which can perform focusing control and exposure control on the basis of information of the position of visual axis of a photographer who looks at an object through the finder, and can perform camera control on the basis of information of the object portion regardless of the position of the object in the field.

In the conventional method, the position of visual axis of the photographer obtained from the direction of the eyeball is used as the object position. However, the photographer does not always gaze at an object, but gazes at an area other than the object to check the balance of the composition or gazes at information associated with exposure control displayed outside the frame. For this reason, when the position of visual axis is used as the object position, an object intended by the photographer cannot often be correctly perceived.

In particular, when the photographer blinks or gazes at information displayed outside the frame, the movement of eyeball detecting device 12 cannot discriminate the object position, and focusing control and exposure control may be disabled.

Since the eyeball always moves, and the position of visual axis changes from time to time according to this movement, the exposure value and the focus position vary according to the position of visual axis which changes from time to time, resulting in unstable exposure control and focusing control. In particular, the eyeball often moves abruptly. In this case, the above-mentioned instability of the control becomes conspicuous.

SUMMARY OF THE INVENTION

It is an object of the present invention to provide an exposure calculating apparatus, which can obtain a proper exposure value while weighting on an object position, and considering the balance of the entire field.

It is another object of the present invention to provide a camera having a visual axis detecting device, which can discriminate an object position regardless of whether or not a position of visual axis can be detected.

It is still another object of the present invention to provide an object perceiving apparatus for correctly perceiving an object gazed by a photographer, and obtaining a stable position of object. It is still another object of the present invention to provide a camera for photographing a proper image of an object using the obtained position of object.

FIG. 5 is a diagram showing an arrangement of an exposure calculating apparatus according to one aspect of the present invention.

The exposure calculating apparatus according to one aspect of the present invention comprises a photometric or light-metering device 22, formed by a plurality of light-metering elements 21 corresponding to elementary areas obtained by dividing a field of a focusing optical system 20, for measuring light intensity distributions in the field, a classifying device 23 for receiving a position of object in the field, and classifying the light-metering elements 21 of the light-metering devices 22 into a plurality of groups according to a divisional pattern which changes in correspondence with the position of object, and a first calculating device 24 for multiplying the outputs from the plurality of light-metering elements 21 with weights corresponding to the groups to which these elements belong so as to obtain an exposure value, and supplying the exposure value to exposure control.

In the exposure calculating apparatus according to the present invention, the classifying device 23 classifies the plurality of light-metering elements 21 into the plurality of groups, thereby dividing the light-metering device 22 into the plurality of light-metering areas corresponding to these plurality of groups. Since the boundary of these light-metering areas changes according to the position of object, a flexible divisional light-metering system corresponding to various positions of object can be realized. Thus, the first calculating device 24 can obtain an exposure value in consideration of the position of object and the entire balance.

FIG. 6 is a diagram showing the arrangement of an exposure calculating apparatus according to another aspect of the present invention.

The exposure calculating apparatus comprises a plurality of area light-metering devices 25, respectively corresponding to a plurality of light-metering areas obtained by dividing a field of a focusing optical system using predetermined patterns, for measuring light amounts in the corresponding light-metering areas, an object light-metering device 26 for measuring a light amount in an elementary area including a position of object according to the input position of object in the field, and a second calculating device 27 for calculating an exposure value on the basis of the outputs from the plurality of area light-metering devices 25 and the object light-metering device 26, and supplying the exposure value to exposure control of the focusing optical system 20.

In this exposure controlling apparatus, since the plurality of area light-metering devices 25 and the object light-metering device 26 independently perform light-metering operations of the corresponding areas of the field, the second calculating device 27 can calculate an exposure value conforming to the object by utilizing the feature of the divisional light-metering method. Therefore, the exposure value can be obtained while weighting on the entire balance, and taking information of the position of object into consideration.

FIG. 7 is a diagram showing the arrangement according to still another aspect of the present invention.

According to this aspect, a camera having a visual axis detecting device 28 for detecting a position of visual axis of a photographer in a field caught by a focusing optical system 20 as a position of object, comprises a light-metering device 22 for measuring a light intensity distribution in the field, a tracking device 29 for obtaining the position of object in the field on the basis of the light intensity distribution obtained by the light-metering device 22 and the position of visual axis obtained so far, and tracking the position of object, a deciding device 30 for deciding whether or not the position of visual axis can be detected by the visual axis detecting device 28, and a selecting device 31 for selecting one of the positions of object obtained by the visual axis detecting device 28 and the tracking device 29 according to the decision result from the deciding device 30.

In the camera of this aspect, since the position of object can be obtained by the light-metering device 22 and the tracking device 29 independently of the visual axis detecting device 28, when the visual axis detection of the visual axis detecting device 28 is disabled, the selecting device 31 selects the position of object obtained by the tracking device 29 according to the decision result from the deciding device 30, thus always obtaining the latest position of object.

FIG. 8 is a diagram showing the arrangement according to still another aspect of the present invention.

An apparatus according to this aspect comprises an object perceiving device 32 for obtaining a gazing position of a photographer in a field of a camera as a position of object according to the movement of an eyeball of the photographer, a tracking device 29 for discriminating a position corresponding to the object on the basis of information associated with a light intensity distribution in the field, and tracking the discriminated position, a deciding device 30 for comparing the position obtained by the object perceiving device 32 with the position obtained by the tracking device 30, and deciding whether or not the photographer changes an object, a selecting device 31 for selecting one of the positions obtained by the object perceiving device 32 and the tracking device 29 as the position of object according to the decision result from the deciding device 30, and a controlling device 33 for controlling tracking processing by supplying the position obtained by the object perceiving device 32 as information associated with a new object to the tracking device 29 according to the decision result indicating that the object is changed.

In the apparatus according to this aspect, since the object perceiving device 32 obtains the gazing position of the photographer as the position of object, when the photographer gazes at another object, the object perceiving device 32 can obtain a position of new object. Therefore, when the selecting device 31 selects the position obtained by the object perceiving device 32 as the position of object according to the decision result from the deciding device 30, an object gazed by the photographer can be correctly perceived. At this time, since the controlling device 33 supplies information associated with the new object to the tracking device 29, the tracking device 29 can execute tracking processing of the new object, and the position of the latest object can always be obtained regardless of whether or not the photographer gazes at the object. Therefore, when the selecting device 31 selects the position obtained by the tracking device 29 according to the decision result from the deciding device 30, the position of object can be stably obtained.

DETAILED DESCRIPTION OF THE PREFERRED EMBODIMENTS

The preferred embodiments of the present invention will be described in detail hereinafter with reference to the accompanying drawings.

Figure 9:
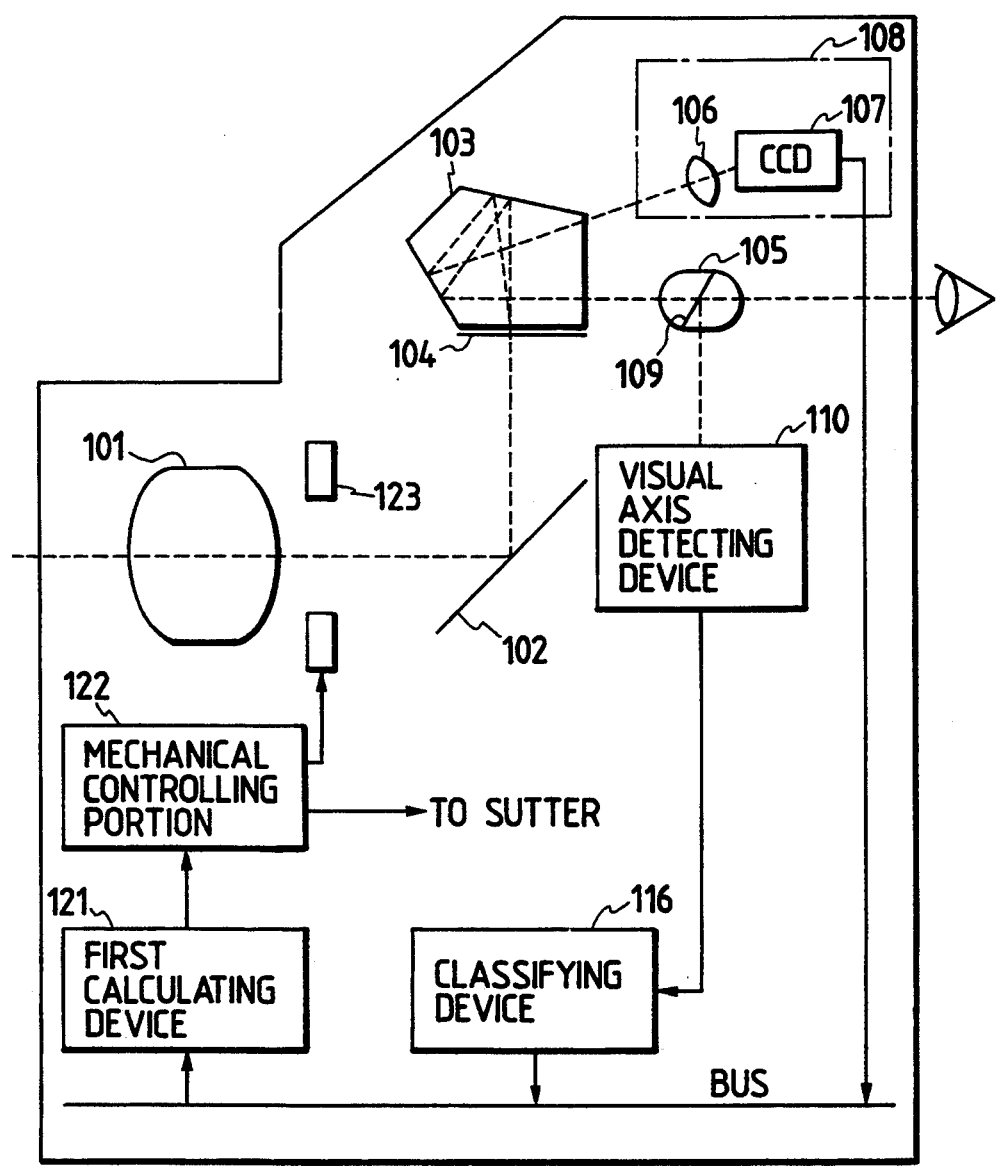
FIG. 9 is a diagram showing an arrangement of an embodiment of a single-lens reflex camera adopting an exposure calculating apparatus of the present invention.

FIG. 9 shows the arrangement of an embodiment of a single-lens reflex camera adopting an exposure calculating apparatus of the present invention.

In FIG. 9, a taking lens 101 corresponds to a focusing optical system 20. In a state other than an exposure state, some of light components incident on the camera through the taking lens 101 are reflected upward by a main mirror 102, and form an image on a focusing screen 104 arranged on the plane of incidence of a pentagonal prism (prism) 103. A photographer can observe the image on the focusing screen 104 through an eyepiece lens 105.

A lens 106 and a two-dimensional CCD image sensor (to be simply referred to as a CCD hereinafter) 107 form a light-metering device 108. The light-metering device 108 measures the intensity distribution of the image on the above-mentioned focusing screen 104.

The above-mentioned lens 106 is arranged on another optical axis slightly shifted from the optical axis of the eyepiece lens 105, and forms the image formed on the focusing screen 104 on the CCD 107 arranged at a position crossing this optical axis. The CCD 107 is constituted by n×m light-metering elements 21. These light-metering elements 21 measure the light amounts on corresponding small areas of the image on the above-mentioned focusing screen 104.

Since the image on the focusing screen 104 corresponds to the field of the taking lens 101, the light amounts of n×m elementary areas obtained by dividing the field of the taking lens 101 are measured, and the light intensity distribution of the field is measured as a whole.

A beam splitter (BS) 109 is arranged in the above-mentioned eyepiece lens 105. A visual axis 1 detecting device 110 observes the eyeball of a photographer through the eyepiece lens 105 to detect the position of visual axis.

Figure 10:
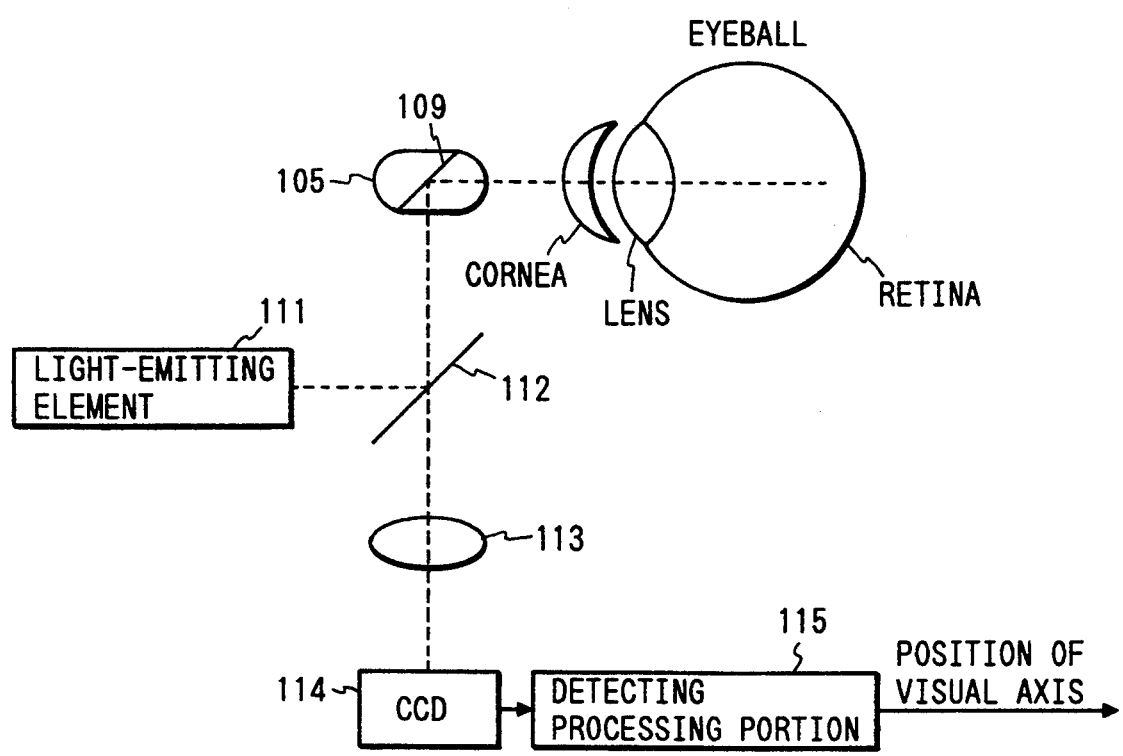
FIG. 10 is a diagram showing the details of the arrangement of a visual axis detecting device.

FIG. 10 shows the details of the arrangement of the visual axis detecting device 110.

In FIG. 10, light emitted from a light-emitting element 111 is incident onto the eyeball of a photographer who looks at an object through the finder, a half mirror 112, and the beam splitter 109 of the eyepiece lens 105. A lens 113 focuses light reflected by the retina of the eyeball onto a two-dimensional CCD image sensor (to be simply referred to as a CCD hereinafter) 114. The CCD 114 is constituted by n×m elements, and measures the intensity distribution of the image formed by the lens 113. A detecting processing portion 115 detects the position of visual axis of the photographer on an basis of an output from the CCD 114.

Light reflected by the retina has the highest intensity in an eye-gazing direction. More specifically, the visual axis direction of the photographer can be discriminated according to the position of the element corresponding to the maximal value of the intensity distribution obtained by the above-mentioned CCD 114.

In this case, the detecting processing portion 115 can sequentially compare the outputs from the CCD 114 to detect the maximal value, and can supply the coordinates (Xa,Ya) of the corresponding element to a classifying device 116 as the position of object.

The visual axis detecting device 110 can input an accurate position of object to the classifying device 116 since it can accurately evaluate the position of object.

Figure 11:
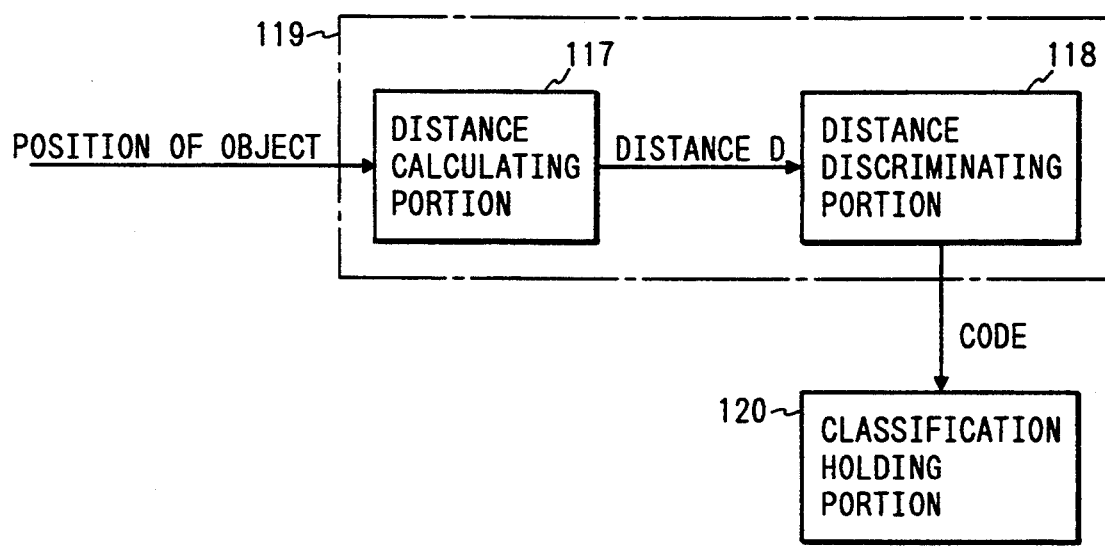
FIG. 11 is a diagram showing the details of the arrangement of a classifying device.
Figure 12:
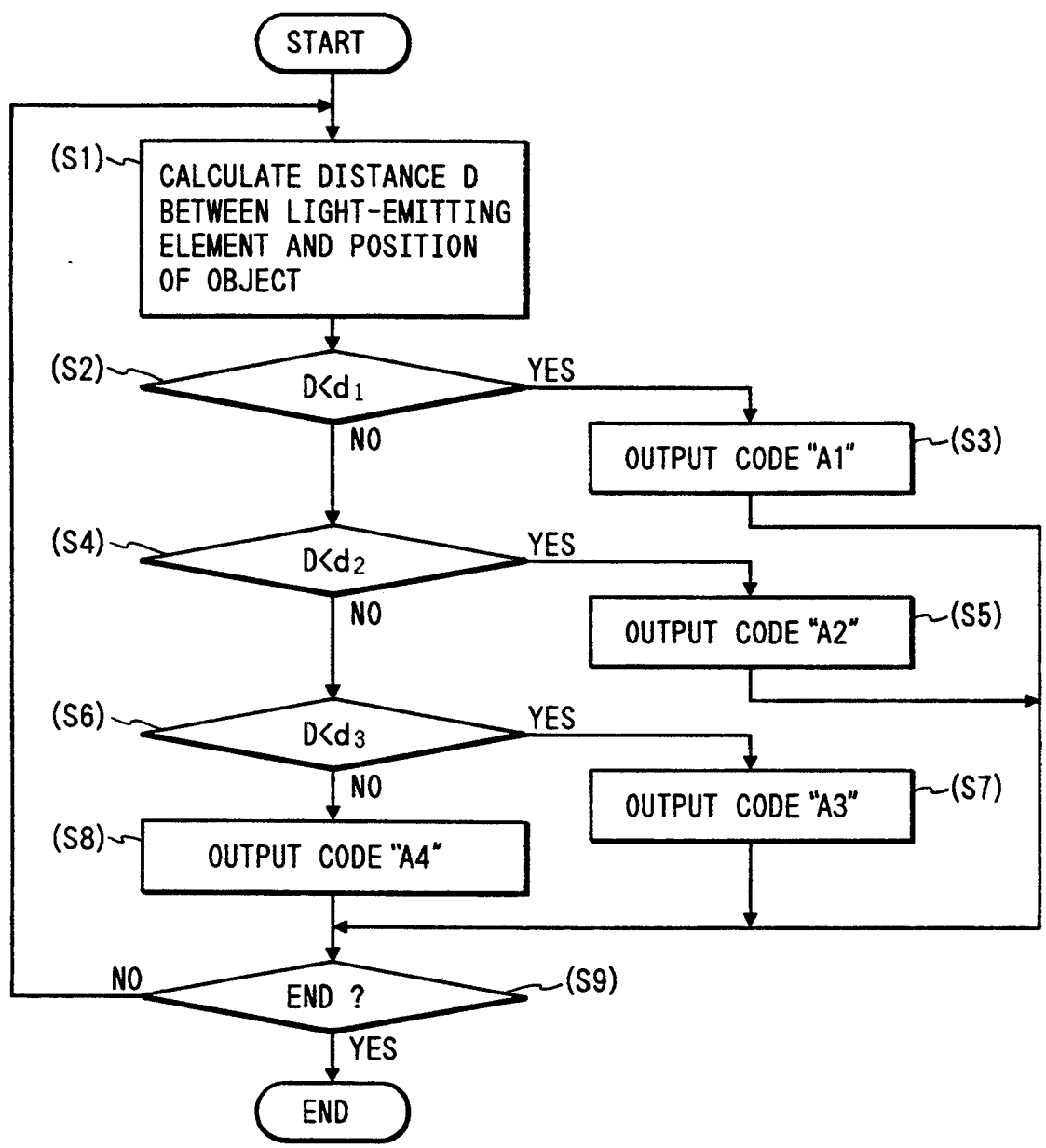
FIG. 12 is a flow chart showing classifying processing.

FIG. 11 shows the details of the arrangement of the classifying device 116. FIG. 12 is a flow chart showing classifying processing executed by the classifying device 116.

In FIG. 11, the classifying device 116 is constituted by a first pattern generating device 119 including a distance calculating portion 117 and a distance discriminating portion 118, and a classification holding portion 120. The discrimination result from the distance discriminating portion 118 is held in the classification holding portion 120 in correspondence with the coordinates of the light-metering elements 21 of the above-mentioned CCD 107.

The distance calculating portion 117 calculates a distance D between each light-metering element 21 of the CCD 107 and the light-metering element 21 corresponding to the position of object (step S1). Since the above-mentioned CCDs 114 and 107 correspond to the field of the taking lens 101, the elements indicated by the same coordinate position on the CCDs 114 and 107 correspond to the same elementary area of the field. Therefore, the distance calculating portion 117 calculates, using the coordinates (X,Y) of each light-metering element 21 of the CCD 107 and the position (Xa,Ya) of object, the distance D given by:

$$D=\{(Xa-X)^2+(Ya-y)^2\}^{\frac{1}{2}}$$

The distance calculating portion 117 sends the calculated distance to the distance discriminating portion 118.

The distance discriminating portion 118 compares the distance D obtained in step S1 with a threshold value $d_1$ (step S2). If it is determined in step S2 that the distance D is smaller than the threshold value $d_1$, the distance discriminating portion 118 determines YES in step S2, and sends a code "A1" as a discrimination result corresponding to the light-metering element of the CCD 107 indicated by the coordinates (X,Y) to the classification holding portion 120 (step S3). The classification holding portion 120 holds the above-mentioned code "A1" as the classification result of the corresponding light-metering element 21 of the CCD 107 in correspondence with the coordinates (X,Y).

If NO is determined in step S2, the distance discriminating portion 118 compares the distance D with another threshold value $d_2$ (threshold value $d_2$>threshold value $d_1$) (step S4). If it is determined that the distance D is smaller than the threshold value $d_2$ (YES in step S4), the distance discriminating portion 118 sends a code "A2" as a discrimination result to the classification holding portion 120 (step S5). The classification holding portion 120 holds the above-mentioned code "A2" as the classification result of the corresponding light-metering element 21 of the CCD 107 in correspondence with the coordinates (X,Y).

If NO is determined in step S4, the distance discriminating portion 118 similarly compares the distance D with still another threshold value $d_3$ (threshold value $d_3$>threshold value $d_2$) (step S6). If it is determined according to the comparison result that the distance D is smaller than the threshold value $d_3$ (YES in step S6), the distance discriminating portion 118 sends a code "A3" as a discrimination result to the classification holding portion 120; if NO is determined in step S6, it sends a code "A4" as a discrimination result to the portion 120 (step S7 or S8). The classification holding portion 120 holds the above-mentioned code "A3" (or code "A4") as the classification result of the corresponding light-metering element 21 of the CCD 107 in correspondence with the coordinates (X,Y).

It is then checked if the above-mentioned processing operations in steps S1 to S8 are performed for all the light-metering elements 21 of the CCD 107 (step S9). If NO in step S9, the processing operations in steps S1 to S8 are repeated until YES is determined in step S9.

In this manner, the magnitude of the distance D is discriminated by comparing distance D between each light-metering element 21 and the light-metering element 21 corresponding to the position of object with the three threshold values $d_1$, $d_2$, and $d_3$, and the light-metering elements 21 can be classified into four groups corresponding to the codes "A1" to "A4" according to the discrimination results.

Figure 13:
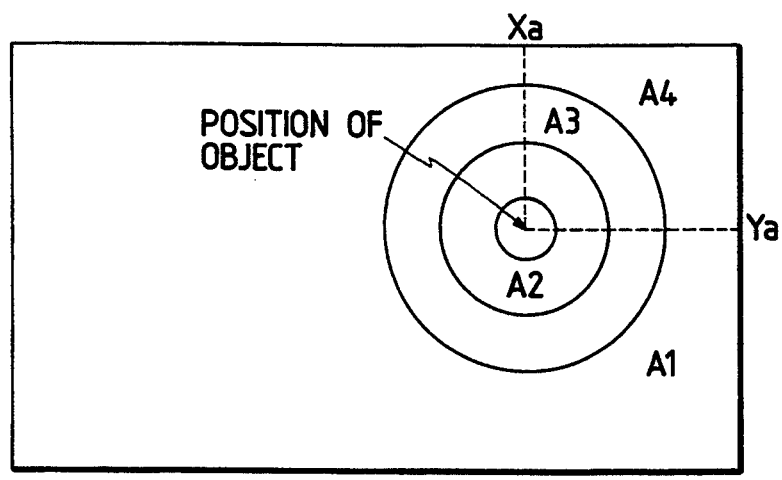
FIG. 13 is a view showing an example of divided light-metering areas.

The light-metering elements 21 of the CCD 107 can be classified into groups using a concentrical divisional pattern having the position of object as the center, as shown in FIG. 13. Reference symbols added to areas of the concentrical divisional pattern denote the codes (codes "A1" to "A4") representing the classification results, and these areas will be referred to as light-metering areas A1 to A4 hereinafter. The above-mentioned threshold values $d_1$, $d_2$, and $d_3$ correspond to the radii of the light-metering areas A1, A2, and A3, respectively.

For example, the distance discriminating portion 118 may be constituted by three comparing devices, and comparison results between the distance D and the threshold values $d_1$, $d_2$, and $d_3$ by the corresponding comparing devices may be supplied to the classification holding portion 120 as the discrimination results.

The light-metering device 108 is constituted by the CCD 107 consisting of n×m light-metering elements 21, and these light-metering elements 21 are classified into a plurality of groups, as described above, so as to form light-metering areas corresponding to the groups, thus allowing a divisional light-metering operation by flexibly changing a divisional pattern in correspondence with the position of object.

A method of obtaining an exposure value using the above-mentioned classification result will be described below.

In FIG. 9, a first calculating device 121 is connected to the above-mentioned light-metering device 108 and the classifying device 116 through, e.g., a bus, and can access data to the CCD 107 and the classification holding portion 120. An exposure value obtained by the first calculating device 121 is sent to a mechanical controlling portion 122. The mechanical controlling portion 122 controls an operation of a diaphragm 123 and a shutter (not shown) according to the exposure value, thereby executing exposure control.

Figure 14:
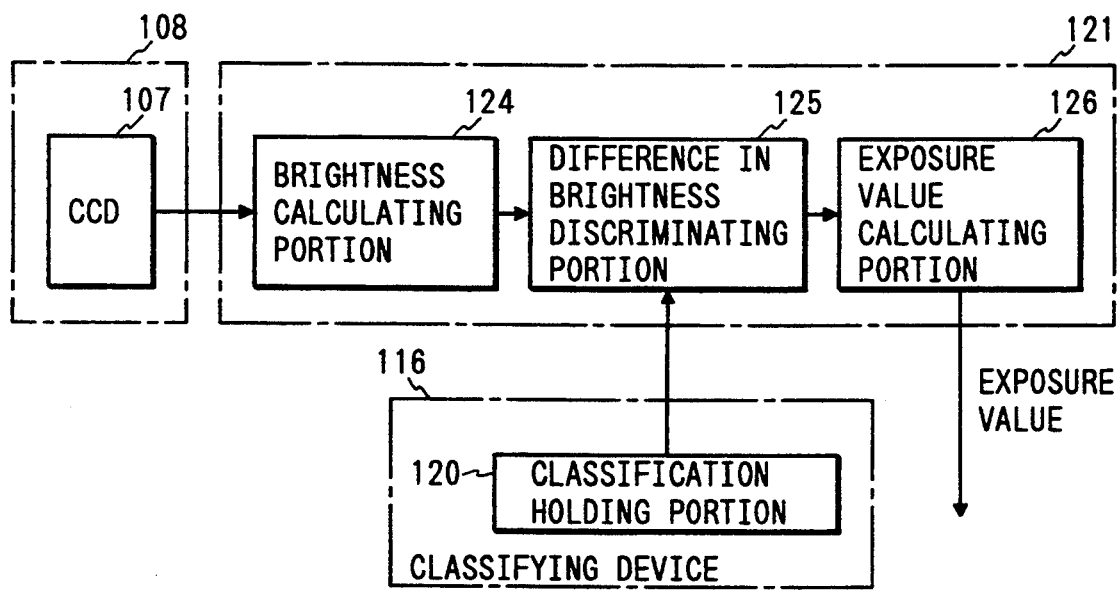
FIG. 14 is a diagram showing the details of the arrangement of a first calculating device.
Figure 15:
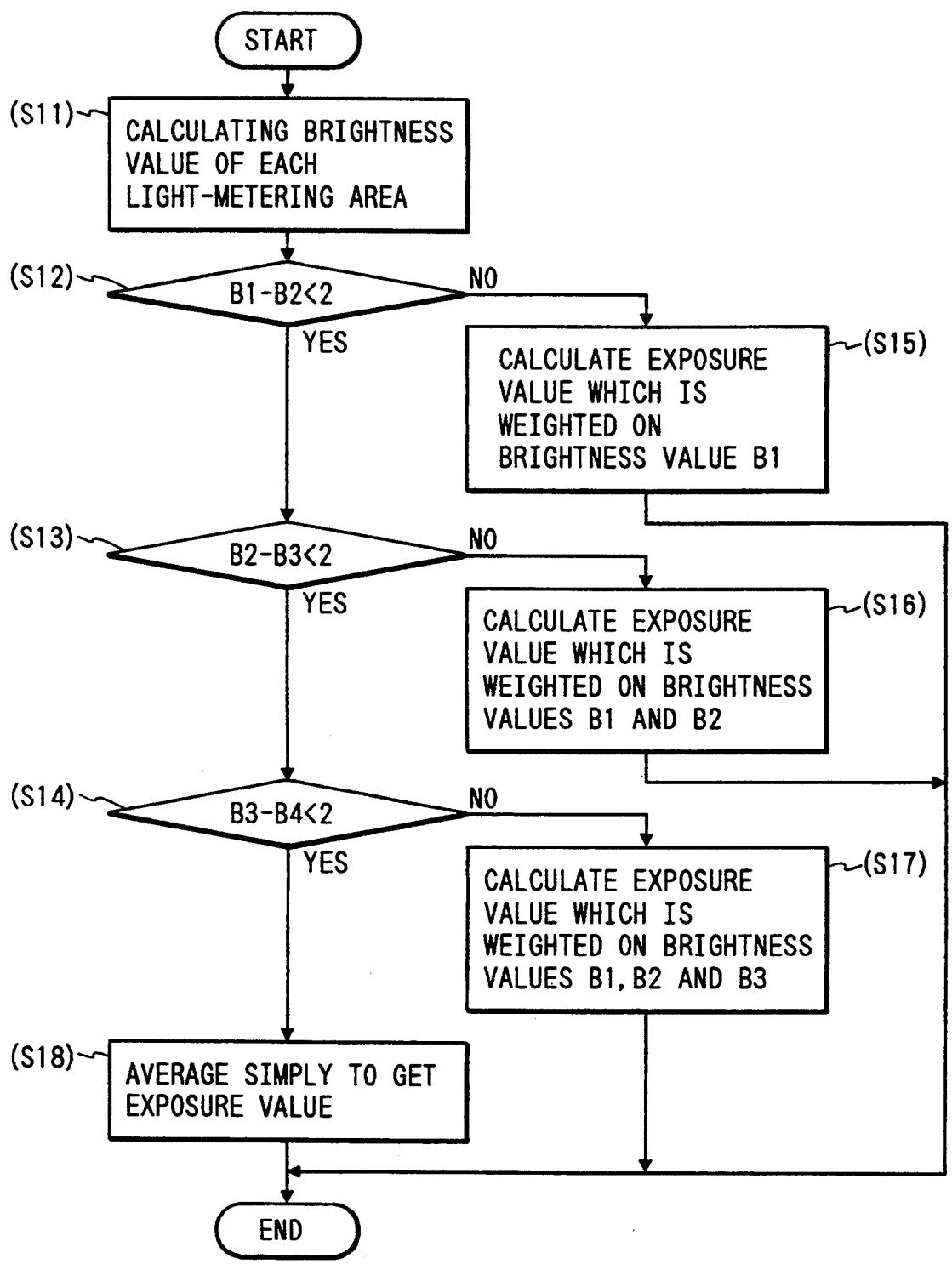
FIG. 15 is a flow chart showing exposure calculating processing.

FIG. 14 shows the details of the arrangement of the first calculating device 121. FIG. 15 is a flow chart showing exposure calculating processing.

In FIG. 14, the first calculating device 121 is constituted by a brightness calculating portion 124, a difference in brightness discriminating portion 125, and an exposure value calculating portion 126.

The brightness calculation portion 124 calculates brightness values B1 to B4 of the above-mentioned light-metering areas A1 to A4 (step S11). The brightness calculating portion 124 can calculate an average value of the outputs from the light-metering elements 21 of the CCD 107, which elements belong to each of the light-metering areas A1 to A4, and can calculate a corresponding one of the brightness values B1 to B4 based on the average value.

When the brightness calculating portion 124 directly averages photocurrent values from the light-metering elements 21, and compresses the average value using a logarithm having a numerical value "2" as a base so as to obtain a brightness value, the brightness value equivalent to that obtained when each light-metering area is constituted by one light-metering element can be obtained.

On the other hand, the photocurrent values of the light-metering elements 21 belonging to each light-metering area may be logarithmically compressed to obtain brightness values, and the brightness values may be averaged to obtain a brightness value of the corresponding light-metering area. In this case, since the photocurrent values are averaged after they are logarithmically compressed, the averaged brightness value which is weighted on a low-brightness portion in the light-metering area can be obtained as compared to a case wherein photocurrent values are directly averaged. Therefore, these methods can be selectively used according to applications.

The difference in brightness discriminating portion 125 discriminates whether or not a difference between the brightness values of adjacent light-metering areas is smaller than a predetermined threshold value (e.g., a brightness value 2 EV) (steps S12, S13, and S14), thereby discriminating a boundary between light-metering areas, which have a large brightness difference therebetween.

The exposure value calculating portion 126 determines according to this discrimination result that there is a boundary between the object and a surrounding portion near the boundary of the two light-metering areas from which a large brightness difference is detected, and gives corresponding weights to the light-metering areas to obtain a weighted average of the brightness values, thereby calculating an exposure value (steps S15, S16, S17, and S18).

Figure 16A:
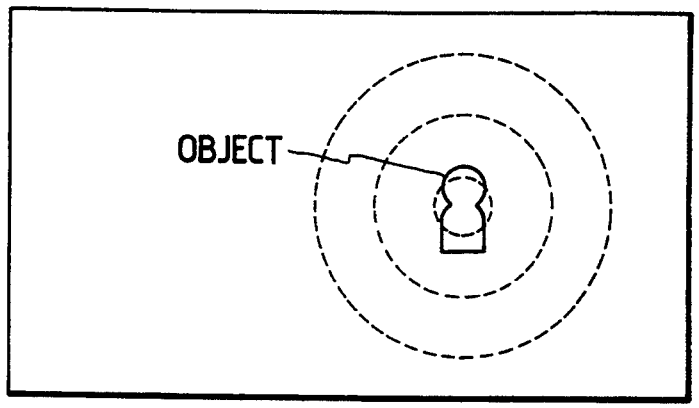
FIGS. 16A to 16C are views showing the relationship between an object and light-metering areas.

For example, when an object almost falls in the area of the field corresponding to the light-metering area A1, as shown in FIG. 16A, the difference in brightness between the light-metering areas A1 and A2 becomes larger than the brightness value 2 EV, and NO is determined in step S12. In this case, in step S15, the exposure value calculating portion 126 performs weighted average processing by multiplying the brightness value B1 of the light-metering area A1 with a large weight, thus obtaining an exposure value Ba given by:

$$Ba = (6 \times B1 + B2 + B3 + B4)/9$$

Figure 16B:
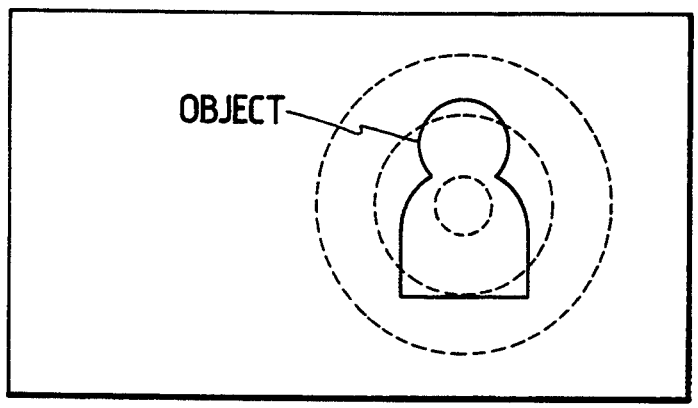

When the object extends to the area of the field corresponding to the light-metering area A2, as shown in FIG. 16B, YES is determined in step S12, and NO is then determined in step S13. In this case, in step S16, the exposure value calculating portion 126 performs weighted average processing by multiplying the brightness values B1 and B2 of the light-metering areas A1 and A2 with the same weight, thus obtaining an exposure value Ba given by:

$$Ba = (3 \times B1 + 3 \times B2 + B3 + B4)/8$$

Figure 16C:
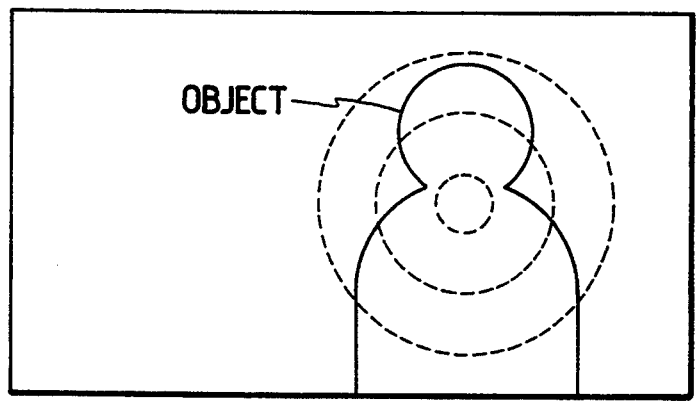

When the object extends to the area of the field corresponding to the light-metering area A3, as shown in FIG. 16C, YES is determined in step S13, and NO is then determined in step S14. In this case, in step S17, the exposure value calculating portion 126 performs weighted average processing by multiplying the brightness values B1, B2, and B3 of the light-metering areas A1, A2, and A3 with the same weight, thus obtaining an exposure value Ba given by:

$$Ba = (2 \times B1 + 2 \times B2 + 2 \times B3 + B4)/7$$

When no large difference in brightness is detected between the object and its surrounding portion, YES is determined in step S14. In this case, in step S18, the exposure value calculating portion 126 simply averages the brightness values B1 to B4 of the light-metering areas A1 to A4 to obtain an exposure value Ba given by:

$$Ba = (B1 + B2 + B3 + B4)/4$$

In this manner, since the weight to be multiplied with the brightness value of each light-metering area is changed according to the position of a boundary between light-metering areas having a large difference in brightness therebetween, the exposure value can be obtained in consideration of the difference in brightness between an object and its surrounding portion. As a result, the exposure value can be obtained in consideration of the brightness at the position of object, and the balance of the entire field.

Therefore, when the mechanical controlling portion 122 controls the diaphragm 123 and the shutter (not shown) according to the above exposure value Ba, exposure control conforming to the object can be performed, and a satisfactory exposure state can be obtained.

The method of inputting the position of object to the classifying device 116 is not limited to the above-mentioned method using the visual axis detecting device 110. For example, a photographer may be manually designate the position of object, or the position of the closest object caught by an AF controlling portion (not shown) may be input as the position of object.

Figure 1:
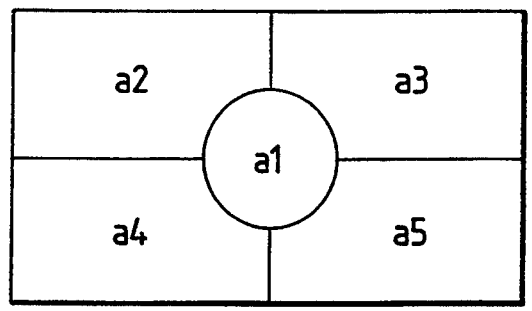
FIG. 1 is an explanatory view of a divisional light-metering method.
Figure 2:
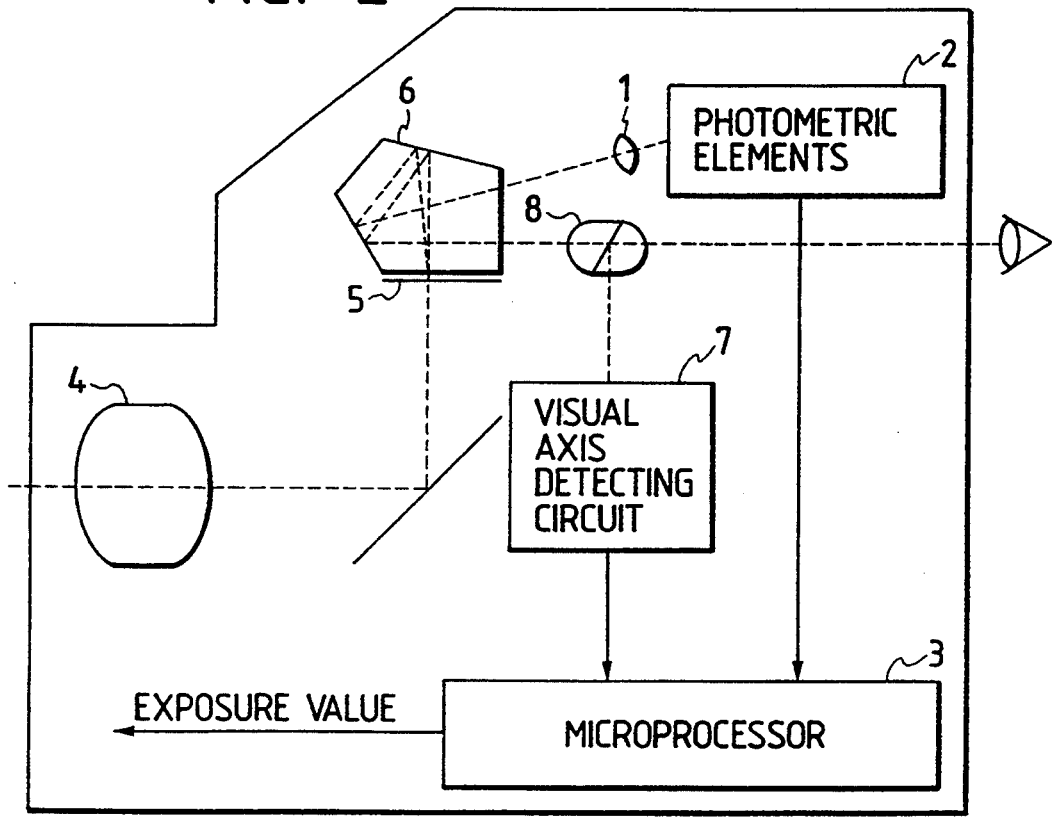
FIG. 2 is a schematic diagram showing an arrangement of an exposure calculating apparatus for a visual axis input camera.
Figure 3:
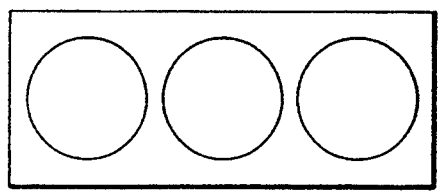
FIG. 3 is a view showing an arrangement of photometric elements.
Figure 4:
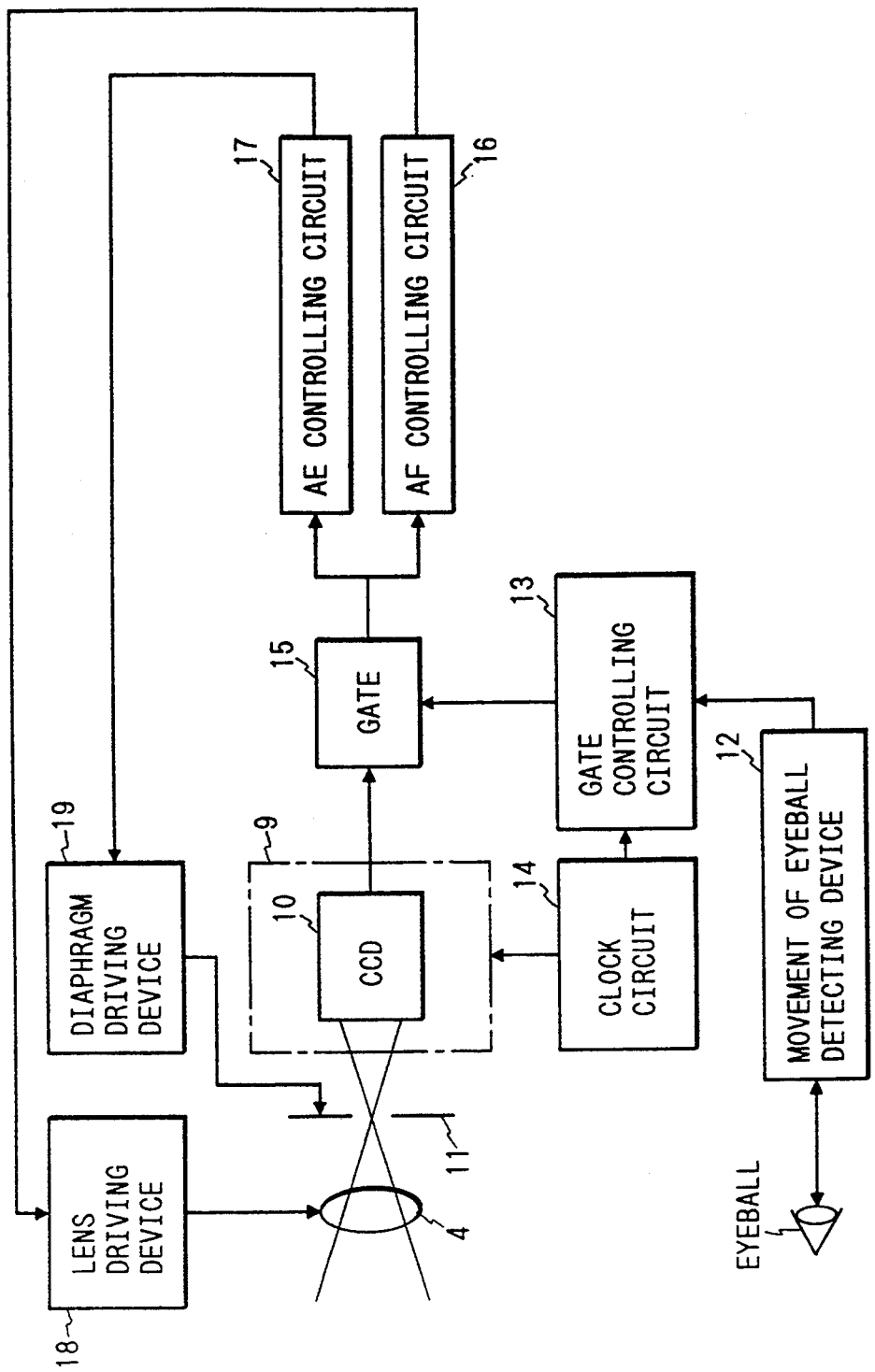
FIG. 4 is a diagram showing an arrangement of a camera having a conventional visual axis detecting device.
Figure 5:
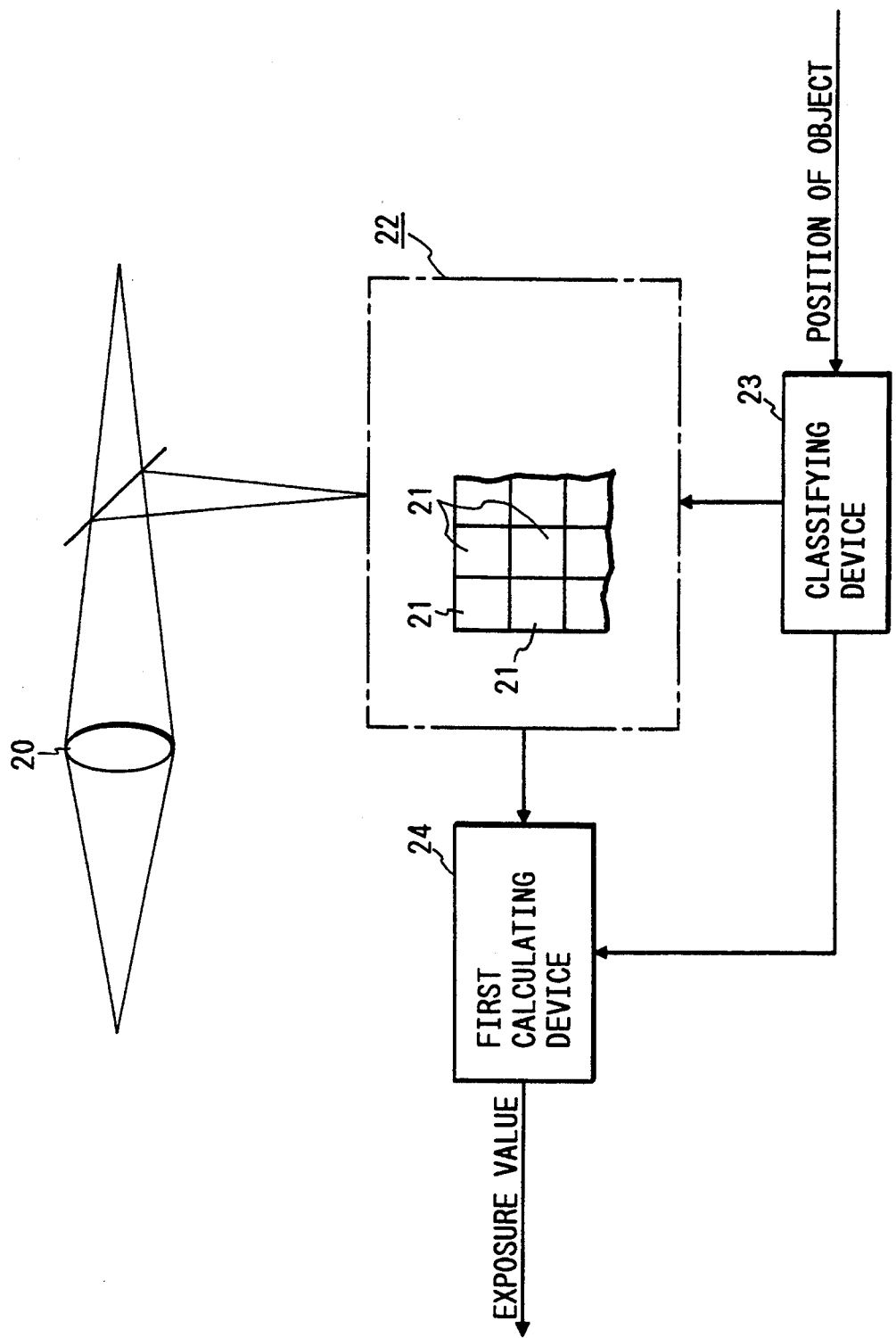
FIG. 5 is a diagram showing an arrangement of an exposure calculating apparatus according to one aspect of the present invention.
Figure 6:
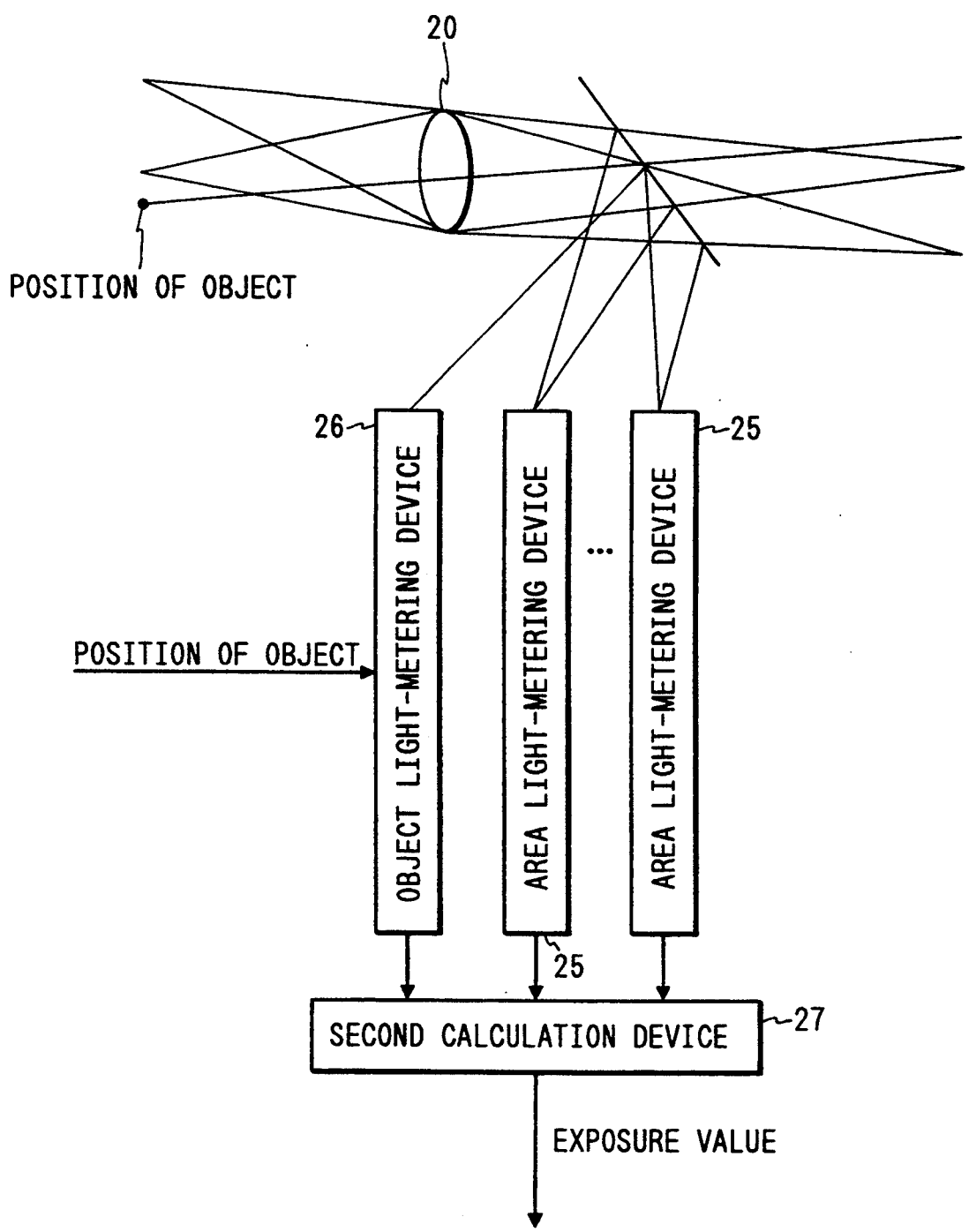
FIG. 6 is a diagram showing an arrangement of an exposure calculating apparatus according to another aspect of the present invention.
Figure 7:
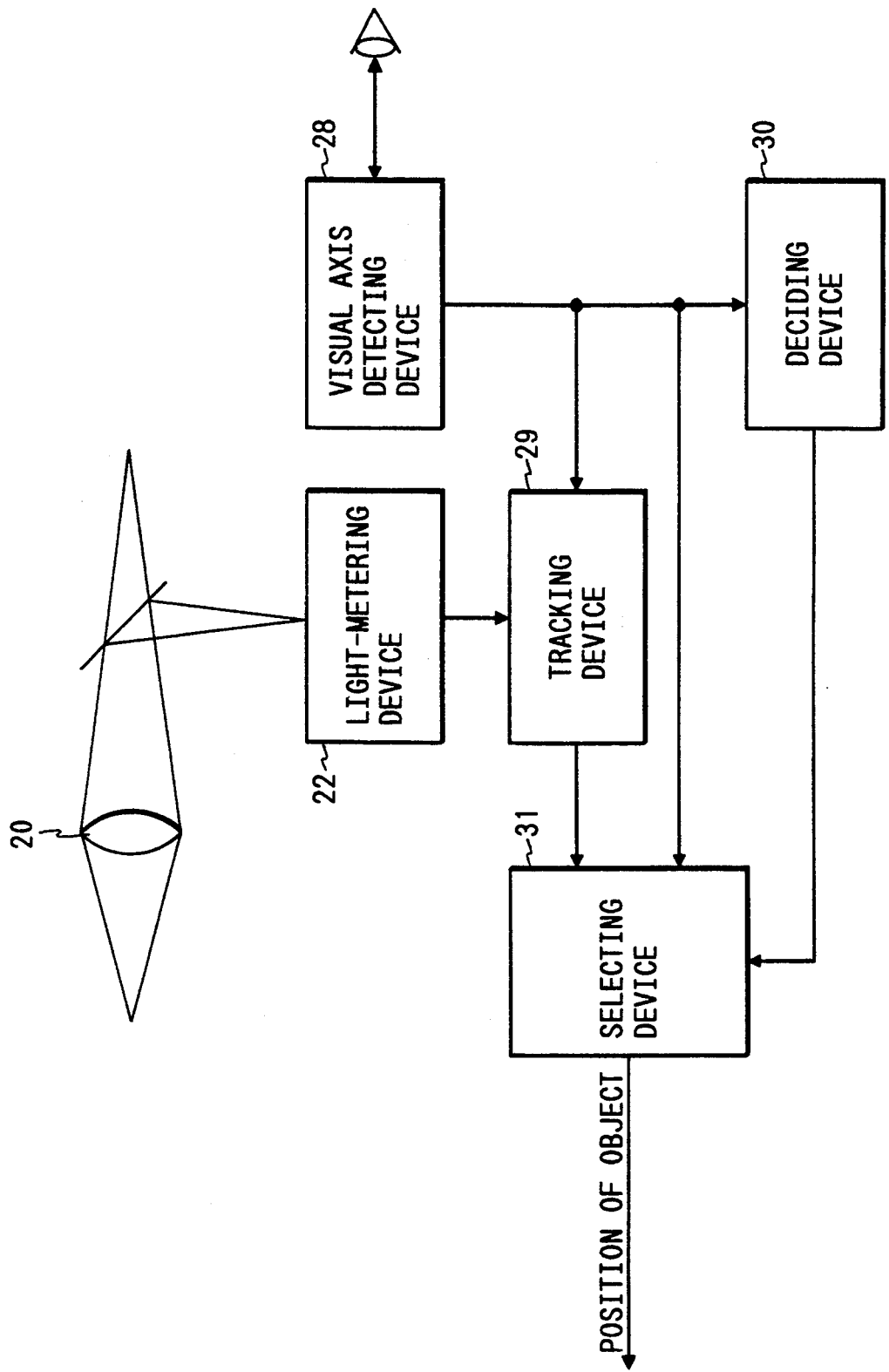
FIG. 7 is a diagram showing an arrangement according to still another aspect of the present invention.
Figure 8:
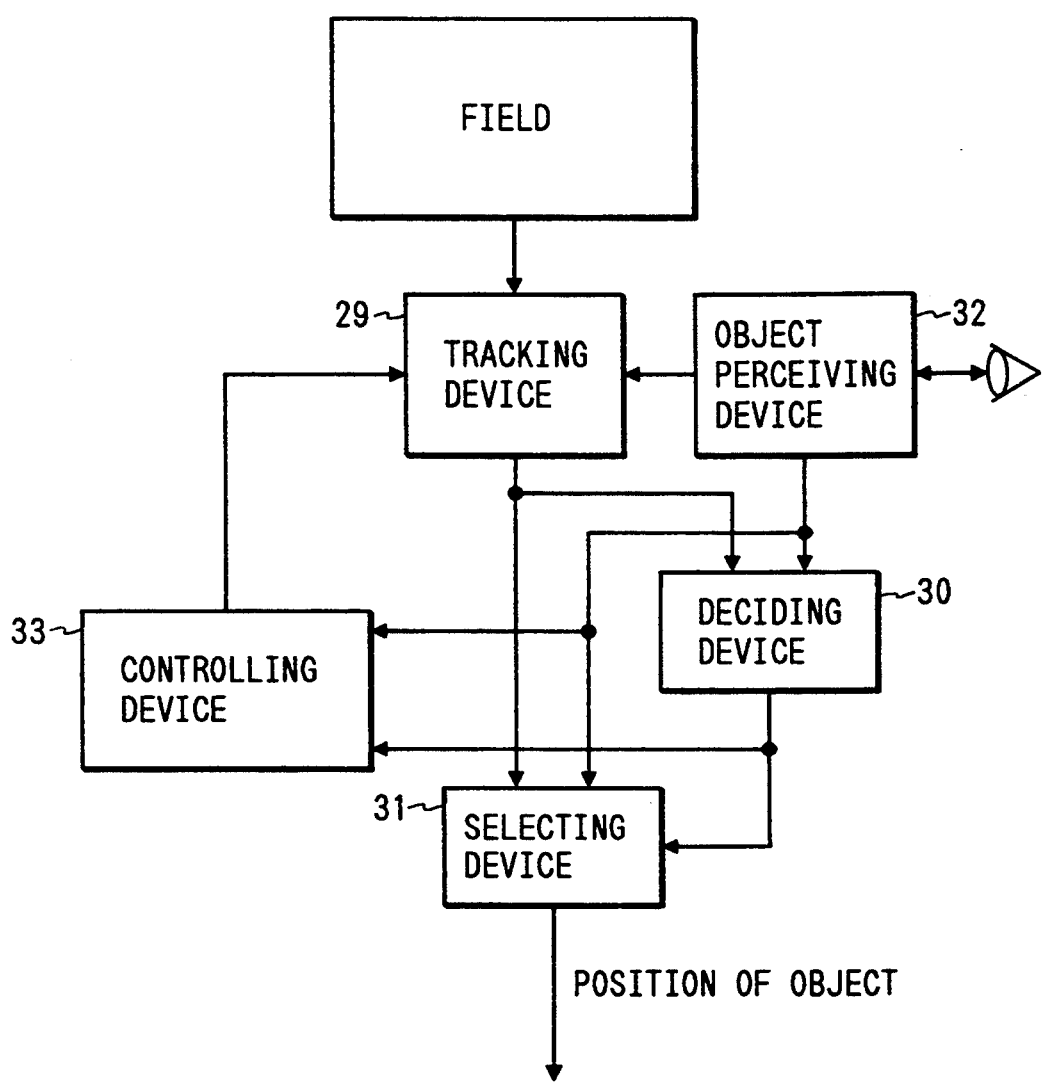
FIG. 8 is a diagram showing an arrangement of an object perceiving apparatus.

The classifying device 116 may modify a 5-divided pattern shown in FIG. 1 to obtain a divisional pattern corresponding to the position of object.

Figure 17:
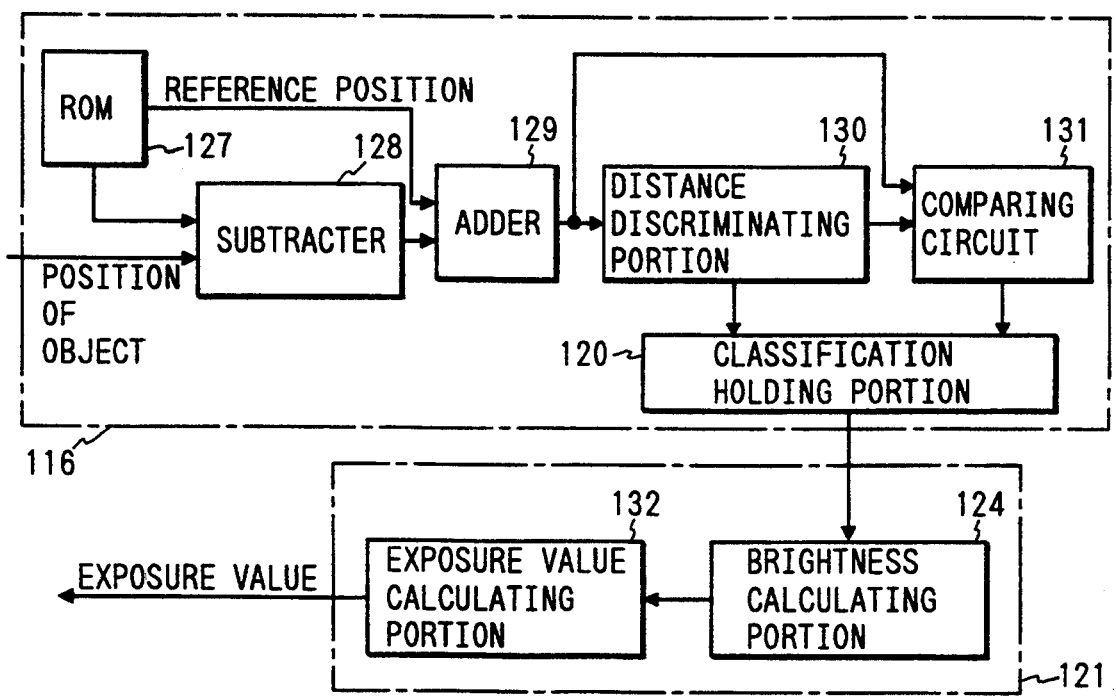
FIG. 17 is a diagram showing an arrangement of another embodiment of a classifying device.

FIG. 17 shows the arrangement of another embodiment of the classifying device.

In FIG. 17, the classifying device 116 comprises a ROM 127, a subtracter 128, an adder 129, a distance discriminating portion 130, and a comparing circuit 131 in place of the first pattern generating device 119 shown in FIG. 11.

The above-mentioned ROM 127 corresponds to a holding device, and, for example, stores coordinates $(X_0, Y_0)$ corresponding to the central position of a circular light-metering area a1 as information associated with a boundary line of a 5-divided pattern. The subtracter 128 corresponds to a displacement calculating device, and subtracts the coordinates (X₀,Y₀) of the central position of the above-mentioned light-metering area a1 from coordinates (Xa,Ya) of the position of object to obtain displacements ΔX and ΔY. The adder 129 receives the above-mentioned coordinates (X₀,Y₀) as a reference position, and adds the reference position to the displacements ΔX and ΔY to obtain a central position (Xc,Yc) of the light-metering area a1 of a divisional pattern corresponding to the position of object.

In the above-mentioned 5-divided pattern, the central position of the light-metering area a1 corresponds to an intersection position of boundary lines for dividing remaining four light-metering areas a2 to a5. Therefore, as described above, by obtaining the new central position (Xc,Yc) of the light-metering area a1, a divisional pattern corresponding to the position of object can be obtained. More specifically, the adder 129 realizes the function of a second pattern generating device.

The new central position (Xc,Yc) is supplied to the distance discriminating portion 130 and the comparing circuit 131, and is subjected to classifying processing of the light-metering elements 21.

The distance discriminating portion 130 discriminates each light-metering element 21 whose distance between itself and the above-mentioned central position is equal to or smaller than a threshold value r corresponding to the radius of the light-metering area a1, and supplies a code "a1" corresponding to the light-metering area a1 as the classification result of the corresponding light-metering element 21 to the classification holding portion 120. On the other hand, the coordinates (X,Y) of a light-metering element whose distance between itself and the above-mentioned central position exceeds the threshold value r are supplied to the comparing circuit 131, and are subjected to classifying processing by the comparing circuit 131.

The comparing circuit 131 can compare the input coordinates (X,Y) of the light-metering elements 21 with the central position (Xc,Yc) in units of coordinate components, and can classify the light-metering elements 21 into the remaining four light-metering areas a2 to a5 according to the obtained comparison results.

For example, if the coordinates (X,Y) of a given light-metering element 21 satisfy conditions X>Xc and Y>Yc, it is determined that this light-metering element 21 belongs to the upper right light-metering area a3, and a code "a3" indicating the light-metering area a3 is supplied to the classification holding portion 120. Similarly, the light-metering element 21, which satisfies conditions X≦Xc and Y>Yc, is classified to the light-metering area a2; the light-metering element 21, which satisfies conditions X≦Xc and Y≦Yc, is classified to the light-metering area a4; and the light-metering element 21, which satisfies conditions X>Xc and Y≦Yc, is classified to the light-metering area a5.

Figure 18:
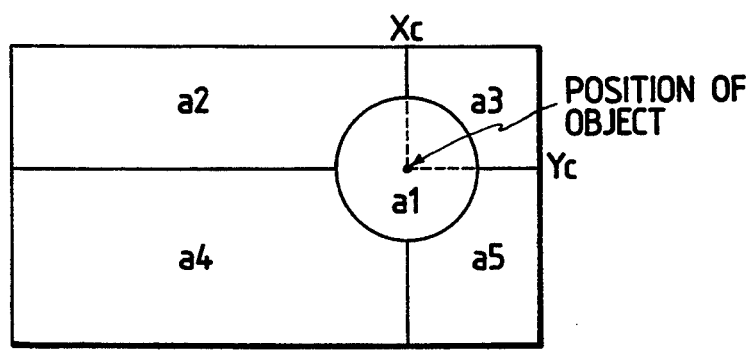
FIG. 18 is a view showing an example of divided light-metering areas.

The light-metering elements 21 of the CCD 107 are classified in this manner, thus forming the five light-metering areas, as shown in FIG. 18.

In FIG. 17, the first calculating device 121 comprises the brightness calculating portion 124 and an exposure value calculating portion 132. The brightness calculating portion 124 calculates brightness values B1 to B5 corresponding to the light-metering areas a1 to a5 in the same manner as in step S11 described above, and the exposure value calculating portion 132 performs weighted average processing by weighting the brightness value B1 corresponding to the light-metering area a1 so as to obtain an exposure value.

For example, the exposure value calculating portion can calculate an exposure value Ba given by:

$$Ba=(4\times B1+B2+B3+B4+B5)/8$$

In this manner, like in the embodiment using the concentrical divisional pattern, an exposure value can be obtained while weighting on the position of object, and taking the balance of the entire frame into consideration, and exposure control conforming to an object can be performed.

In this case, an exposure value weighted on the balance of the entire field can be obtained as compared to the above-mentioned case wherein the concentrical divisional pattern is adopted.

In the above-mentioned 5-divided pattern, the central position of the light-metering area a1 is used as the reference position, and the central position coincides with the position of object in a new divisional pattern. For this reason, a new central position need not be calculated after displacements from the reference position are calculated. Thus, the position of the object may be determined as the new central position of the light-metering area a1. In this case, the position of object may be directly input to the distance discriminating portion 130. Thus, since the RAM 127, the subtracter 128, and the adder 129 can be omitted accordingly, the circuit arrangement of the classifying device 116 can be simplified.

A divisional pattern for dividing the field is not limited to the above-mentioned 5-divided pattern, and various other patterns may be used. When a divisional pattern in which boundary lines of light-metering areas have a plurality of intersections, or a divisional pattern which has a boundary line obliquely extending over the field is .used, the ROM 127 must hold information for specifying a boundary line of each area, and processing for obtaining a boundary line position corresponding to the position of object, and processing for classifying the light-metering elements 21 of the CCD 107 into corresponding light-metering areas are complicated as compared to the above-mentioned embodiment.

When the position of object is detected at the end of the field by the above-mentioned visual axis detecting device 110, if the central position of the concentrical divisional pattern shown in FIG. 13 is moved to the position of object, a weight of light-metering information corresponding to the central portion of the field contributing to an exposure value is extremely decreased.

However, since the light-metering information of the central portion of the field is important in consideration of the balance of the entire frame, the weight corresponding to the light-metering information of the central portion must be prevented from being extremely decreased.

Figure 19:
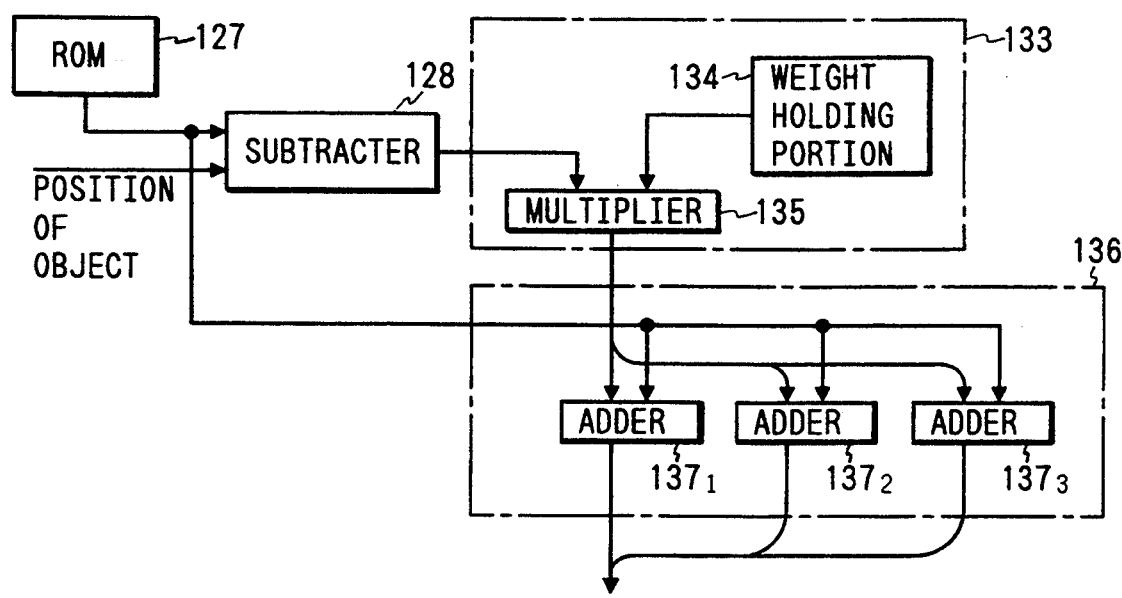
FIG. 19 is a diagram showing an arrangement of still another embodiment of a classifying device.

FIG. 19 shows the arrangement of still another embodiment of the classifying device 116.

In this case, the ROM 127 holds coordinates indicating the center of the field, and the subtracter 128 calculates displacements using these coordinates as a reference position. The obtained displacements are supplied to a movement controlling device 133.

In FIG. 19, the movement controlling device 133 is constituted by a weight holding portion 134 for holding weights W1 to W3 corresponding to areas S1 to S3 of the light-metering areas A1 to A3, and a multiplier 135 for multiplying the displacements from the reference position obtained by the subtracter 128 with the weights corresponding to the light-metering areas A1 to A3.

The weight holding portion 134 can hold the weights W1, W2, and W3, which are respectively expressed by the following equations using the areas S1, S2, and S3 of the respective light-metering areas, and a predetermined constant k:

$W1 = k/S1^{\frac{1}{2}}$
$W2 = k/(S2/S1)^{\frac{1}{2}}$
$W3 = k/(S3/S1)^{\frac{1}{2}}$ The weight holding portion 134 can sequentially supply these weights to the multiplier 135. The weight holding portion 134 may hold the area S1, and weights inversely proportional to ratios of the area S1 to the areas of the light-metering areas.

Since a moving amount is obtained by multiplying the above-mentioned displacements with such a weight, control for suppressing the moving amount of the light-metering area having a large area can be performed. Therefore, the outputs from the multiplier 135 can be input to a second pattern generating device 136 as the moving amounts of the respective light-metering areas.

In this case, the second pattern generating device 136 can be constituted by three adders $137_1$, $137_2$, and $137_3$ in correspondence with the light-metering areas A1, A2, and A3 so as to add the moving amounts corresponding to the respective light-metering areas to the coordinates of the reference position, thereby obtaining new central positions of circles indicating the boundary lines of the light-metering areas.

Figure 20:
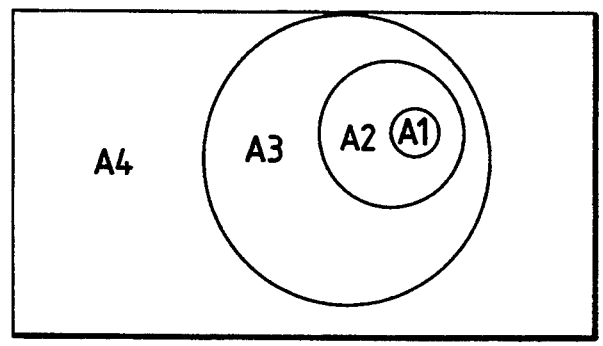
FIG. 20 is a view showing an example of divided light-metering areas.

In this manner, the moving amount of the light-metering areas A1, A2, and A3 according to the position of object can be controlled. Even when the position of object is located at the surrounding portion of field, the central portion of the field can be included in the light-metering area A2 or A3, as shown in FIG. 20, and an exposure value can be calculated by multiplying light-metering information of the central portion of the field with a proper weight.

When the classifying device 116 shown in FIG. 17 is adopted, if the position of object is detected at the end of the field, the light-metering area a1 may partially lack, or any of the four surrounding light-metering areas a2 to a5 may be lost.

In this case, the exposure value Ba which is weighted on the position of object, and considers the entire balance cannot be obtained by the weighted average processing of the above-mentioned exposure value calculating portion 132.

Figure 21:
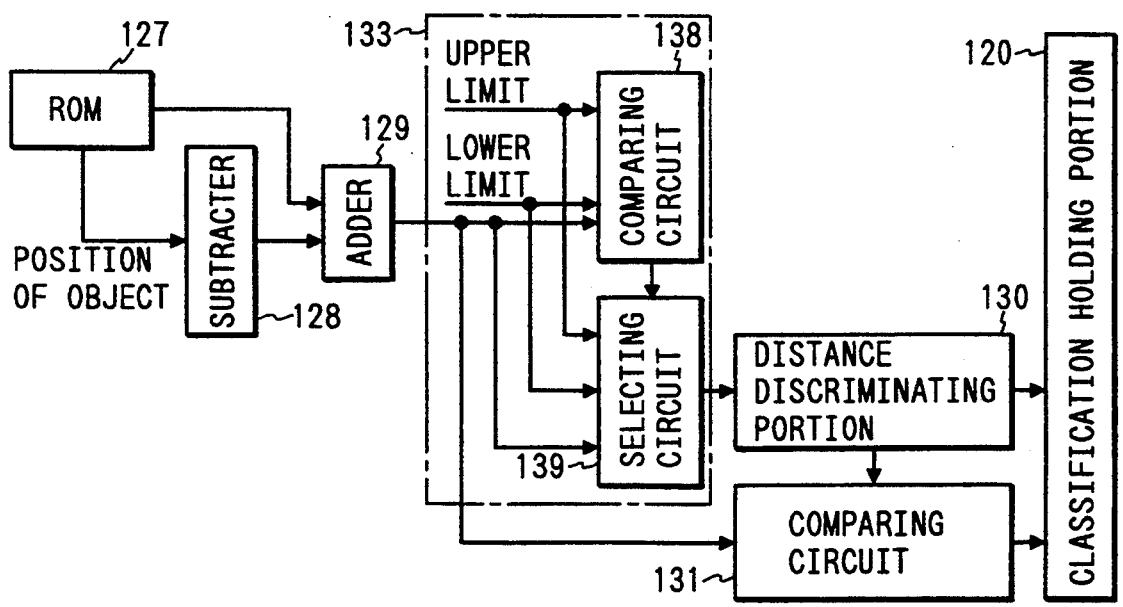
FIG. 21 is a diagram showing an arrangement of still another embodiment of a classifying device.

FIG. 21 shows the arrangement of still another embodiment of the classifying device.

In FIG. 21, the classifying device 116 is arranged by adding a comparing circuit 138 and a selecting circuit 139 to the classifying device 116 shown FIG. 17. The comparing circuit 138 and the selecting circuit 139 correspond to the movement controlling device 133. The comparing circuit 138 compares the coordinate components of the central position obtained by the adder 129 with the upper and lower limits of the coordinate components, and the selecting circuit 139 selects one of the coordinate components of the central position and the corresponding upper limits (or the lower limits), and supplies the selected coordinate components to the distance discriminating portion 130 as a new central position.

In the above-mentioned comparing circuit 138, lower limits r of X- and Y-coordinates, an upper limit m-r of the X-coordinate, and an upper limit n-r of the Y-coordinate can be set using, e.g., a value r corresponding to the radius of the light-metering area a1.

Figure 22:
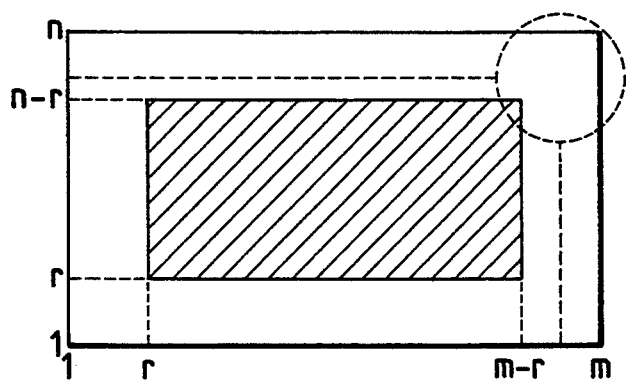
FIG. 22 is a view showing an example of divided light-metering areas.

In this manner, the moving range of the central position (Xc,Yc) of the light-metering area a1 of the 5-divided pattern is limited to a range indicated by hatching in FIG. 22. Therefore, since the boundary line of each light-metering area will not be moved to positions indicated by dotted lines in FIG. 22, any of the five light-metering areas a1 to a5 can be prevented from lacking, and the exposure value calculating portion 132 can always obtain an exposure value in consideration of the entire balance.

Since the conventional 5-divided pattern shown in FIG. 1 is to obtain an exposure value in consideration of the balance of the entire field, when the entire balance is to be weighted, it is preferable not to considerably modify this basic 5-divided pattern.

A method of determining an exposure value while utilizing the feature of such a divisional light-metering method and weighting on light-metering information of the position of object will be described below.

Figure 23:
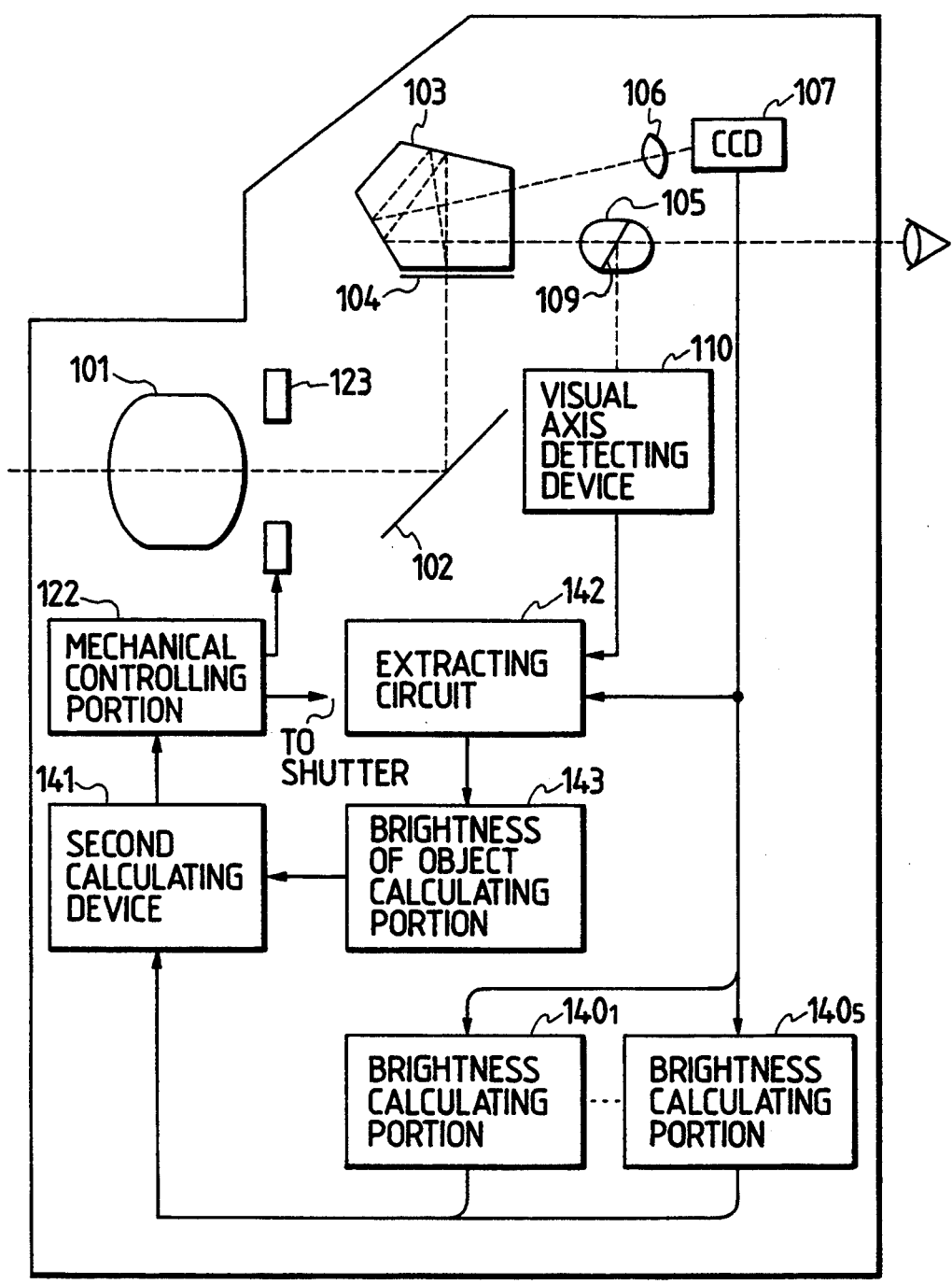
FIG. 23 is a diagram showing an arrangement of another embodiment of a single-lens reflex camera adopting an exposure calculating apparatus of the present invention.

FIG. 23 is a diagram showing another embodiment of a single-lens reflex camera adopting an exposure calculating apparatus of the present invention.

In FIG. 23, an optical system including a taking lens 101, a main mirror 102, a pentagonal prism 103, a focusing screen 104, an eyepiece lens 105, a beam splitter 109, and a lens 106 is arranged in the same manner as in the single-lens reflex camera shown in FIG. 9, and an image corresponding to a field is formed on a CCD 107 consisting of n×m light-metering elements 21.

The light-metering elements 21 of the CCD 107 are grouped in advance according to the 5-divided pattern shown in FIG. 1, and outputs from the light-metering elements 21 belonging to light-metering areas a1 to a5 are respectively input to brightness calculating portions $140_1$ to $140_5$ corresponding to the light-metering areas. These brightness calculating portions $140_1$ to $140_5$ respectively calculate brightness values B1 to B5 of the light-metering areas a1 to a5, and supply them to a second calculating device 141.

In this case, the lens 106, the CCD 107, and the brightness calculating portions $140_1$ to $140_5$ perform the light-metering operations of the light-metering areas of the above-mentioned 5-divided pattern, and realize the function of a plurality of area light-metering devices.

A visual axis detecting device 110 detects the position of visual axis of a photographer, and inputs the detection result as a position of object to an extracting circuit 142.

The extracting circuit 142 extracts the outputs included within a range of a distance u from the position of object from the outputs from the light-metering elements 21 of the above-mentioned CCD 107, and supplies the extracted outputs of the light-metering elements 21 to a brightness of object calculating portion 143. The brightness of object calculating portion 143 calculates a brightness value B6 of the area indicated by the above-mentioned range, and supplies it to the second calculating device 141.

More specifically, the lens 106, the CCD 107, the extracting circuit 142, and the brightness of object calculating portion 143 perform light-metering processing of the elementary area including the position of object, and realize the function of an object light-metering device. In this case, the range (the range of the distance u from the position of object) of the light-metering elements 21 extracted by the extracting circuit 142 serves as the elementary area (to be referred to as a light-metering area a6 hereinafter) including the position of object.

Figure 24:
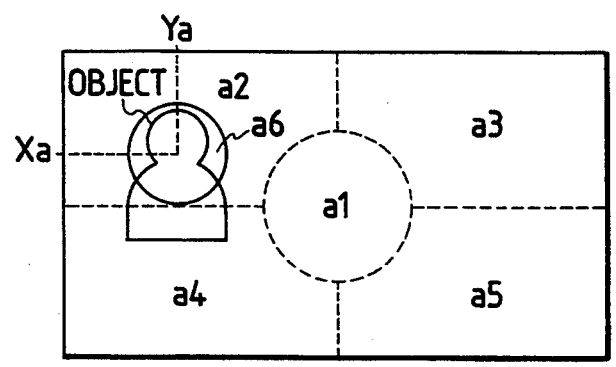
FIG. 24 is a view showing an example of divided light-metering areas.

In this manner, the light-metering area a6 that moves in the field in correspondence with the position (Xa,Ya) of the object can be obtained independently of the five stationary light-metering areas a1 to a5, indicated by a dotted line in FIG. 24.

The second calculating device 141 performs weighted average processing weighted on the brightness value B6 of the light-metering area a6 on the basis of the brightness values B1 to B6 corresponding to the light-metering areas a1 to a5, and the brightness value B6 corresponding to the light-metering area a6, and obtains an exposure value Ba given by:

$$Ba = (B1 + B2 + B3 + B4 + B5 + 3 \times B6)/8$$

The device 141 supplies the obtained exposure value to a mechanical controlling portion 122.

In this manner, since an exposure value corresponding to brightness information of an object can be obtained while utilizing the feature of the divisional light-metering method, exposure control considering the entire balance can be performed.

Note that divisional light-metering elements corresponding to the light-metering areas a1 to a5 of the 5-divided pattern may be arranged in addition to the above-mentioned CCD 107. In this case, since the brightness values of the light-metering areas a1 to a5 can be directly obtained from the outputs from the divisional light-metering elements, the time required for exposure calculating processing can be shortened as compared to the case wherein the brightness values of the light-metering areas a1 to a5 are calculated on the basis of the outputs from the light-metering elements 21 of the CCD 107. However, since a light beam must be split to both these divisional light-metering elements and the CCD 107, the optical system becomes complicated, and light-metering precision may be undesirably impaired due to a decrease in light amount.

The size of the elementary area to be measured by the object light-metering device may be changed according to the size of an object caught in the field.

Figure 25:
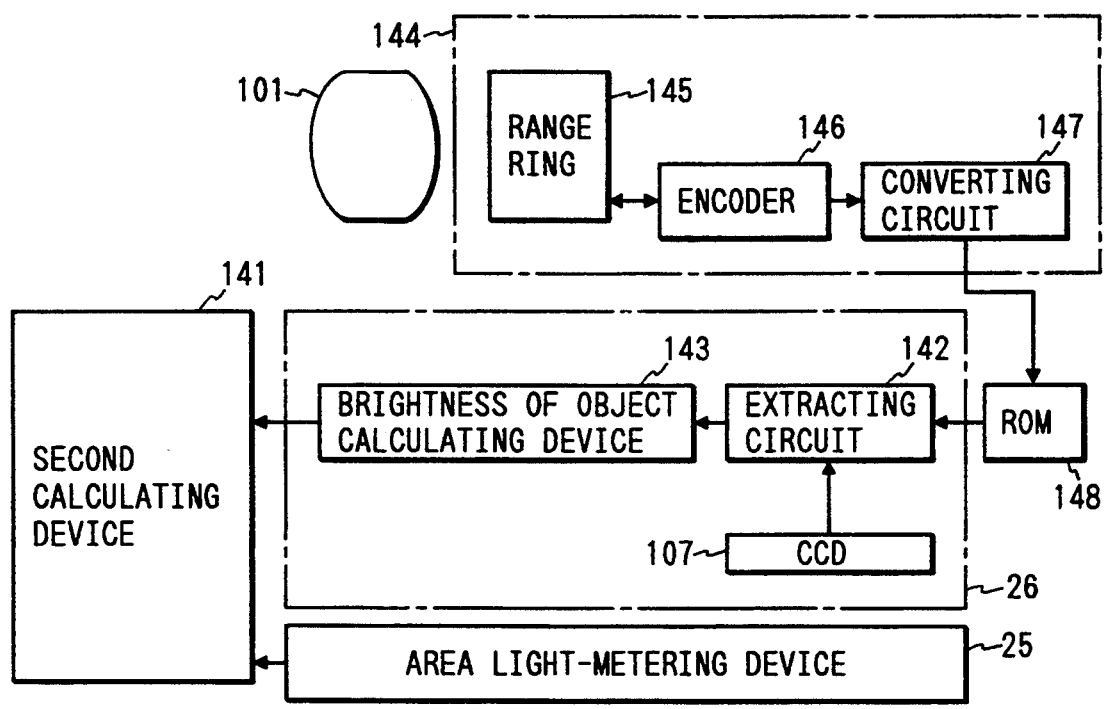
FIG. 25 is a diagram showing an arrangement of another embodiment of an exposure calculating apparatus according to the present invention.

FIG. 25 shows the arrangement of another embodiment of an exposure calculating apparatus of the present invention.

In FIG. 25, a distance discriminating device 144 is constituted by a range ring 145 provided to the taking lens 101, an encoder 146 for detecting the rotational position of the range ring 145, and a converting circuit 147 for converting an output from the encoder 146 into a numerical value representing a distance. The device 144 supplies the converted numerical value to a ROM 148 as an address.

The ROM 148 corresponds to a first changing device, and holds values representing sizes of a standard object (e.g., a person) corresponding to respective distances at addresses corresponding to numerical values representing the distances. The ROM 148 outputs a corresponding value according to the input numerical value obtained as the discrimination result of the distance discriminating device 144, thereby setting the distance u for defining the extraction range of the extracting circuit 142. The values representing the sizes of the object may be calculated in advance by conducting experiments for evaluating the areas occupied by, e.g., a person at various distances.

Figure 26:
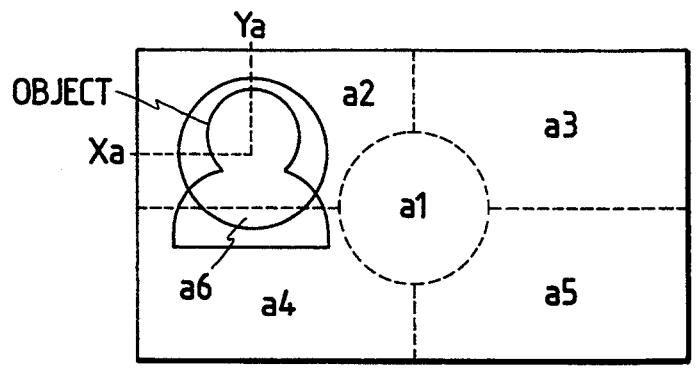
FIG. 26 is a view showing an example of divided light-metering areas.

As shown in FIG. 26, the size of the above-mentioned light-metering area a6 can be changed according to the size of the object in the field. Since light-metering information of the object portion can be appropriately fetched, and can be reflected in an exposure value, the exposure value which further conforms to the object can be obtained.

Figure 27:
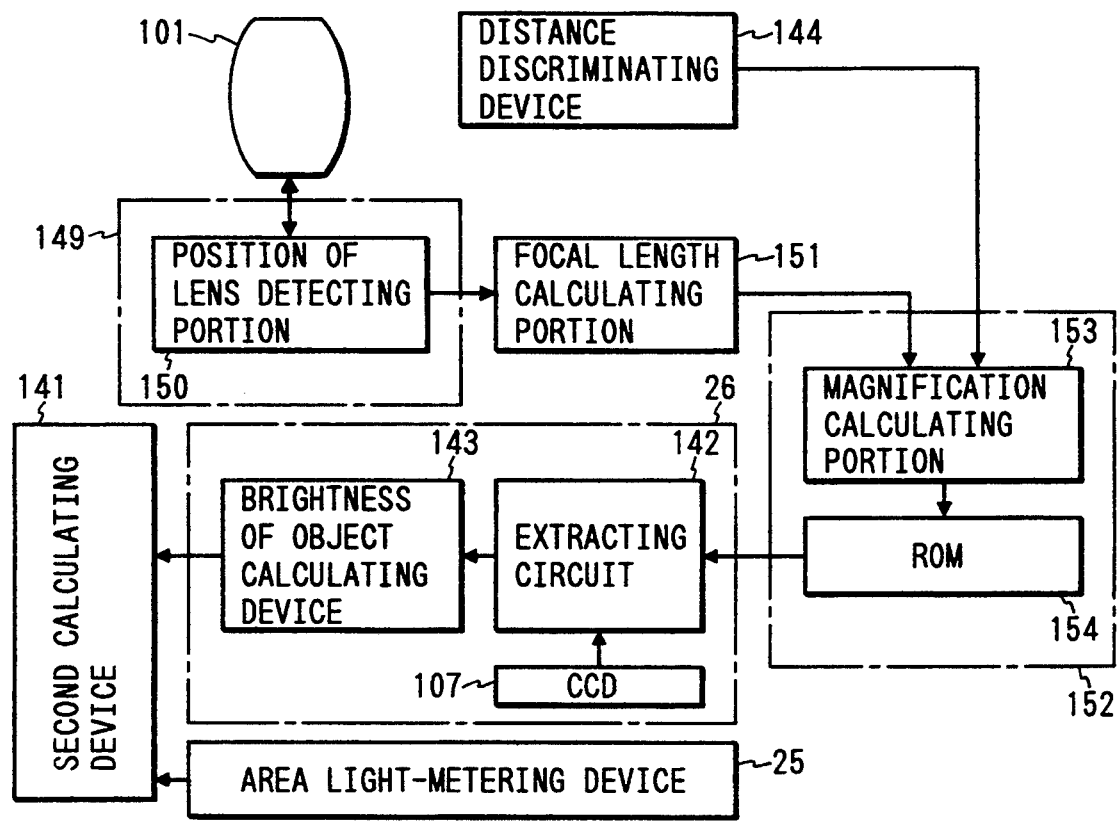
FIG. 27 is a diagram showing an arrangement of still another embodiment of an exposure calculating apparatus according to the present invention.

As shown in FIG. 27, a focal length discriminating device may be constituted by a position of lens detecting portion 150 equipped in a lens driving portion 149, and a focal length calculating portion 151 for calculating the focal length of the taking lens 101 on the basis of information associated with the position of the taking lens 101, and the focal length obtained by the focal length discriminating device and the distance to the object from the distance discriminating device 144 may be input to a second changing device 152.

The second changing device 152 comprises a magnification calculating portion 153 for calculating the magnification of the taking lens 101 on the basis of the input focal length and the distance to the object, and a ROM 154 for holding the sizes of the light-metering area a6 corresponding to the magnifications of the taking lens 101. The device 152 supplies the size of the light-metering area a6 corresponding to the output from the magnification calculating portion 153 to the above-mentioned extracting circuit 142.

In this case, since the size of the object in the field can be accurately evaluated on the basis of the magnification of the taking lens 101, the light-metering area a6, which corresponds better to the size of the object than in a case wherein the size of the light-metering area a6 is changed on the basis of only the distance to the object, can be obtained.

As described above, according to the present invention, the light-metering areas which flexibly change in correspondence with the position of object can be obtained by classifying the light-metering elements corresponding to elementary areas. An exposure value considering both the position of object and the balance of the entire field can be obtained on the basis of the light-metering results from these light-metering areas.

Since the area light-metering device and the object light-metering device independently perform light-metering operations of the corresponding light-metering areas, an exposure value conforming to the object can be calculated while utilizing the feature of the divisional light-metering method and weighting on the entire balance.

Furthermore, when the size of the light-metering area corresponding to the object light-metering device is set to be variable, an exposure value appropriately reflecting light-metering information of the object portion therein can be obtained.

Figure 28:
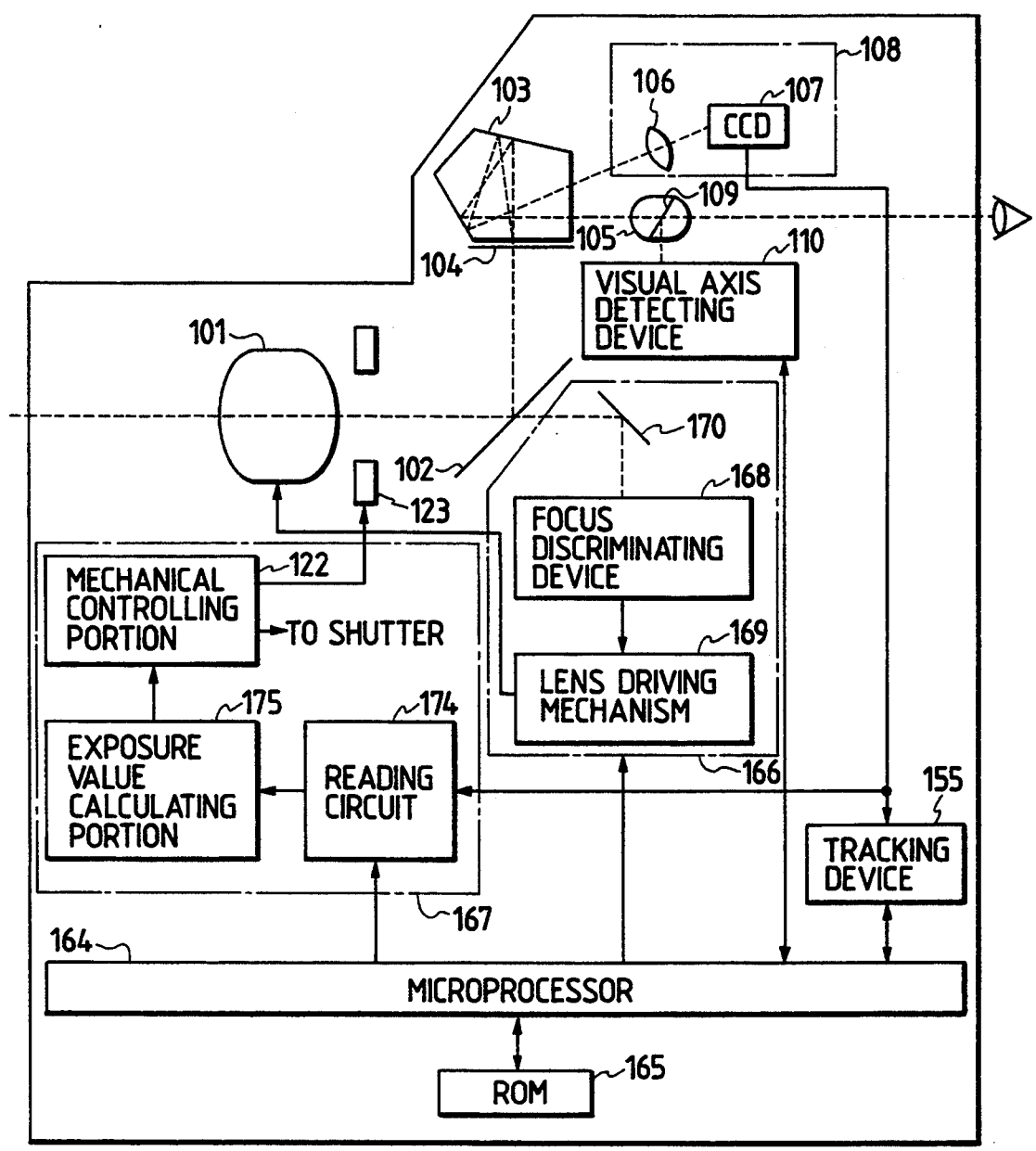
FIG. 28 is a diagram showing an arrangement of still another embodiment of a single-lens reflex camera adopting the present invention.

FIG. 28 is a diagram showing the arrangement of still another embodiment of a single-lens reflex camera adopting the present invention.

The same reference numerals in FIG. 28 denote the same parts as in FIG. 9.

As for the detailed arrangement of a visual axis detecting device 110, as shown in FIG. 10, when a position of visual axis is to be detected, outputs from a CCD 114 of a detecting processing portion 115 may be sequentially compared to detect the maximal value, and detection information indicating the presence/absence of the corresponding element and the coordinates of the corresponding element may be output.

Figure 29:
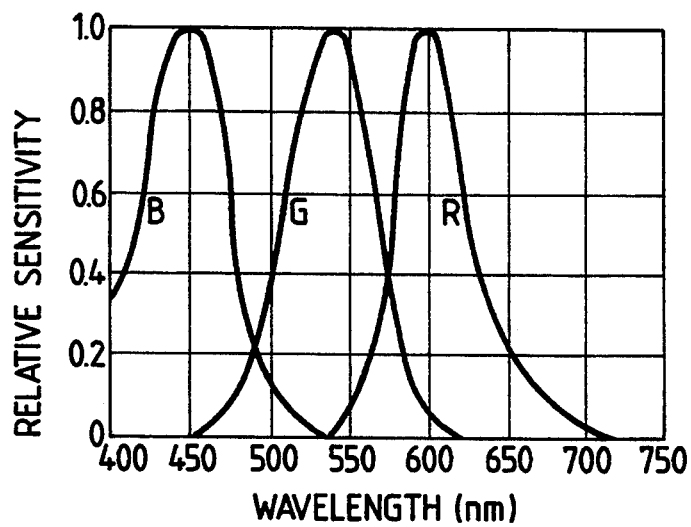
FIG. 29 is a graph-showing spectrum characteristics of a filter.

A lens 106 is arranged on another optical axis slightly offset from the optical axis of an eyepiece lens 105, and forms an image on a focusing screen 104 on a CCD 107 arranged at the position crossing this optical axis. The CCD 107 consists of n×m elements like in the CCD 114 described above. Each element is further divided into three sections, and filters for selectively transmitting a red (R) component, a green (G) component, and a blue (B) component are respectively attached to these three sections. FIG. 29 shows the spectrum characteristics of these color component filters. More specifically, the elements of the CCD 107 measure the light amounts of the corresponding small areas of the image on the above mentioned focusing screen 104 in units of color components, and output the intensities of the color components.

Since the image on the focusing screen 104 corresponds to the field of a taking lens 101, the intensity distributions of the color light components in the field of the taking lens 101 can be measured by measuring the intensity distributions of the image on the focusing screen 104, as described above.

A method of discriminating the position of object on the basis of the measurement result of the intensity distributions by the above-mentioned light-metering device will be described below.

When the position of object is given as coordinates (Xa,Ya) in the field on the basis of the position of visual axis of the photographer detected by the visual axis detecting device 110, it is considered that the position of object after an elapse of a time Δt from the detection of the position of visual axis is near the above-mentioned coordinates when the time Δt is short. It is also considered that the spectral characteristics representing the colors of the object are almost constant.

Therefore, a tracking device 155 can track a position which is near the position of object obtained by the visual axis detecting device 110, and has approximate spectral characteristics.

Figure 30:
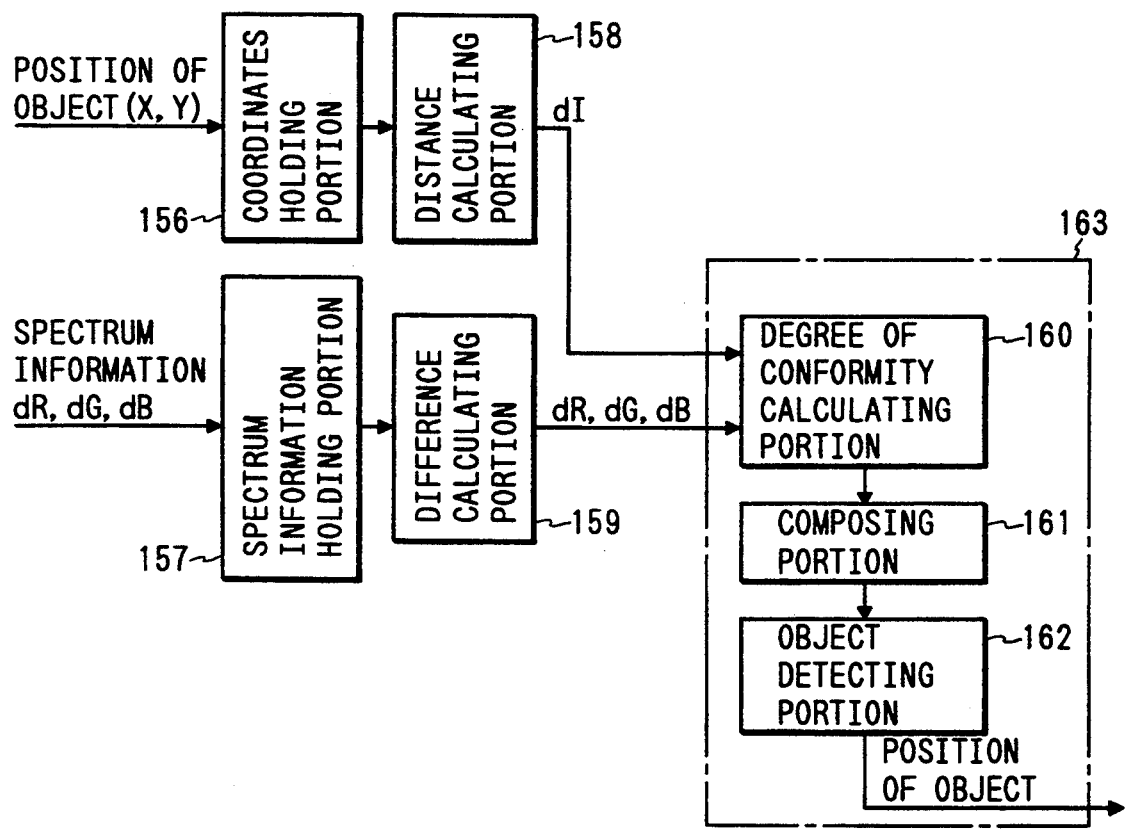
FIG. 30 is a diagram showing the details of the arrangement of a tracking device.
Figure 31:
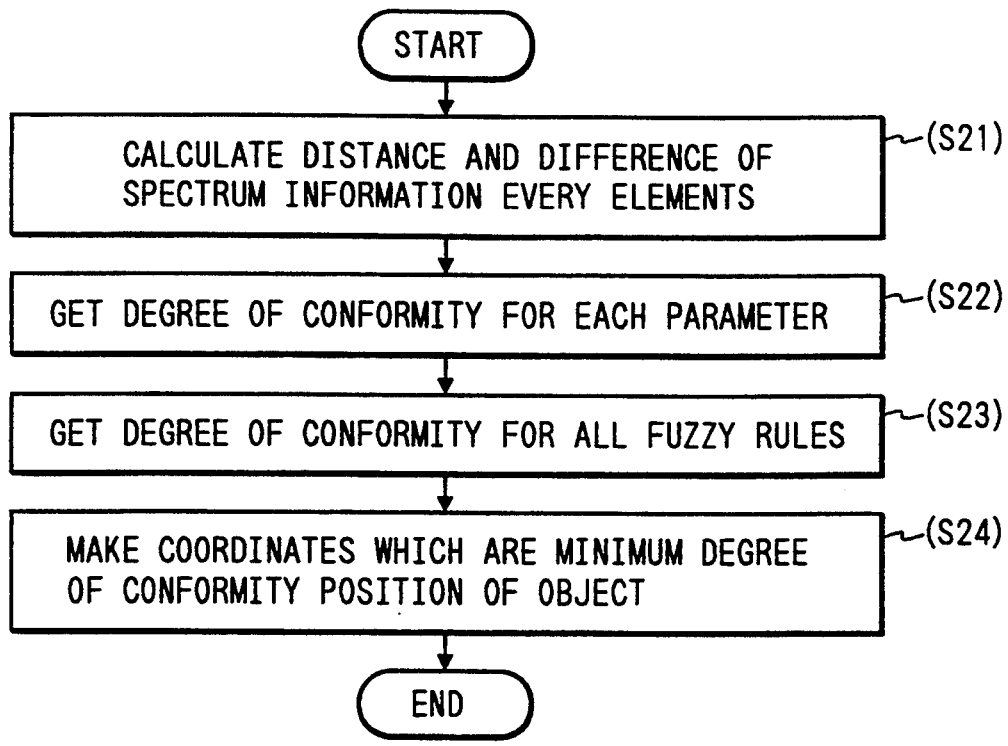
FIG. 31 is a flow chart showing tracking processing.

FIG. 30 shows the details of the arrangement of the tracking device 155. FIG. 31 is a flow chart showing tracking processing.

In FIG. 30, the tracking device 155 is constituted by a coordinates holding portion 156, a spectrum information holding portion 157, a distance calculating portion 158, a difference calculating portion 159, a degree of conformity calculating portion 160, a composing portion 161, and an object detecting portion 162.

The coordinates holding portion 156 holds the coordinates of the element of the CCD 107 corresponding to the position of object as coordinates indicating the position of object. The spectrum information holding portion 157 holds values R(Xa,Ya), G(Xa,Ya), and B(Xa,Ya) obtained by standardizing the color component outputs from the element corresponding to the position of object using the total sum of these outputs as spectrum information indicating colors at the position of object. Using outputs r(Xa,Ya), g(Xa,Ya), and b(Xa,Ya) corresponding to the R, G, and B components from the above-mentioned elements, the spectrum information values R(Xa,Ya), G(Xa,Ya), and B(Xa,Ya) are respectively expressed by:

$$R(Xa,Ya) = r(Xa,Ya)/(r(Xa,Ya)+g(Xa,Ya)+b(Xa,Ya))$$

$$G(Xa,Ya) = g(Xa,Ya)/(r(Xa,Ya)+g(Xa,Ya)+b(Xa,Ya))$$

$$B(Xa,Ya) = b(Xa,Ya)/(r(Xa,Ya)+g(Xa,Ya)+b(Xa,Ya))$$

Therefore, each of the above-mentioned spectrum information values R(Xa,Ya), G(Xa,Ya), and B(Xa,Ya) falls within a range between 0 and 1.

These coordinates and pieces of spectrum information are respectively supplied to the distance calculating portion 158 and the difference calculating portion 159.

In step S21, the distance calculating portion 158 calculates the distance between each elementary area of the field and the position of object on the basis of the coordinates indicating the position of object, and the distance calculating portion 159 calculates differences dR, dG, and dB between the spectrum information values representing the colors of each elementary area of the field and the spectrum information values representing the colors at the position of object on the basis of the spectrum information at the position of object and the outputs from the elements of the CCD 107.

Since the elements of the CCD 107 correspond to the elementary areas of the field, the distance calculating portion 158 can obtain the distance in the field by calculating a distance dI on the CCD 107. Using the position (Xa,Ya) of object, coordinates (X,Y) of each element, and Imax, the distance dI can be calculated by:

$$dI(X,Y) = ((Xa-X)^2+(Ya-Y)^2)^{\frac{1}{2}}/Imax$$

for $$Imax = \{(X_n-X)^2+(Y_m-Y_1)^2\}^{\frac{1}{2}}.$$

The calculated distance dI is supplied to the degree of conformity calculating portion 160.

The difference calculating portion 159 subtracts the spectrum information values R(Xa,Ya), G(Xa,Ya), and B(Xa,Ya) at the position of object from the R, G, and B component outputs R(X,Y), G(X,Y), and B(X,Y) from each element of the CCD 107, thereby calculating the differences dR, dG, and dB of the spectrum information.

Therefore, using the outputs R(X,Y), G(X,Y), and B(X,Y) from each element, and the spectrum information values R(Xa,Ya), G(Xa,Ya), and B(Xa,Ya) at the position of object, the differences dR, dG, and dB of the spectrum information are respectively expressed by:

$$dR(X,Y) = R(Xa,Ya)-R(X,Y)$$

$$dG(X,Y) = G(Xa,Ya)-G(X,Y)$$

$$dB(X,Y) = B(Xa,Ya)-B(X,Y)$$

The calculated differences dR, dG, and dB are supplied to the degree of conformity calculating portion 160 like the above-mentioned distance dI.

The degree of conformity calculating portion 160, the composing portion 161, and the object detecting portion 162 correspond to a first fuzzy calculating device 163, and perform fuzzy calculating processing (to be described below) using the distance dI and the differences dR, dG, and dB of the pieces of spectrum information obtained in step S21 described above as parameters, thereby obtaining a position of new object..

In the fuzzy calculating processing to be described below, a degree S(X,Y) of conformity for if-parts that each elementary area of the field indicated by the coordinates (X,Y) is the position of object is calculated using the following fuzzy rule:

if dR(X,Y)=small and dG(X,Y)=small and
dB(X,Y)=small and dI(X,Y)=near then

S(X,Y)=big

In the above-mentioned fuzzy rule, each formula represents an if-part for each parameter, and when the if-parts that the differences dR, dG, and dB of the color components of the spectrum information are small and the if-part that the distance dI is near are all "true", the fuzzy rule as a whole represents that the above-mentioned then-part that S(X,Y) is big is "true".

The degree of conformity calculating portion 160 calculates the degrees of conformity about the if-part that the distance dI is near, and the if-parts that the differences dR, dG, and dB of the spectrum information are small (step S22). The degree of conformity calculating portion 160 holds membership functions of the parameters, as shown in FIGS. 32A, 32B, 32C, and 32D, and outputs values of intersections between the hedges of the corresponding if-parts of the membership functions and the corresponding parameter values as the degrees of conformity of the parameters.

The composing portion 161 calculates the degree S(X,Y) of conformity for the if-part that each elementary area of field indicated by the coordinates (X,Y) is the position of object using a max-min composing method on the basis of the degrees of conformity of the parameters obtained as described above (step S23). Since the max-min composing method assumes the minimum value of the degrees of conformity of the entire fuzzy rule, the composing portion 161 selects the minimum value of the degrees of conformity of the parameters obtained in step S22, obtains the intersection with the corresponding hedge of the membership function for the degree S of conformity shown in FIG. 32E, and outputs the intersection as the final degree S(X,Y) of conformity for the above-mentioned if-parts.

In this manner, when the processing in steps S21 to S23 is performed in correspondence with the elements of the CCD 107, the degree of conformity for the if-parts that each elementary area of field is the position of object can be obtained.

Therefore, in step S24, the object detecting portion 162 sequentially compares the obtained degrees of conformity to detect a maximum value, and detects the coordinates of the element of the CCD 107 corresponding to the detected maximum value as the position of object (step S24). The portion 162 then outputs the corresponding coordinates.

In this manner, the position of object can be tracked on the basis of the spectrum intensity distribution of the field obtained by a light-metering device 108. Thus, the position of object can be reliably tracked by utilizing the fact that a change in spectrum information representing the colors of the object is relatively small even when the brightness of the object changes abruptly like in a case wherein the object moves from a shady place to a sunny place.

The tracking device 155 is not limited to the above-mentioned arrangement for performing fuzzy calculation, but may have an arrangement for calculating the total sums of parameters obtained in step S21 in correspondence with the elementary areas of the field, and determining the elementary area of the field, which area yields the minimum total sum, as the position of object.

In this case, since the above-mentioned complicated calculating processing need not be performed, the arrangement of the tracking device 155 can be simplified. However, even when only one parameter is considerably different from a parameter corresponding to the previous position of object, it may be determined as the position of object if other parameter values are approximate to each other, and an error is large as compared to the case wherein the first fuzzy calculating device 163 is arranged.

In FIG. 28, the single-lens reflex camera comprises a microprocessor 164. The microprocessor 164 operates according to a program stored in a ROM 165. The microprocessor 164 outputs instructions for the visual axis detecting device 110, the tracking device 155, a focusing controlling mechanism 166, and an exposure controlling mechanism 167 according to the position of visual axis obtained by the visual axis detecting device 110, and the position of object detected by the tracking device 155, thereby controlling the respective portions of the camera.

The focusing controlling mechanism 166 corresponds to a focusing controlling device, and is constituted by a focus discriminating device 168, a lens driving mechanism 169, and a half mirror 170. The half mirror 170 reflects some of light components transmitted through the half mirror 102 toward the focus discriminating device 168.

The focus discriminating device 168 forms an image corresponding to the field on two two-dimensional CCD image sensors (to be simply referred to as CCDs hereinafter) 172a and 172b by two separator lenses 171a and 171b. A correlation calculating circuit 173 calculates a correlation of outputs from arbitrary portions of these CCDs 172a and 172b. Each of the above-mentioned two CCDs 172a and 172b can consist of n×m elements like in the above-mentioned CCD 114.

The exposure controlling mechanism 167 is constituted by a reading circuit 174, and an exposure controlling device consisting of an exposure value calculating portion 175, and a mechanical controlling portion 122. The reading circuit 174 reads out the output from the designated element of the CCD 107 according to the instruction from the microprocessor 164, and the read-out output is subjected to exposure calculating processing by the exposure value calculating portion 175. The exposure value calculating portion 175 calculates, using the outputs R(X,Y), G(X,Y), and B(X,Y) from the CCD 107 and predetermined constants $K_1$, $K_2$, and $K_3$, a brightness value BV given by:

$$BV = K_1 \times B(X,Y) + K_2 \times G(X,Y) + K_3 \times R(X,Y)$$

The exposure value calculating portion 175 obtains an exposure value conforming to the object on the basis of the brightness value BV. The mechanical controlling portion 122 controls operations of a diaphragm 123 provided to the taking lens 101 and a shutter (not shown) on the basis of the exposure value obtained by the exposure value calculating portion 175 like in the conventional camera.

The operation of the entire single-lens reflex camera shown in FIG. 28 will be described below.

Figure 34:
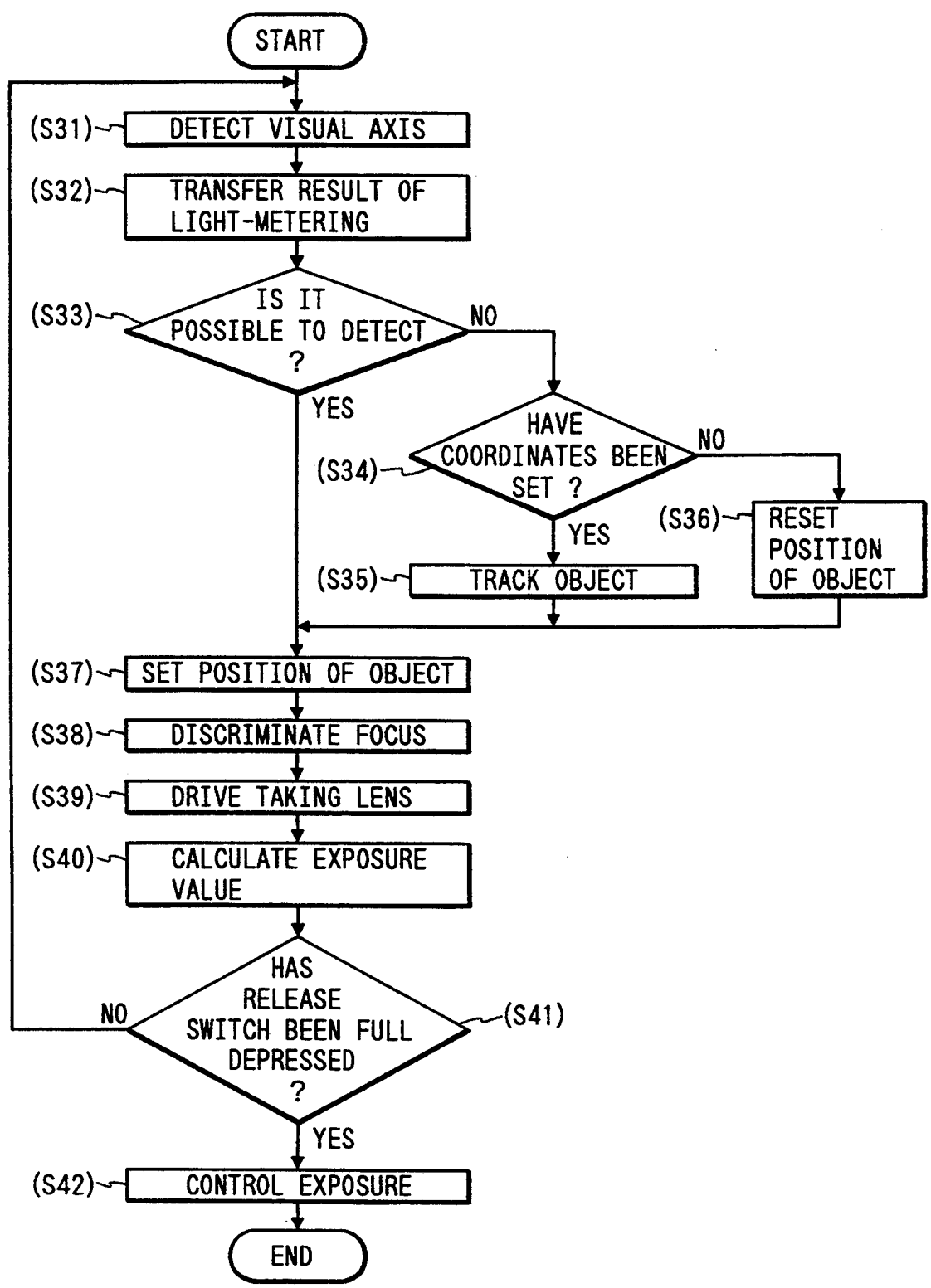
FIG. 34 is a flow chart showing the overall operation of the single-lens reflex camera.

FIG. 34 is a flow chart showing the operation of the entire single-lens reflex camera.

The microprocessor 164 starts its operation according to the program stored in the ROM 165 in response to a signal indicating that a release switch (not shown) is depressed to a half-stroke position. The microprocessor 164 instructs the visual axis detecting device 110 to start visual axis detecting processing, and instructs the light-metering device 108 to transfer the outputs from the CCD 107. The above-mentioned visual axis detecting processing is executed, and light-metering data obtained by the light-metering device 108 are transferred to the tracking device 155 (steps S31 and S32).

The microprocessor 164 checks based on the detection information from the visual axis detecting device 110 if visual axis detection is possible (step S33). If NO in step S33, the microprocessor 164 checks if the coordinates holding portion 156 of the above-mentioned tracking device 155 has already been set with the coordinates indicating the position of object (step S34).

If YES in step S34, the microprocessor 164 enables the tracking device 155, and the tracking device 155 performs the above-mentioned object tracking processing based on the coordinates indicating the position of object (step S35; see steps S21 to S24 in FIG. 31).

If NO in step S34, the microprocessor 164 executes reset processing of the position of object-(step S36). For example, the microprocessor 164 displays an alarm mark indicating that the position of object is reset outside a frame corresponding to the field in the finder, and urges a photographer to depress a reset switch (not shown) in a state wherein the object is located at the central portion of the frame. The microprocessor 164 then sets the coordinates corresponding to the center of the frame as the position of object according to depression of the reset switch.

In this manner, the position of object is obtained according to whether or not visual axis detection is possible, and the presence/absence of information of the position of object, and the obtained position of object is held as a position of new object (step S37). In this case, the microprocessor 164 realizes the functions of a deciding device 30 and a selecting device 31, and a proper position of object is selected in steps S33 to S37 described above. At this time, the coordinates holding portion 156 and the spectrum information holding portion 157 of the tracking device 155 can be set with the coordinates indicating the position of object, and the spectrum information at the position of object, respectively.

The position of new object obtained in this manner are supplied to the focus discriminating device 168 of the focusing controlling mechanism 166 and the reading circuit 174 of the exposure controlling mechanism 167. At this time, the microprocessor 164 instructs the focus discriminating device 168 to use the above-mentioned position of object and its surrounding portion as a correlation calculating area, and instructs the reading circuit 174 to read out the outputs from the element of the CCD 107 corresponding to the position of object.

The correlation calculating circuit 173 of the focus discriminating device 168 calculates a correlation of the outputs from the CCDs 172a and 172b corresponding to an area consisting of p×q elements including the position of object, and supplies the calculated correlation as the discrimination of the focus state to the lens driving mechanism 169 (step S38). The lens driving mechanism 169 drives the taking lens 101 to the focus position according to this discrimination result (step S39).

Upon operation of the reading circuit 174 according to the instruction from the microprocessor 164, a function of a first extracting device is realized by the microprocessor 164 and the reading circuit 174. Thus, the outputs from the element corresponding to the position of object of the CCD 107 are extracted, and are supplied to the exposure value calculating portion 175.

The exposure value calculating portion 175 executes processing for calculating an exposure value from the input light-metering result (step S40) to obtain an exposure value conforming to the position of object. The position of object is supplied to the mechanical controlling portion 122.

The microprocessor 164 then checks if the release switch is fully depressed (step S41). If YES in step S41, the microprocessor 164 instructs the mechanical controlling portion 122 to perform an exposure controlling operation corresponding to the exposure value obtained in step S40. The mechanical controlling portion 122 executes the controlling operation of a diaphragm and a shutter (neither are shown) (step S42).

If NO in step S41, the flow returns to step S31 to repeat the tracking operation of the object, the focusing controlling operation, and the exposure value calculating operation.

In this case, since the position of object can be reliably set upon execution of step S37 for the first time, the position of object can be tracked by the tracking device 155 regardless of whether or not the position of visual axis can be detected.

In this manner, since exposure control and focusing control can be performed on the basis of the position of latest object even while a photographer gazes at information displayed outside the frame, or blinks, the camera can be prevented from becoming uncontrollable when the position of visual axis cannot be detected.

Note that an extracting device may extract the outputs from the elements of the CCD 107 corresponding to a predetermined area including the position of object, and an exposure value may be calculated from the brightness value obtained based on the outputs from these elements.

For example, the microprocessor 164 may instruct the reading circuit 174 to read out outputs from r×s elements including the element of the CCD 107 corresponding to the position of object. The exposure value calculating portion 175 may calculate an exposure value using, as a brightness value of the object, the average value of brightness values which are obtained from the outputs from the elements and input from the reading circuit 174.

In this manner, the exposure value can be calculated in consideration of not only the position of object but also the brightness of its surrounding portion.

Furthermore, if light-metering results of the object portion can be completely extracted from those of the light-metering device 108, the exposure value calculating portion 175 can calculate an exposure value further conforming to the object.

A method of extracting light-metering result of the object portion from those of the light-metering device 108 will be described below.

Figure 35:
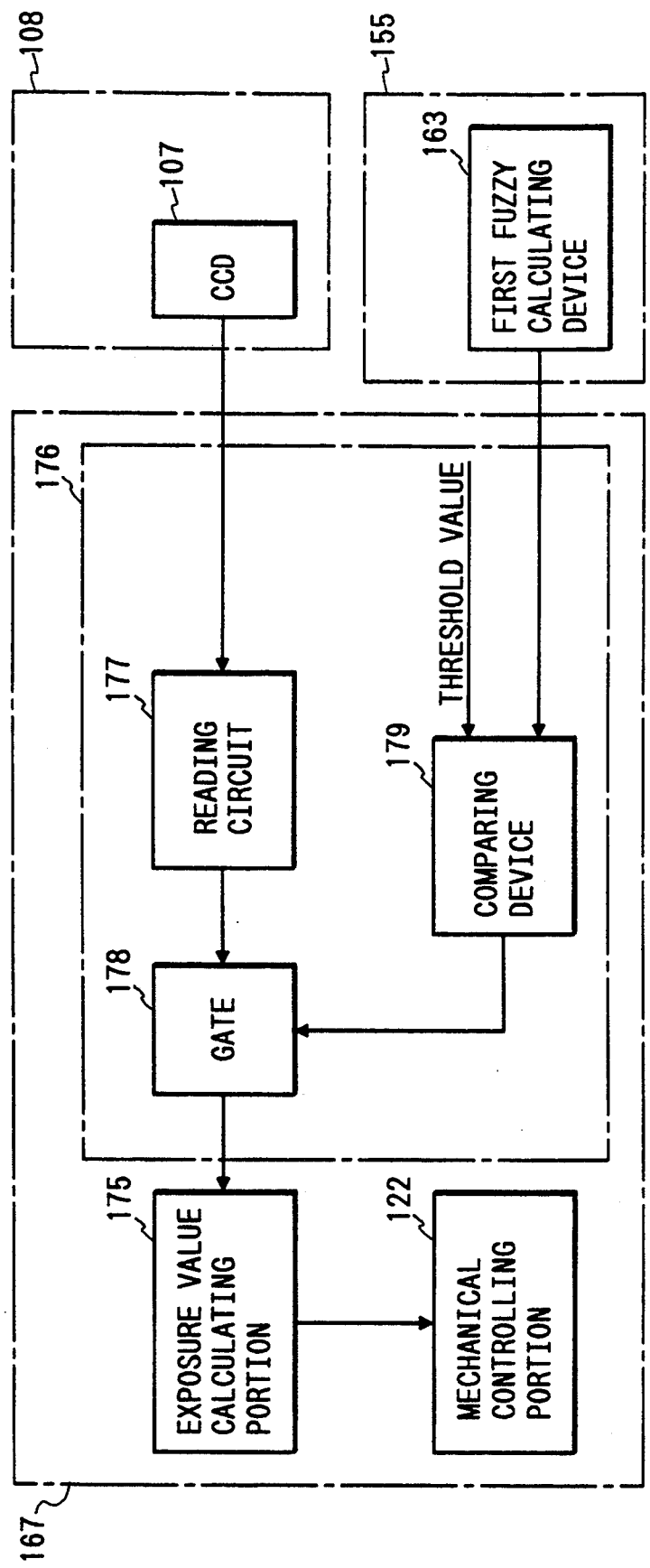
FIG. 35 is a diagram showing an arrangement of another embodiment of an exposure controlling mechanism adopting the present invention.

FIG. 35 shows another embodiment of the exposure controlling mechanism adopting the present invention.

In FIG. 35, the exposure controlling mechanism comprises an extracting circuit 176 corresponding to a second extracting device in place of the reading circuit 174. The degrees S(X,Y) of conformity obtained in correspondence with the elements of the CCD 107 are sequentially input from the composing portion 161 of the above-mentioned tracking device 155 to the extracting circuit 176.

In the extracting circuit 176, a reading circuit 177 sequentially reads out the outputs from the corresponding elements of the CCD 107 in synchronism with the input degrees S(X,Y) of conformity, and supplies the readout outputs to a gate 178. When a comparing device 179 determines that the degree S(X,Y) of conformity corresponding to each element is larger than a predetermined threshold value, the gate 178 outputs the input data. In this manner, the light-metering results corresponding to the degrees S(X,Y) of conformity larger than the predetermined threshold value can be extracted.

The degree S(X,Y) of conformity obtained in step S23 indicates a degree of the elementary area of the field corresponding to the element of the CCD 107 indicated by the coordinates (X,Y) being a position where the position of previously detected object is moved, and also indicates an index corresponding to a degree of the elementary area being present in the object portion in the field.

In this case, the above-mentioned fuzzy calculating device 163 also realizes the function of a second fuzzy calculating device. In this case, however, since the first fuzzy calculating device 163 executes calculating processing regardless of the discrimination result in step S33, the program stored in the ROM 165 must be changed so that the microprocessor 164 instructs the tracking device 155 to execute the tracking processing regardless of the discrimination result in step S33.

Figure 36A:
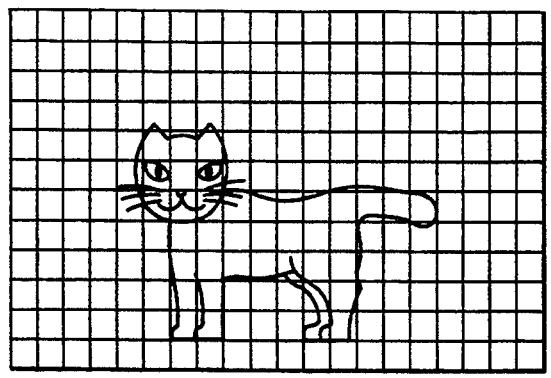
FIGS. 36A and 36B are explanatory views of object portion extraction processing.
Figure 36B:
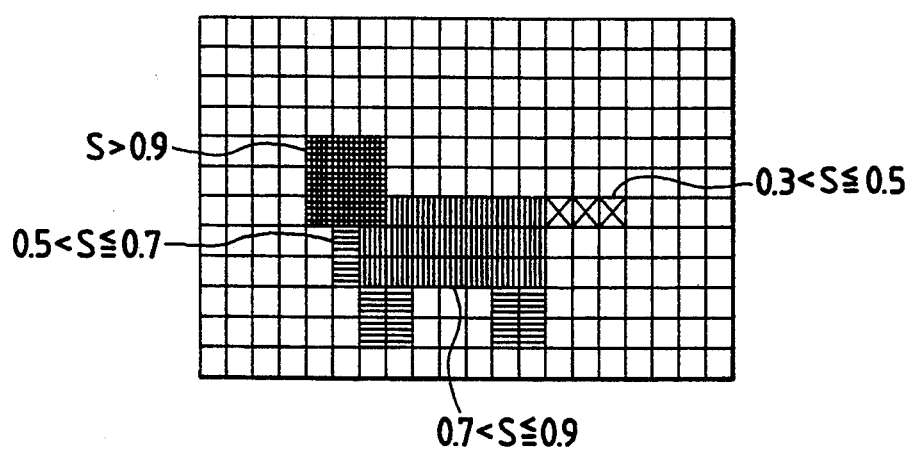

FIGS. 36A and 36B are explanatory views of extracting processing of the object portion.

For example, when an object (cat) shown in FIG. 36A is caught, and the coordinates indicating the forehead portion of the cat as the object are obtained as the position of object, the distributions of values of the degrees S(X,Y) of conformity indicated by several kinds of hatched portions in FIG. 36B are obtained by the first fuzzy calculating device 163. In FIG. 36B, a non-hatched portion indicates that the value of the degree S(X,Y) of conformity is equal to or smaller than 0.3.

In this case, if a threshold value "0.3" is set in the comparator 179, the outputs from the elements of the CCD 107 corresponding to a portion surrounded by a solid line in FIG. 36A are supplied to the exposure value calculating portion 175 through the gate 178.

When the outputs from the elements of the CCD 107 corresponding to the degrees S(X,Y) of conformity larger than the threshold value are extracted in this manner, almost all light-metering results corresponding to the object portion can be extracted.

Therefore, the exposure value calculating portion 175 calculates the exposure value on the basis of the light-metering results extracted by the extracting circuit 176 like in the above embodiment, thus obtaining the exposure value further conforming to the brightness of the object portion.

If the value of the degree S(X,Y) of conformity is equal to or larger than 0.8, it is almost sure that the corresponding elementary area is present in the object. On the other hand, if the value of the degree S(X,Y) of conformity is equal to or larger than 0.3, it is doubtful if the corresponding elementary area is present in the object. Therefore, if the light-metering results corresponding to elementary areas having different values of the degrees S(X,Y) of conformity are equivalently processed, an exposure value truly conforming to an object may not be obtained.

A method of calculating an exposure value in consideration of differences in values of the degrees S(X,Y) of conformity will be described below.

Figure 37:
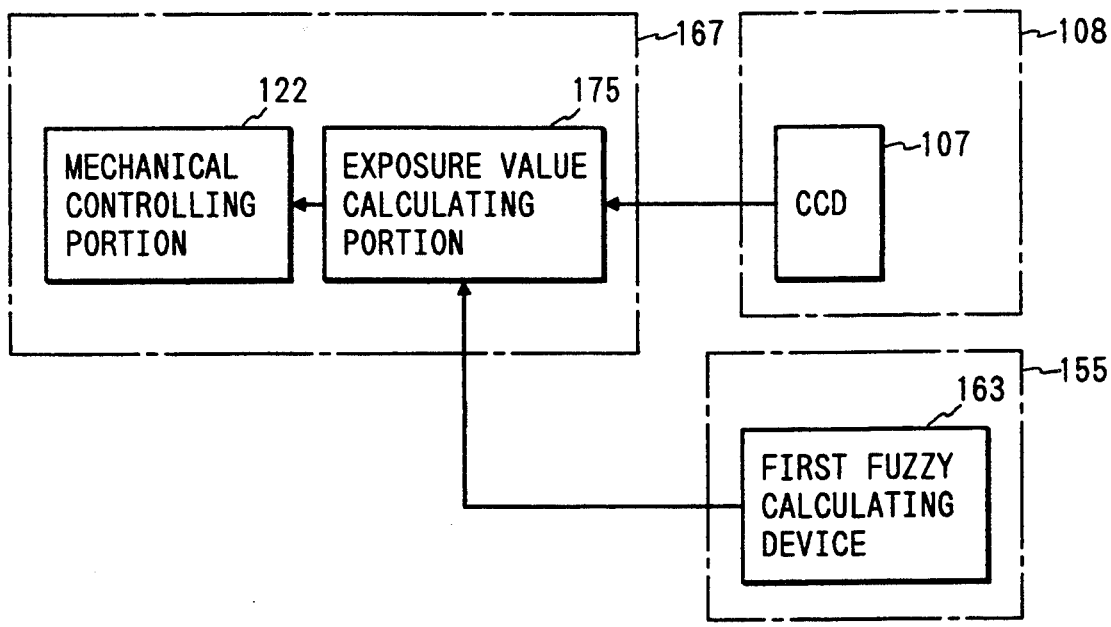
FIG. 37 is a diagram showing an arrangement of still another embodiment of an exposure controlling mechanism adopting the present invention.
Figure 38:
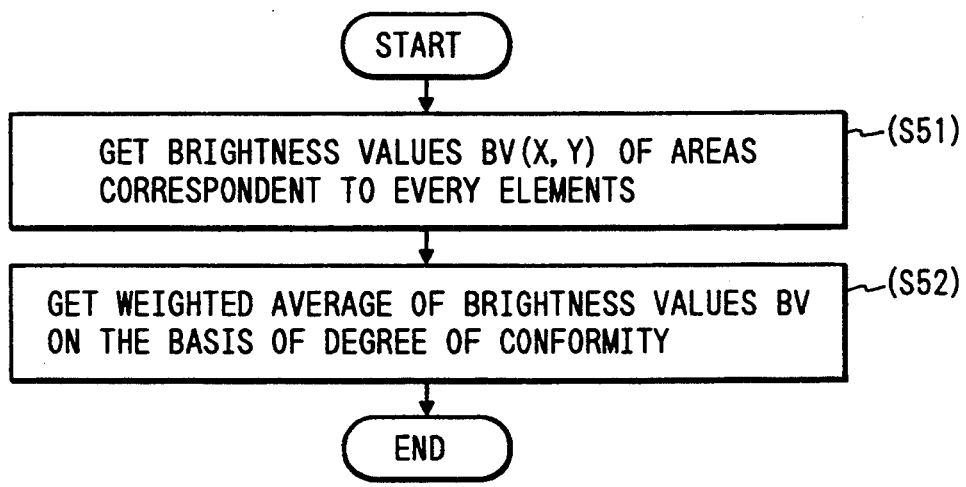
FIG. 38 is a flow chart showing exposure calculating processing.

FIG. 37 shows the arrangement of still another embodiment of the exposure controlling mechanism adopting the present invention. FIG. 38 is a flow chart showing exposure calculating processing.

In FIG. 37, the light-metering results from the light-metering device 108, and the degrees S(X,Y) of conformity obtained by the first fuzzy calculating device 163 are directly input to the exposure value calculating portion 175. In this case, the first fuzzy calculating device 163 also realizes the function of the second fuzzy calculating device like in the embodiment shown in FIG. 35.

In this case, the exposure value calculating portion 175 can calculate brightness values BV(X,Y) in the elementary areas corresponding to the elements on the basis of the outputs from the CCD 107 of the light-metering device 108 (step S51). In step S52, the exposure value calculating portion 175 can calculate, using the obtained brightness values BV(X,Y) and corresponding degrees S(X,Y) of conformity, an exposure value BVa given by:

$$BVa = \frac{\sum_{X=1}^{n} \sum_{Y=1}^{m} \{S(X,Y) \times BV(X,Y)\}}{\sum_{X=1}^{n} \sum_{Y=1}^{m} S(X,Y)}$$

In this manner, when weighted average processing of the brightness value BV(X,Y) of the elementary areas is performed using the degrees S(X,Y) of conformity as weights, the exposure value BVa considering differences of degrees of each elementary area of the field being an object can be calculated, and exposure control conforming to the object can be performed.

In the above embodiment, when the exposure value calculating portion 175 executes processing in step S52, it serves as the function of a weighting device. Alternatively, the weighting device may be arranged in addition to the exposure value calculating portion 175.

Figure 39:
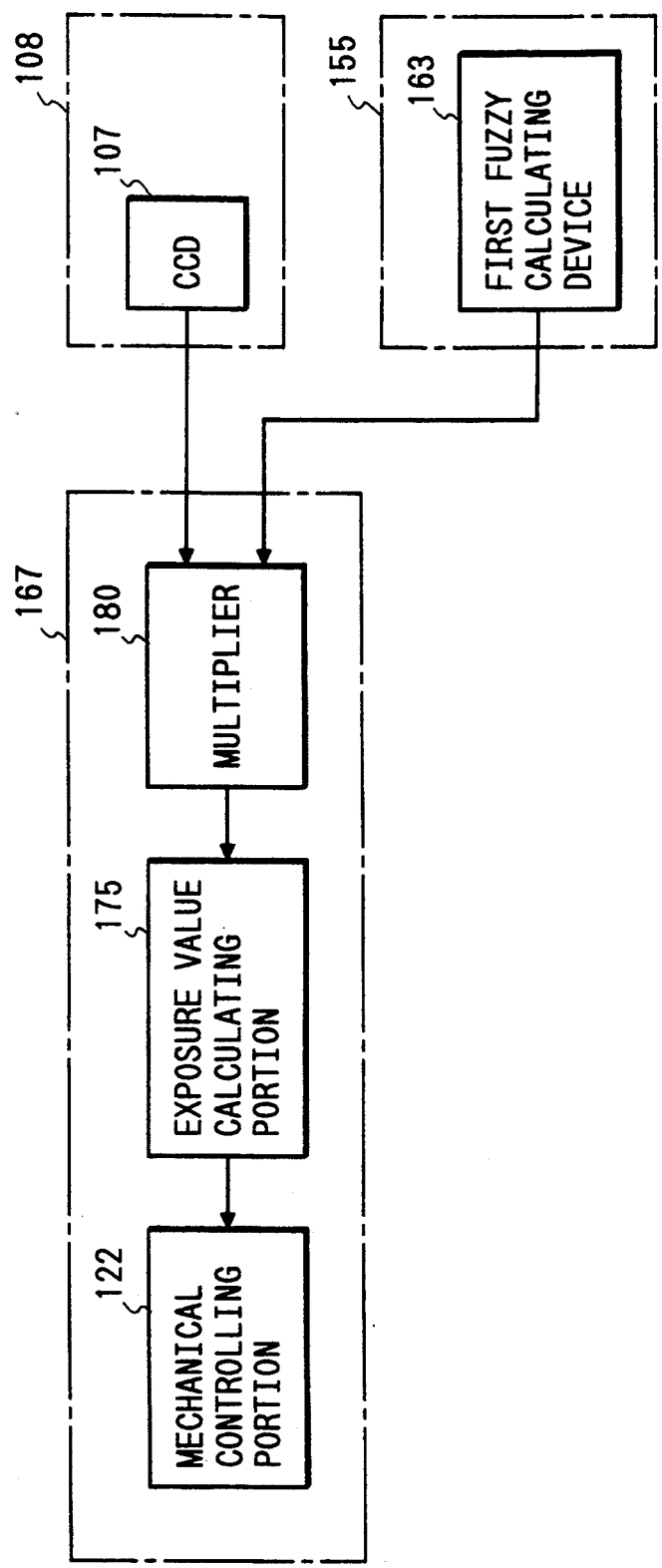
FIG. 39 is a diagram showing an arrangement of still another embodiment of an exposure controlling mechanism adopting the present invention.

For example, as shown in FIG. 39, the outputs R(X,Y), G(X,Y), and B(X,Y) of each element of the CCD 107 are multiplied with the corresponding degree S(X,Y) of conformity using a multiplier 180, and the products may be input to the exposure value calculating portion 175 as light-metering results.

In this case, the exposure value calculating portion 175 can calculate brightness values of the elementary areas on the basis of the input light-metering results, and can then calculate an exposure value based on the calculated brightness values.

When this arrangement is employed, the exposure value BVa considering differences of degrees of each elementary area of the field being an object can be obtained, and exposure control conforming to the object can be performed.

In the above embodiment, the present invention is applied to the single-lens reflex camera. However, the present invention is not limited to the single-lens reflex camera, but may be applied to a compact camera or a movie camera. That is, the present invention can be applied to any other arrangements as long as the tracking device executes the above-mentioned tracking processing on the basis of light-metering results from the light-metering means for measuring the intensity distribution in the field so as to obtain the position of object, and tracks the position of object.

The present invention is not limited to the arrangement which has the light-metering device arranged in the finder system. For example, in a movie camera or an electronic still camera, a CCD image sensor as an image pickup medium may be used as a light-metering device.

As described above, according to the present invention, since the light-metering device and the tracking device track the position of object independently of the visual axis detecting device, if visual axis detection by the visual axis detecting device is disabled, the position of object obtained by the tracking device can be selected, so that the position of latest object can always be used in exposure control and focusing control.

When fuzzy calculations are adopted in the tracking processing, the position of object can be evaluated and tracked using qualitative indices in consideration of fuzziness of the instantaneous position of the object, which always moves. Thus, the position of object can be reliably tracked.

Furthermore, since fuzzy calculations are adopted in exposure value calculating processing, and light-metering results corresponding to the object portion are extracted (or are weighted according to the degrees of conformity), an exposure value further conforming to the object can be obtained.

Figure 40:
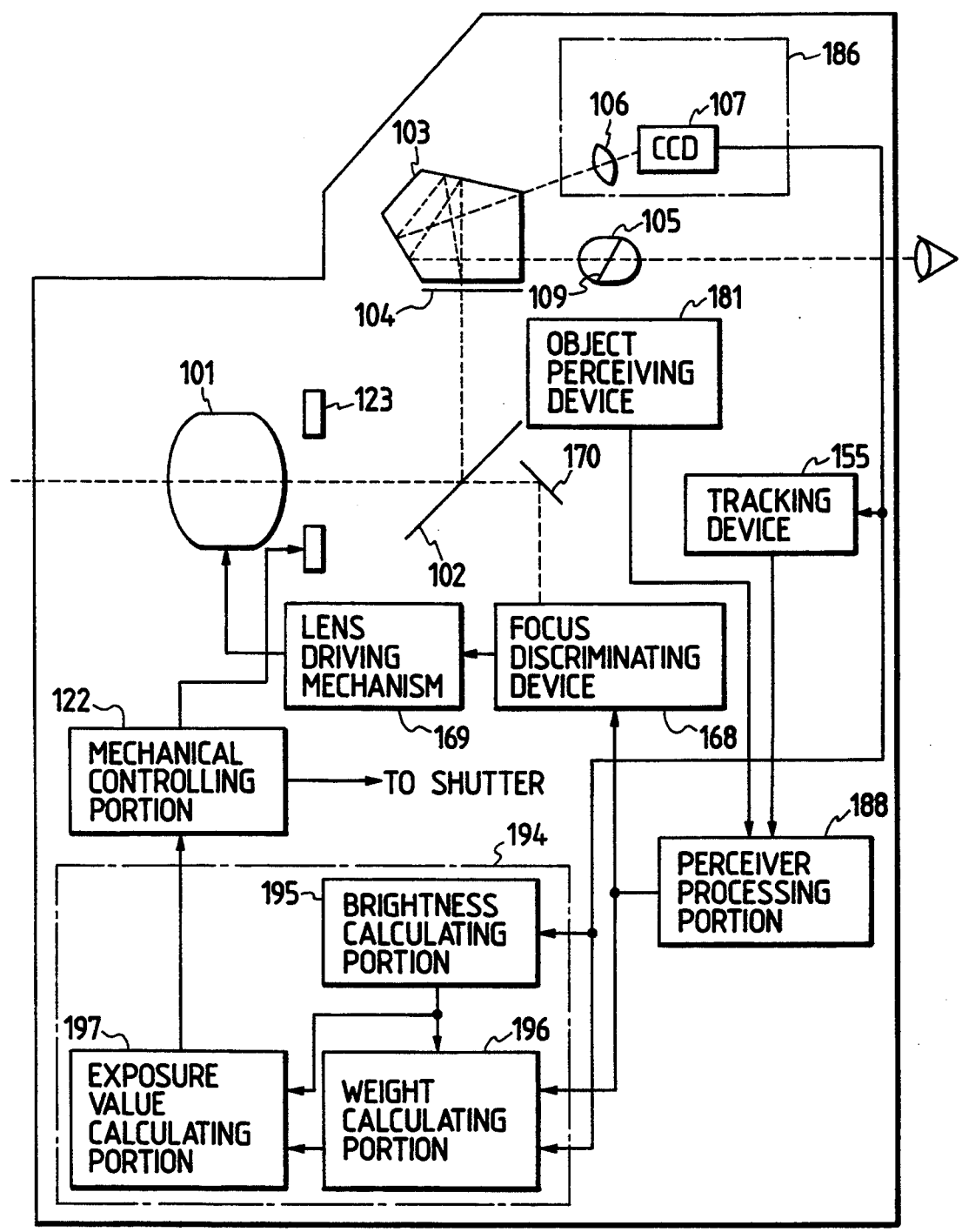
FIG. 40 is a diagram showing an arrangement of still another embodiment of a single-lens reflex camera adopting the present invention.

FIG. 40 shows the arrangement of still another embodiment of a single-lens reflex camera adopting an object perceiving apparatus of the present invention.

The same reference numerals in FIG. 40 denote the same parts as in FIG. 28, and a detailed description thereof will be omitted.

A beam splitter (BS) 109 is arranged in an eyepiece lens 105, and an object perceiving device 181 observes the movement of the eyeball of a photographer through the eyepiece lens 105.

Figure 41:
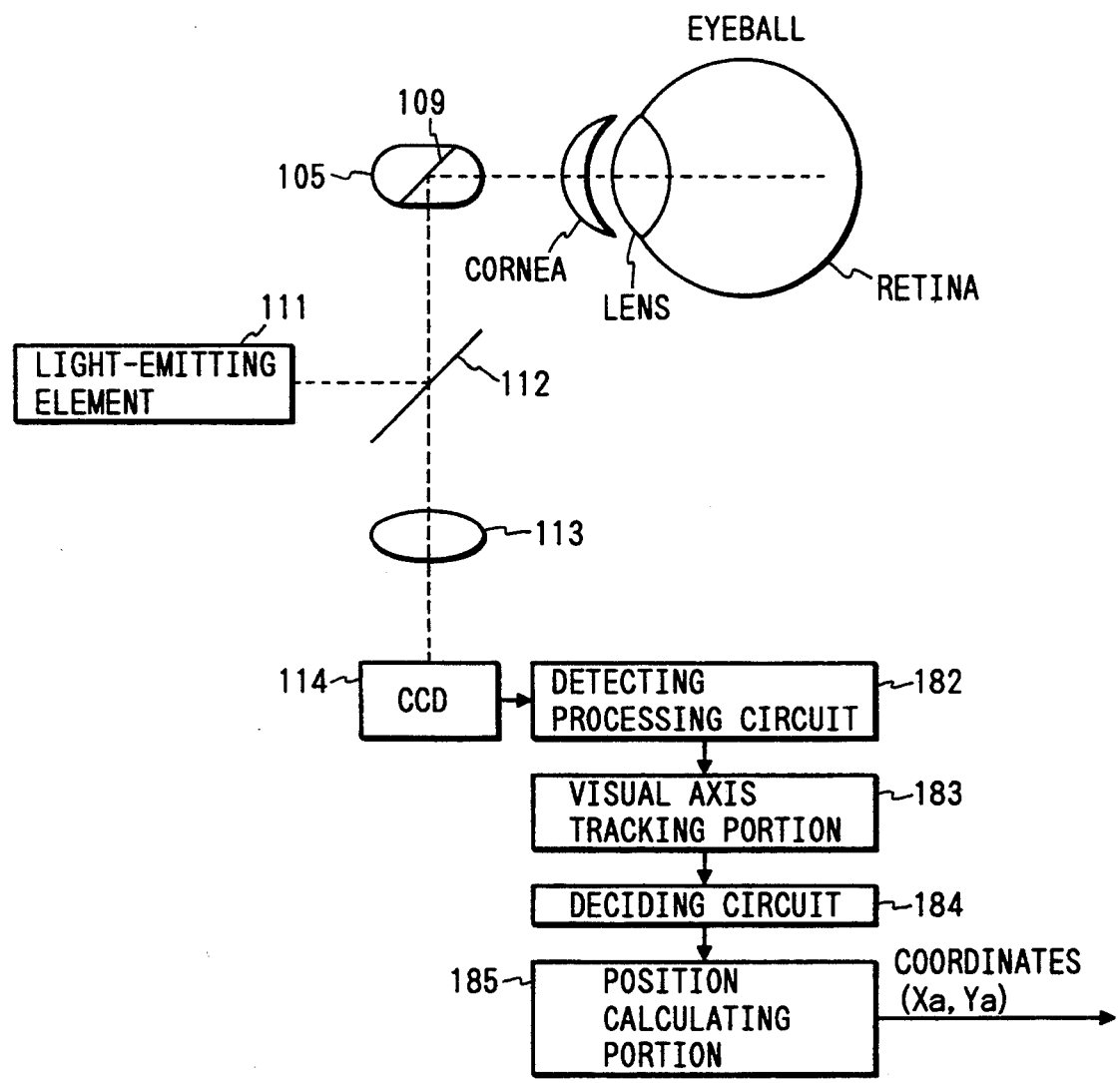
FIG. 41 is a diagram showing the details of the arrangement of an object perceiving device.
Figure 42:
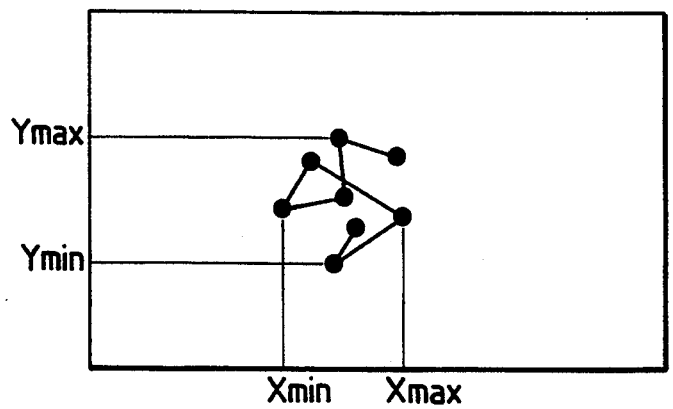
FIG. 42 is a view showing movement of a position of visual axis.

FIG. 41 shows the details of the arrangement of the object perceiving device 181. The same reference numerals in FIG. 41 denote the same parts as in FIG. 10, and a detailed description thereof will be omitted.

For example, the field of a taking lens 101 is divided into n×m elementary areas, and the magnification of a lens 113 is determined, so that the elementary areas correspond to elements of a CCD 114. Thus, the position of visual axis can be detected as the coordinates of the element corresponding to a maximal value.

In this case, a detecting processing circuit 182 is arranged to sequentially compare the outputs from the CCD 114 to detect the maximal value, and the coordinates of the corresponding element can be output as the position of visual axis.

Since the eyeball of the photographer always moves, the position of visual axis obtained as described above always moves upon movement of the eyeball. However, when an object is determined, the photographer gazes at the object, the moving range of the position of visual axis during this interval is concentrated on a relatively small area. More specifically, when a state wherein the visual axis position is concentrated in a predetermined range continues over a predetermined period of time, it can be considered that the photographer gazes at the object. Therefore, when the moving range of the position of visual axis for a predetermined period of time T is smaller than a predetermined size, it is determined that the photographer gazes at the object, and the position of the object can be obtained from this range.

For example, the coordinates of the position of visual axis obtained by the detecting processing circuit 182 are input to a visual axis tracking portion 183, and the visual axis tracking portion 183 obtains maximum values Xmax and Ymax and minimum values Xmin and Ymin of the coordinate components at predetermined time intervals T (e.g., 1 sec), and a deciding circuit 184 can decide based on these values whether or not the photographer gazes at the object. The deciding circuit 184 calculates differences between the maximum and minimum values of the coordinate components. When both the differences are smaller than a predetermined threshold value, the deciding circuit 184 can decide that the photographer gazes at the object; when at least one difference is equal to or larger than the threshold value, it can decide that the photographer does not gaze at the object. A position calculating portion 185 calculates intermediate values between the maximum and minimum values of the coordinate components according to this decision result, and outputs the intermediate values as coordinates (Xa,Ya) indicating the position of the object.

In this manner, the gazing position of the photographer can be obtained as the position of object on the basis of the position of visual axis which changes in correspondence with the movement of the eyeball of the photographer.

The visual axis tracking portion 183 may hold the coordinates of the position of visual axis, and the position calculating portion 185 may calculate an average value of these coordinates as the position of object.

In FIG. 40, since an image on a focusing screen 109 corresponds to the field of the taking lens 101, the outputs from the CCD 107 represent colors in elementary areas of the field of the taking lens 101. More specifically, the lens 106 and the CCD 107 can realize the function of a color discriminating device 186, and outputs r(X,Y), g(X,Y), and b(X,Y) from the CCD 107 can be supplied to a tracking device 155 as discrimination results.

A method of tracking the position of object on the basis of the above-mentioned spectrum information will be described below.

When the position of object at given time is given as coordinates (Xb,Yb) in the field, it is considered that the position of object after an elapse of a time Δt from the given time is near the above-mentioned coordinates (Xb,Yb) when the time Δt is short. It is also considered that the spectral characteristics representing the colors of the object are almost constant.

Therefore, the tracking device 155 can determine, as a position having a feature corresponding to the object, a position which is near the position of previously detected object, and has approximate spectral characteristics, and can track this position.

Figure 43:
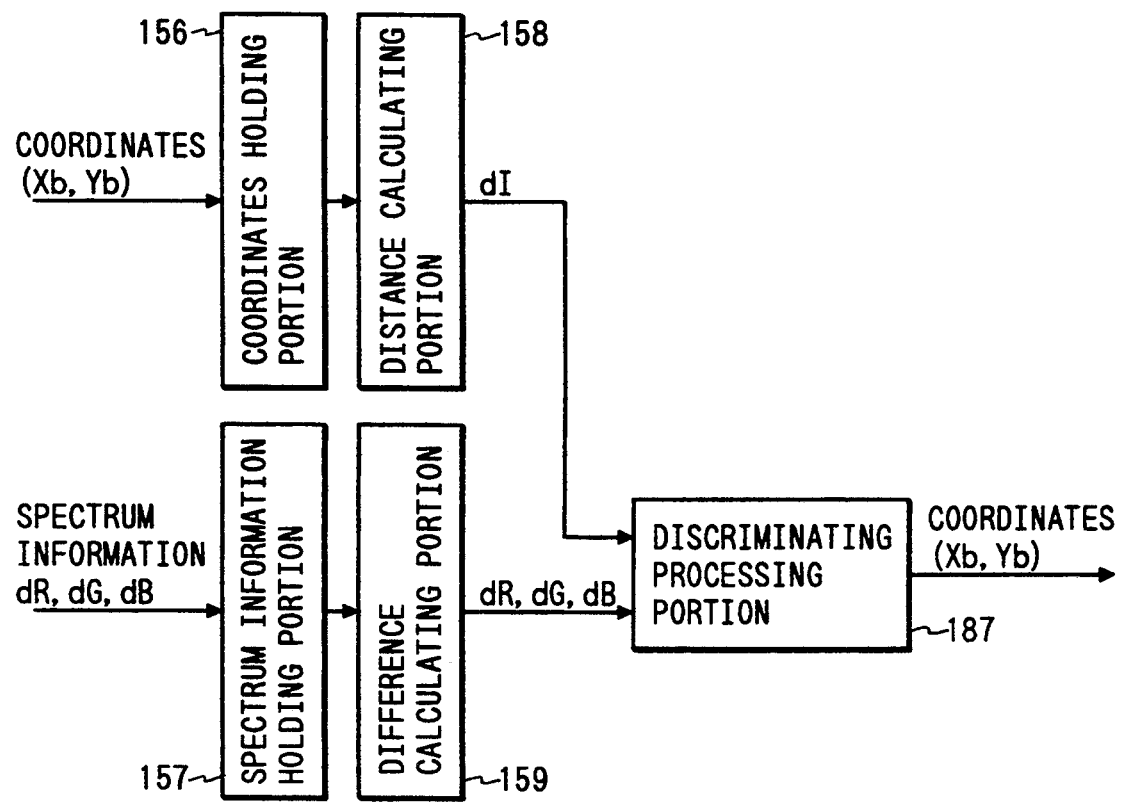
FIG. 43 is a diagram showing the details of the arrangement of a tracking device.
Figure 44:
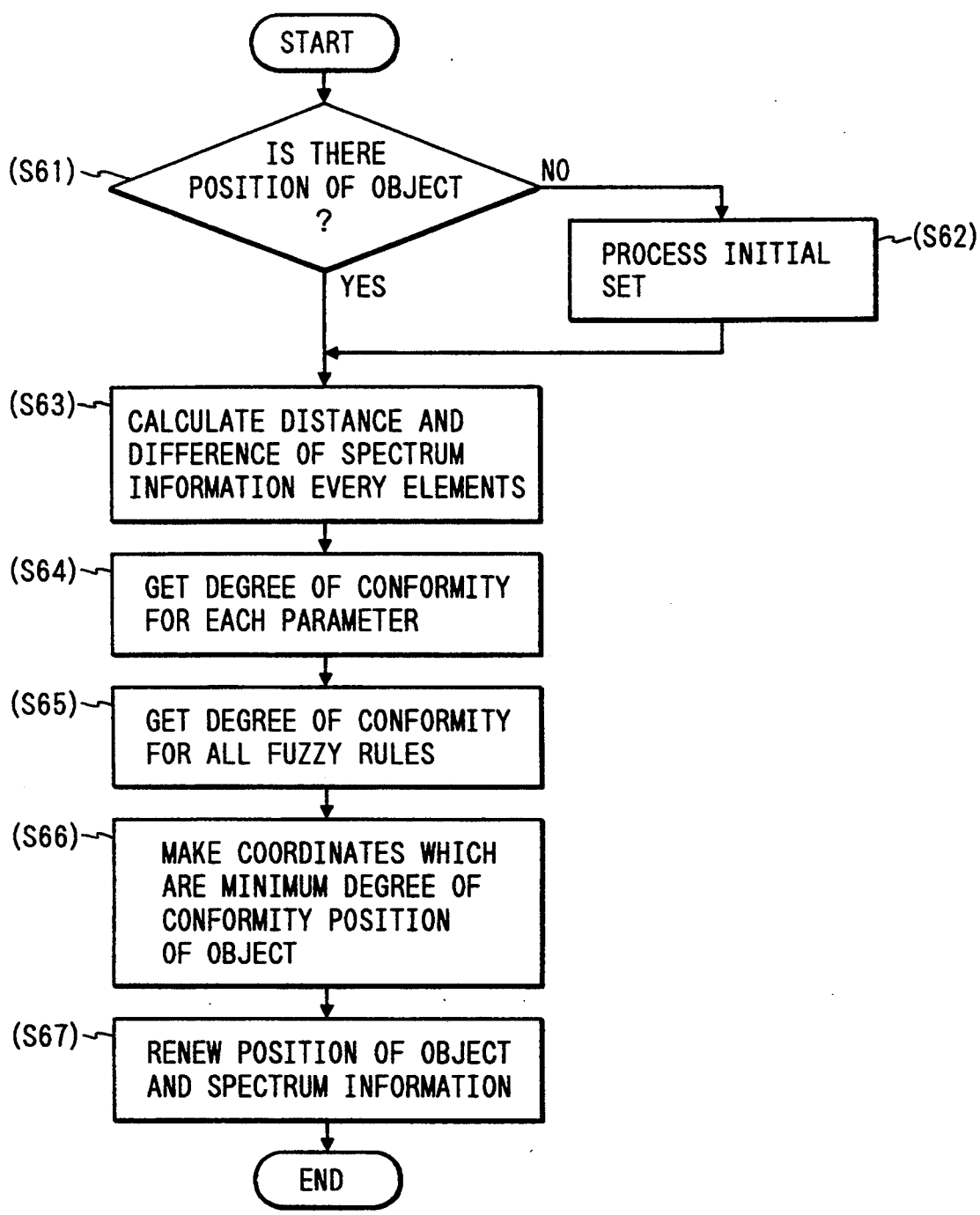
FIG. 44 is a flow chart showing tracking processing.

FIG. 43 shows the details of the arrangement of the tracking device 155. FIG. 44 is a flow chart showing tracking processing. The same reference numerals in FIG. 43 denote the same parts as in FIG. 30, and a detailed description thereof will be omitted.

It is checked if a coordinates holding portion 156 and a spectrum information holding portion 157 hold the coordinates and spectrum information of the object (step S61).

When the tracking processing by the tracking device 155 is started, since no information associated with the object is set, NO is always determined in step S61, and in step S62, the coordinates indicating a specific position in the field (e.g., the center of the field), and the outputs from the corresponding element of the CCD 107 are respectively set as initial values in the coordinates holding portion 156 and the spectrum information holding portion 157. In this case, the following tracking processing is executed under an assumption that the object is present at the above-mentioned position.

Since it is considered that the photographer gazes at the object at the beginning of the tracking processing, the coordinates obtained by the object perceiving device 181 may be held in the coordinates holding portion 156, and the outputs from the CCD 107 corresponding to the held coordinates may be held in the spectrum information holding portion 157. In this case, since the gazing position of the photographer is set as an initial position, the object can be accurately caught and tracked from the beginning.

An alarm mark indicating that the position of object is reset may be displayed outside the frame corresponding to the field in the finder so as to urge the photographer to depress a reset switch (not shown) in a state wherein the object is located at the central portion of the frame. In this case, the coordinates corresponding to the center of the frame, and the outputs from the corresponding element of the CCD 107 can be set upon depression of the reset switch.

If YES in step S61, a distance calculating portion 158 calculates a distance between the position of object and each elementary area of the field, and a difference calculating portion 159 calculates a difference between spectrum information representing colors of each elementary area of the field and spectrum information representing colors at the position of object (step S63).

As described above, the elements of the CCD 107 correspond to the elementary areas of the field. Therefore, the distance calculating portion 158 can calculate a distance dI obtained by standardizing a distance between the element of the CCD 107 indicated by the above-mentioned coordinates (Xb,Yb) and another element with a maximum distance Imax $(=\{(X_n-X_1)^2+(Y_mY_1)^2\}^{\frac{1}{2}})$ in place of the distance in the field. More specifically, the distance calculating portion 158 calculates, using the maximum distance Imax and coordinates (X,Y) of each element, a distance dI(X,Y) given by:

$$dI(X,Y)=\{(Xb-X)^2+(Yb-Y)^2\}^{\frac{1}{2}}/Imax$$

The distance calculating portion 158 then supplies the calculated distance to a discriminating processing portion 187. The maximum distance Imax is expressed as follows using the coordinates $(X_1,Y_1)$ and $(X_n,Y_m)$ of the two elements at opposing corners on the diagonal line of the CCD 107:

$$Imax=\{(X_n-X_1)^2+(Y_m-Y_1)^2\}^{\frac{1}{2}}$$

The difference calculating portion 159 obtains spectrum information values R(X,Y), G(X,Y), and B(X,Y) representing colors of each elementary area from the outputs from each element of the CCD 107, and subtracts spectrum information values of the object from these spectrum information values to obtain differences dR(X,Y), dG(X,Y), and dB(X,Y) respectively given by:

$$dR(X,Y)=R(Xa,Ya)-R(X,Y)$$

$$dG(X,Y)=G(Xa,Ya)-G(X,Y)$$

$$dB(X,Y)=B(Xa,Ya)-B(X,Y)$$

The difference calculating portion 159 can supply the calculated differences dR(X,Y), dG(X,Y), and dB(X,Y) to the discriminating processing portion 187.

The discriminating processing portion 187 executes fuzzy calculating processing using the distance dI and the differences dR, dG, and dB of spectrum information as parameters so as to discriminate a position corresponding to the object, and determines the corresponding position as a position of new object.

Degrees of conformity for the if-part that the distance dI is near, and the if-parts that the differences dR, dG, and dB of the spectrum information are small are calculated based on membership functions of the parameters shown in FIGS. 32A to 32D (step S64). In step S64, the discriminating processing portion 187 can obtain values of intersections between the hedges of the membership functions corresponding to the if-parts and the corresponding parameter values, and can determine these values as the degrees of conformity for the if-parts.

Figure 32A:
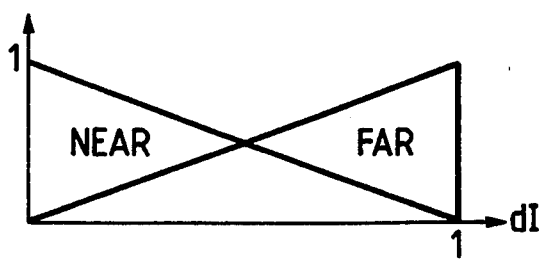
FIGS. 32A to 32E are views showing membership functions.
Figure 32B:
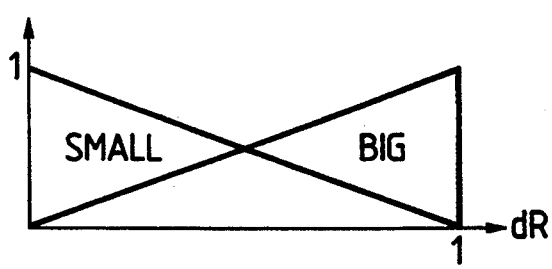
Figure 32C:
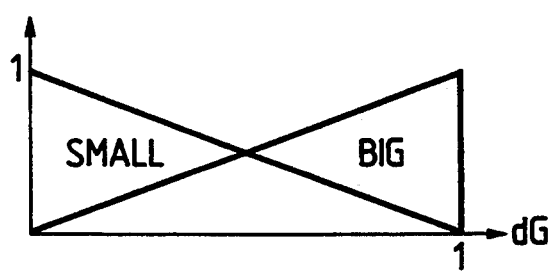
Figure 32D:
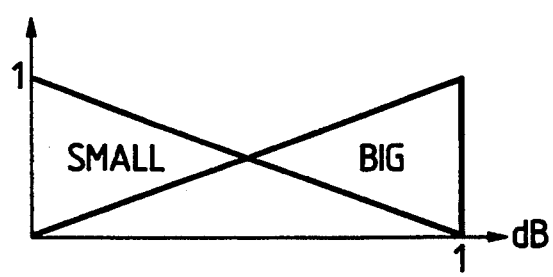
Figure 32E:
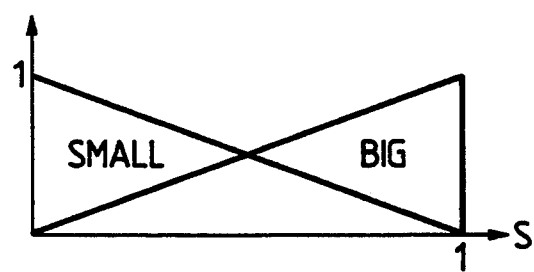

The degrees of conformity for the above-mentioned four if-parts are composed by applying the max-min composing method to the degrees of conformity corresponding to the parameters, thereby obtaining a degree S(X,Y) of conformity for the if-parts that the position of each elementary area of the field indicated by the coordinates (X,Y) is a position corresponding to the object (step S65). The max-min composing method assumes the minimum value of the degrees of conformity of the parameters as the degree of conformity of the entire fuzzy rule. Therefore, in step S65, the minimum value is selected from the degrees of conformity of the parameters, and an intersection with the corresponding hedge of a membership function for the degree S of conformity shown in FIG. 32E is obtained. The value of this intersection can be determined as the final degree S(X,Y) of conformity of the above-mentioned if-parts.

Since the degree S(X,Y) of conformity corresponding to each element of the CCD 107 obtained in this manner indicates a degree of the position of each elementary area of the field being a position corresponding to the object, the maximum value of the degrees S(X,Y) of conformity is detected (step S66), and the coordinates of the corresponding element of the CCD 107 can be determined as coordinates (Xb,Yb) indicating the position of object.

As described above, a degree of each elementary area of the field being one having colors approximate to the object, and near the position of previously obtained object is evaluated, thereby discriminating the position corresponding to the object. In this manner, the position corresponding to the object can be reliably discriminated by utilizing the fact that a change in spectrum information representing the colors of the object is relatively small even when the brightness of the object abruptly changes like in a case wherein the object moves from a shady place to a sunny place.

The discriminating processing portion 187 supplies the coordinates (Xb,Yb) obtained as described above, and the outputs from the corresponding element of the CCD 107 to the coordinates holding portion 156 and the spectrum information holding portion 157 (step S67), thereby renewing the coordinates (Xb,Yb) indicating the position of object, and spectrum information values R(Xb,Yb), G(Xb,Yb), and B(Xb,Yb) representing the colors of the object.

Therefore, when steps S61 to S67 described above are repeated, the position of object can be reliably tracked to follow the movement of the object in the field.

Note that the discriminating processing portion 187 may calculate total sums of parameters obtained in step S63, and may determine the elementary area of the field, which yield the minimum value of the total sums, as the position of object.

In this case, since the above-mentioned complicated calculating processing need not be performed, the arrangement of the discriminating processing portion 187 can be simplified, and high-speed tracking processing can be realized. However, even when only one parameter is considerably different from a parameter corresponding to the position of previous object, it may be determined as the position of object if other parameter values are approximate to each other, and an error is large as compared to the case wherein the above-mentioned fuzzy calculating processing is used.

In FIG. 40, the coordinates (Xa,Ya) obtained by the object perceiving device 181 and the coordinates (Xb,Yb) obtained by the tracking device 155 are input to a perceiver processing portion 188. The perceiver processing portion 188 determines coordinates (Xo,Yo) indicating the final position of object, and supplies the coordinates to exposure control processing and focusing control processing (to be described later).

Figure 45:
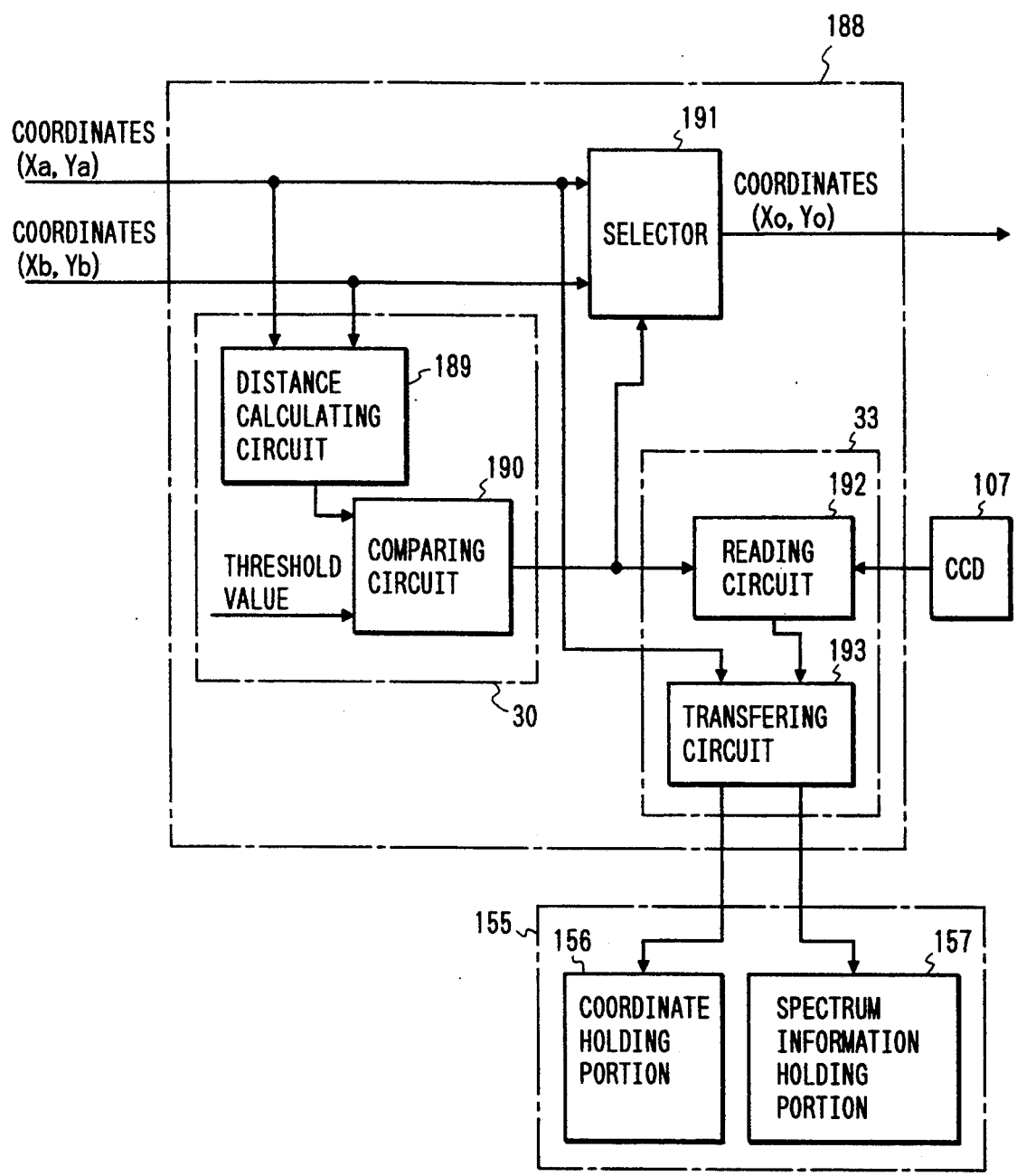
FIG. 45 is a diagram showing the details of the arrangement of a perceiver processing portion.
Figure 46:
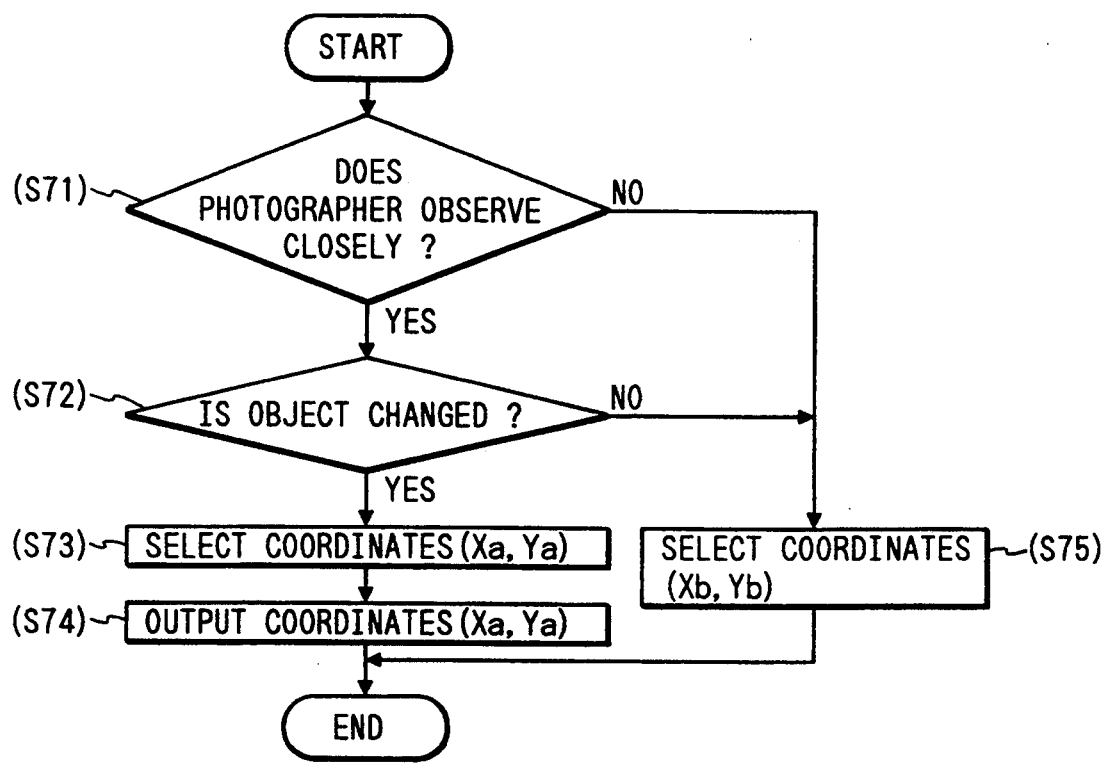
FIG. 46 is a flow chart showing processing for determining a position of object.

FIG. 45 shows the details of the arrangement of the perceiver processing portion 188. FIG. 45 is a flow chart showing processing for determining the position of object.

In FIG. 45, a distance calculating circuit 189 and a comparing circuit 190 constitute a deciding device 30. In this device, the distance calculating circuit 189 calculates a distance D between two points indicated by the two coordinates (Xa,Ya) and (Xb,Yb) obtained by the object perceiving device 181 and the tracking device 155, and the comparing circuit 190 compares the calculated distance D with a predetermined threshold value. The comparing circuit 190 receives the decision result from the deciding circuit 184 of the object perceiving device 181 described above, and executes the comparing operation according to the input decision result indicating whether or not the photographer gazes at the object.

More specifically, when the deciding circuit 184 of the object perceiving device 181 determines that there is a gazing position of the photographer, YES is determined in step S71, and the comparing circuit 190 compares the distance D obtained by the distance calculating circuit 189 with the threshold value (step S72).

In FIG. 45, a selector 191 corresponds to a selecting device 31, and selects one of the two sets of coordinates (Xa,Ya) and (Xb,Yb) as the position (Xo,Yo) according to the comparing result from the comparing circuit 190 and the decision result from the deciding circuit 184 of the object perceiving device 181.

When a value corresponding to a size occupied by a standard object (e.g., a person) in the field is set in the comparing circuit 190 as the threshold value, it can be discriminated based on the comparison result in step S72 whether or not the positions of object obtained by the object perceiving device 181 and the tracking device 155 correspond to a single object.

More specifically, if the comparing circuit 190 determines that the above-mentioned distance D exceeds the threshold value (YES in step S72), it is decided that the photographer changes an object to be gazed. Thus, the selector 191 can select the coordinates (Xa,Ya) obtained by the object perceiving device 181 according to this decision result (step S73), and can output the selected coordinates as the position (Xo,Yo) of object.

In FIG. 45, a reading circuit 192 and a transferring circuit 193 constitute a controlling device 33. The reading circuit 192 reads out the outputs from the element indicated by the coordinates (Xa,Ya) from the CCD 107 according to the decision result indicating that the object is changed. The transferring circuit 193 transfers the above-mentioned coordinates (Xa,Ya), and the outputs from the element obtained by the reading circuit 192 as coordinates (Xb,Yb) indicating a position of new object, and spectrum information values R(Xb,Yb), G(Xb,Yb), and B(Xb,Yb) representing colors of the new object to the tracking device 155 (step S74), and these data are respectively stored in the coordinates holding portion 156 and the spectrum information holding portion 157.

Thereafter, the tracking device 155 executes tracking processing of the position of object on the basis of the above-mentioned position of new object and spectrum information.

In this manner, it can be detected without omissions that the photographer changes an object. When the object is changed, a position of new object can be quickly obtained, and can be tracked.

Even when the center of the frame is set as the initial position of the object regardless of the gazing position of the photographer in step S62, the coordinates indicating the position of correctly perceived object are set by the processing in step S74, and thereafter, tracking processing of this position of object is performed.

If NO in step S71 or S72, it is considered that the photographer does not intend to change an object. Therefore, the selector 191 selects the coordinates (Xb,Yb) obtained by the tracking device 155 according to the decision result indicating that the photographer does not gaze at the object or the decision result indicating that the object is not changed (step S75), and can output the selected coordinates as the position (Xo,Yo) of object.

When it is determined that the object is not changed, the coordinates (Xb,Yb) obtained by the tracking device 155 are determined as the position of object, thereby obtaining the position of stable object while preventing the position of object from unnecessarily varying due to the random movement of the eyeball of the photographer.

In this manner, since the position of object intended by the photographer can be correctly perceived, and the position of stable object can be obtained, a good image of the object can be photographed using the position of obtained object in the exposure control processing and focusing control processing.

In FIG. 40, light transmitted through a main mirror 102 is reflected by a half mirror 170, and is then incident on a focus discriminating device 168.

Figure 33:
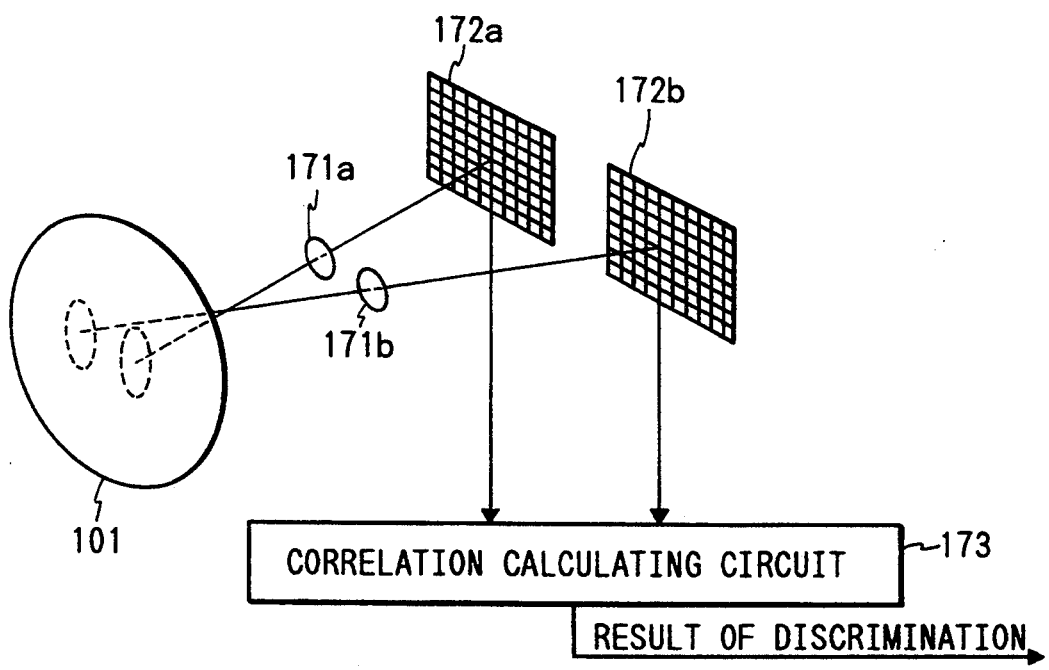
FIG. 33 is a diagram showing the details of the arrangement of a focus discriminating device.

The arrangement of the focus discriminating device 168 is shown in FIG. 33.

A correlation calculating circuit 173 can calculate a correlation between the outputs from CCDs 172a and 172b in a predetermined range including the position of object according to the input position of object obtained by the perceiver processing portion 188 described above, and can output the correlation calculation result as the discrimination result of the focus state of the object.

For example, the correlation calculating circuit 173 can calculate the correlation between the outputs from the CCDs 172a and 172b corresponding to an area consisting of p×q elements including the position (Xo,Yo) of object, and can supply the obtained correlation as the discrimination result of the focus state to a lens driving mechanism 169 shown in FIG. 40. The lens driving mechanism 169 drives a taking lens 101 to a focus position according to this discrimination result.

Thus, the focal point of the taking lens 101 can be correctly adjusted in correspondence with the movement of the object intended by the photographer.

Since the perceiver processing portion 188 can obtain the stable position of object, which correctly follows the movement of the object, the focal point position of the taking lens 101 can be prevented from being changed from time to time. As a result, the focusing control following the movement of the object can be realized, and can be stabilized.

An exposure calculating device 194 is constituted by a brightness calculating portion 195, a weight calculating portion 196, and an exposure value calculating portion 197. The brightness calculating portion 195 multiplies the outputs R(X,Y), G(X,Y), and B(X,Y) from each element of the CCD 107 with predetermined constants $K_1$, $K_2$, and $K_3$, respectively, to calculate a brightness value BV of the elementary area of the field corresponding to each element as follows:

$$BV = K_1 \times B(X,Y) + K_2 \times G(X,Y) + K_3 \times R(X,Y)$$

The weight calculating portion 196 calculates weights corresponding to the elementary areas of the field by executing processing to be described later. The exposure value calculating portion 197 executes weighted average processing of the brightness values of the elementary areas using these weights, and supplies the obtained result as an exposure value to a mechanical controlling portion 122.

Figure 47:
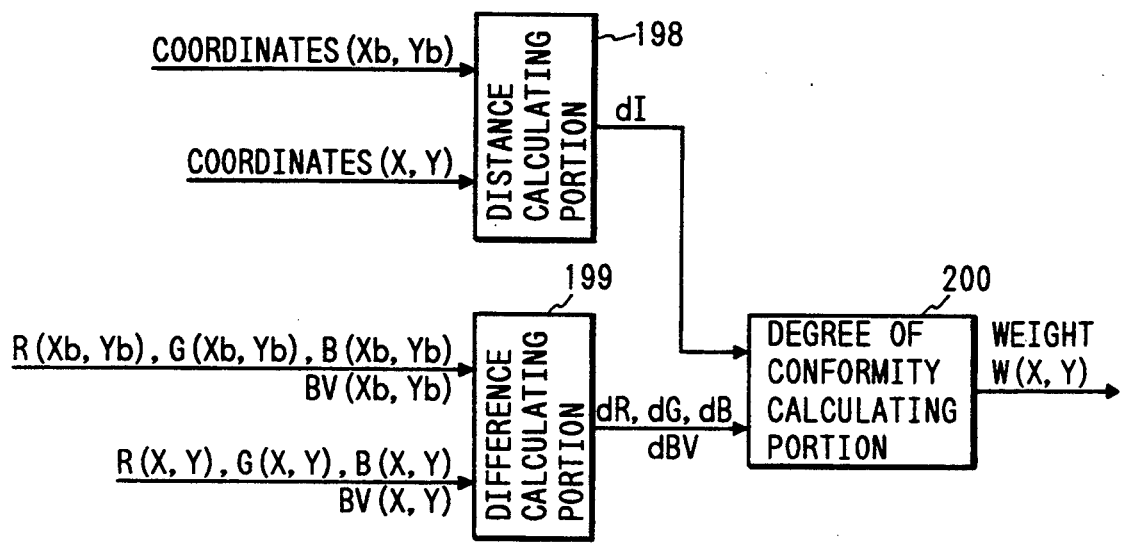
FIG. 47 is a diagram showing the details of the arrangement of a weight calculating portion.

FIG. 47 shows the details of the arrangement of the weight calculating portion 196.

In FIG. 47, the weight calculating portion 196 is constituted by a distance calculating portion 198, a difference calculating portion 199, and a degree of conformity calculating portion 200.

The distance calculating portion 198 receives the position (Xo,Yo) of object, calculates a distance dI between each element of the CCD 107 and the position (Xo,Yo) of object, and outputs the calculated distance to the degree of conformity calculating portion 200. The difference calculating portion 199 receives the outputs from the CCD 107, and the outputs from the brightness calculating portion 195 described above, and calculates differences dR, dG, and dB, and dBV given by the following equations by subtracting spectrum information and the brightness value of the object from those of each elementary area of the field:

$$dR(X,Y) = R(Xo,Yo) - R(X,Y)$$

$$dG(X,Y) = G(Xo,Yo) - G(X,Y)$$

$$dB(X,Y) = B(Xo,Yo) - B(X,Y)$$

$$dBV(X,Y) = BV(Xa,Ya) - BV(X,Y)$$

The degree of conformity calculating portion 200 applies the following fuzzy rules using the distance dI, the differences dR, dG, dB, and dBV as parameters so as to calculate a degree S(X,Y) of conformity corresponding to a degree of each elementary area of the field indicated by coordinates (X,Y) being present in an area occupied by the object in the field:

if dR(X,Y)=small and dG(X,Y)=small and dB(X,Y) =small and dI(X,Y)=near and dBV(X,Y)=small then S(X,Y)=big The degree of conformity calculating portion 200 outputs the degree S(X,Y) of conformity as a weight. As a membership function corresponding to the parameter dBV, the same membership function as those for the parameters dI, dR, dB, and dB shown in FIGS. 32A to 32D is used, and a degree of conformity of the corresponding if-part of the above-mentioned fuzzy rule need only be calculated.

In this case, an exposure value BVa obtained by the exposure value calculating portion 197 is given by:

$$BVa = \frac{\sum_{i=1}^{n} \sum_{j=1}^{m} \{S(Xi,Yj) \times BV(Xi,Yj)\}}{\sum_{i=1}^{n} \sum_{j=1}^{m} S(Xi,Yj)}$$

Contribution of brightness information of each elementary area to the exposure value BVa is determined according to the value of the degree S(X,Y) of conformity. More specifically, brightness information of an elementary area which is considered to be surely included in an area occupied by the object is reflected in the exposure value. Contrary to this, contribution of brightness information of an elementary area for which it is doubtful if the area is included in the area occupied by the object is small. Thus, since the brightness information of the object can be accurately evaluated, an exposure value conforming to the object can be obtained in correspondence with a change in brightness of the object.

In this manner, the exposure value can be calculated on the basis of the brightness information of the object intended by the photographer, and exposure control according to this exposure value can be realized.

The exposure calculating device 194 may calculate an exposure value according to the brightness of the predetermined area including the position (Xo,Yo) of object. For example, the outputs from the element corresponding to the position (Xo,Yo) of object and r×s elements around the element are read out from the CCD 107, and an exposure value is calculated using an average value of brightness values obtained from these outputs as the brightness value of the object.

In this case, since the above-mentioned complicated fuzzy calculations need not be performed, high-speed exposure calculating processing can be realized. However, in this case, brightness information of an elementary area which is not included in the object may be undesirably reflected in the exposure value.

Alternatively, elementary areas which have the values of the degrees S(X,Y) of conformity exceeding a predetermined threshold value may be extracted, and an exposure value may be calculated from only the brightness information values of the corresponding elementary areas.

For example, when an object (cat) shown in FIG. 36A is caught, and the coordinates indicating the forehead portion of the cat as the object are obtained as the position of object, the distributions of values of the degrees S(X,Y) of conformity indicated by several kinds of hatched portions in FIG. 36B are obtained by the above-mentioned weight calculating portion 196. In FIG. 36B, a non-hatched portion indicates that the value of the degree S(X,Y) of conformity is equal to or smaller than 0.3.

For example, when the above-mentioned threshold value is set to be 0.3 so as to extract the outputs from the elements of the CCD 107 corresponding to a portion surrounded by a solid line in FIG. 36A, almost all light-metering results corresponding to the object portion can be extracted, and an exposure value which reflects the brightness information of the object portion without omissions can be obtained.

The mechanical controlling portion 122 shown in FIG. 40 controls operations of a diaphragm 123 provided to the taking lens 101 and a shutter (not shown) on the basis of the exposure value obtained in this manner like in the conventional camera. The mechanical controlling portion 122 controls the aperture of the diaphragm 123 according to the exposure value, and controls the operation of the shutter in an exposure mode so as to control an exposure time.

Since the perceiver processing portion 188 can obtain the stable position (Xo,Yo) of object, the above-mentioned exposure value calculating portion 197 can obtain the stable exposure value BVa. Therefore, the mechanical controlling portion 122 can realize exposure processing following a change in brightness of the object without changing the aperture size of the diaphragm 123 from time to time, and exposure control can be stabilized.

For example, the object perceiving processing is performed when the photographer depresses a release button (not shown) to a half-stroke position, and the above-mentioned focusing control and exposure value calculating processing are performed according to the obtained position (Xo,Yo) of object. Thus, the taking lens 101 is always focused on an object, an exposure value conforming to the object is calculated, and the aperture of the diaphragm 123 is controlled. Therefore, when the above-mentioned mechanical controlling portion 122 controls the opening/closing operation of the shutter upon full depression of the release button, a good image of the object can be obtained on a photographing medium such as a film.

Note that the tracking device 155 may track the position having a brightness value approximate to that of the object.

Figure 48:
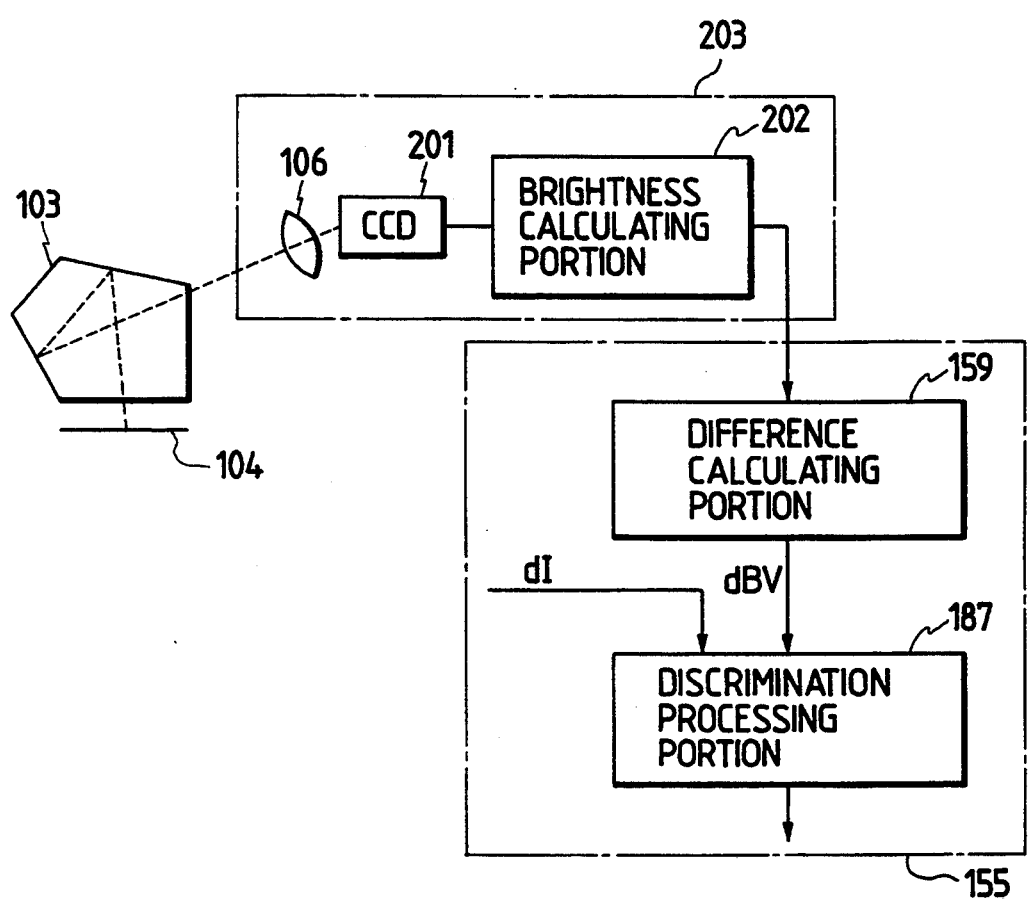
FIG. 48 is a diagram showing an arrangement of a principal part of another embodiment of an object perceiving device of the present invention.

FIG. 48 shows the arrangement of a main part of another embodiment of an object perceiving device according to the present invention.

In FIG. 48, a two-dimensional CCD image sensor (CCD) 201 and a brightness calculating portion 202 correspond to a brightness discriminating device 203, and an image on a focusing screen 104 is formed on the light-receiving surface of the CCD 201 by a lens 106. The CCD 201 has an arrangement obtained by omitting filters for selectively transmitting R, G, and B components from the CCD 107 described above, is constituted by n×m elements, and measures the intensity of light on each elementary area of the field. The brightness calculating portion 202 calculates the brightness value of each elementary area of the field on the basis of the output from the CCD 201. The brightness value BV(X,Y) of each elementary area obtained by the brightness calculating portion 202 is supplied to the tracking device 155.

The tracking device 155 causes the difference calculating portion 159 to calculate a difference dBV between the brightness value of each elementary area of the field and the brightness value of the object, and the discriminating processing portion 187 discriminates an elementary area which has a brightness value approximate to that of the object, and is near the position of object on the basis of the distance dI and the difference dBV.

Therefore, in this case, since the number of parameters used in fuzzy calculating processing in the discriminating processing portion 187 can be decreased, a time required for tracking processing of the object can be shortened. In addition, since the arrangement of the CCD 201 as light-metering elements can be simplified as compared to the color discriminating device 186, the object perceiving device can have a compact, low-cost structure.

The brightness value may be calculated based on spectrum information obtained by the above-mentioned color discriminating device 186, and the tracking device 155 may discriminate a position having colors approximate to those of the object, and an approximate brightness value upon application of the above-mentioned fuzzy rule using a difference in brightness value as a parameter as well as the difference in spectrum information.

Alternatively, the position of object may be discriminated on the basis of the light intensity distribution in the field caught by the two CCDs 172a and 172b provided to the focus discriminating device 168.

Figure 49:
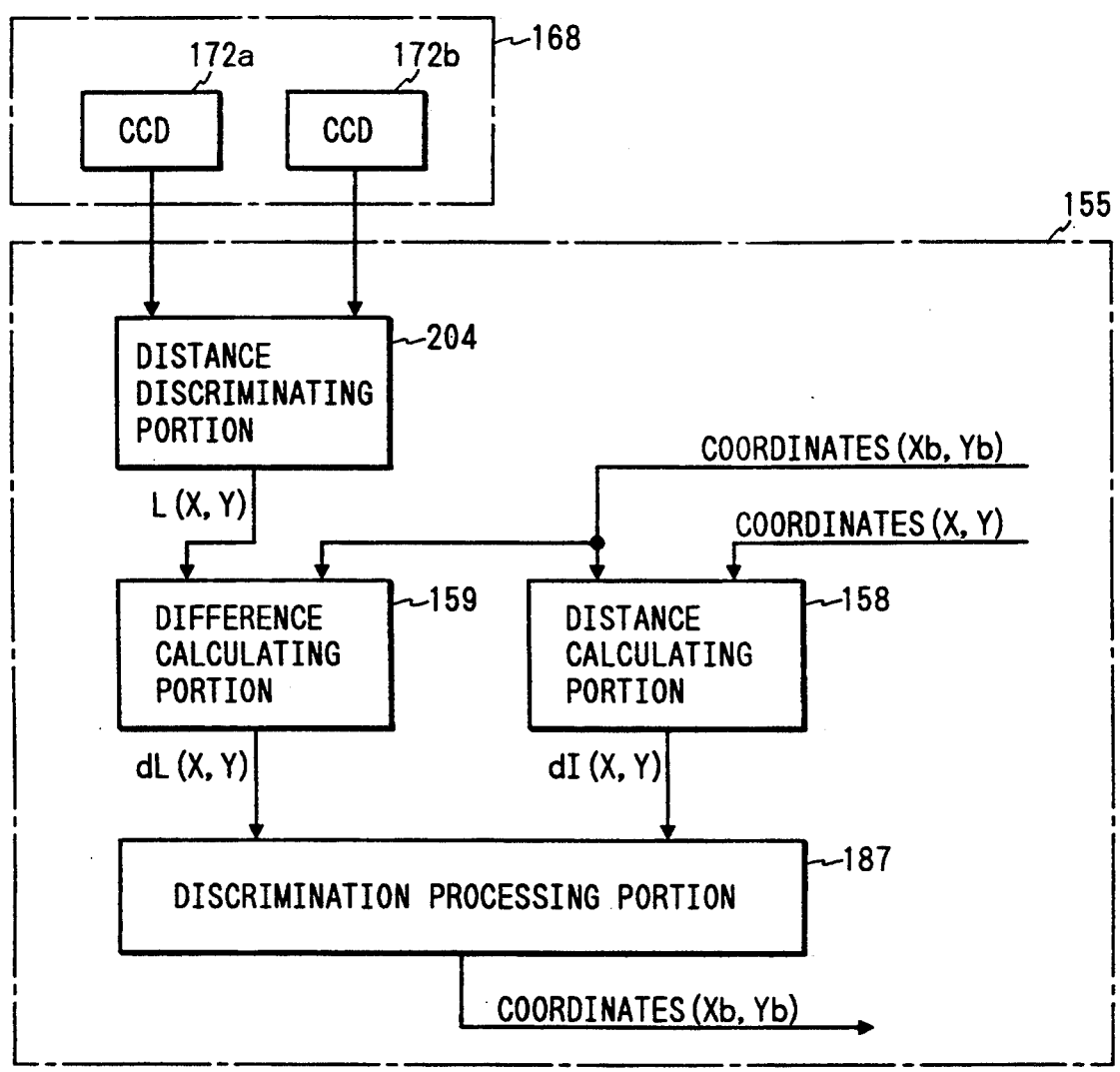
FIG. 49 is a diagram showing an arrangement of a principal part of still another embodiment of an object perceiving device of the present invention.

In this case, as shown in FIG. 49, the tracking device 155 comprises a distance discriminating portion 204 for discriminating a distance L(X,Y) between an object caught by each elementary area of the field and the taking lens 101 on the basis of a correlation between the outputs from the above-mentioned CCDs 172a and 172b in place of the spectrum information holding portion 157. The difference calculating portion 159 can calculate a difference dL(X,Y) between the distance L(Xb,Yb) to the object and the distance L(X,Y) corresponding to each elementary area, and the discriminating processing portion 187 can discriminate a position of an elementary area which catches an object located at a distance approximate to the distance L(Xb,Yb) to the object, and is indicated by coordinates near the position (Xb,Yb) of object on the basis of the distance dI(X,Y) obtained by the distance calculating portion 158 and the difference dL(X,Y).

In the above embodiment, the present invention is applied to the single-lens reflex camera. However, the present invention is not limited to the single-lens reflex camera, but may be applied to a compact camera or a movie camera. That is, the present invention can be applied to any other arrangements as long as the tracking device executes the above-mentioned tracking processing on the basis of information associated with the light intensity distribution in the field so as to obtain the position of object, and tracks the position of object.

The present invention is not limited to the arrangement which obtains information associated with the light intensity distribution in the field from the light-metering device equipped in the finder system. For example, in a movie camera or an electronic still camera, a CCD image sensor as an image pickup medium may be used as a light-metering device.

As described above, in an object perceiving apparatus of the present invention, the object perceiving device discriminates a position gazed by a photographer as a position of object, and the deciding device and the selecting device select one of two positions according to whether or not positions of object obtained by the object perceiving device and the tracking device coincide with each other, thereby correctly perceiving the position of object intended by the photographer, and obtaining the stable position of object. The stable position of object can be used in exposure control processing and focusing control processing.

In particular, since tracking processing is performed using the position obtained by the object perceiving device as an initial position of the object, a correct object can be tracked from the beginning.

When the tracking device discriminates a position having colors approximate to those of the object, the object can be reliably tracked. On the other hand, when the tracking device discriminates a position having a brightness value approximate to that of the object, the tracking processing can be simplified, resulting in a compact, low-cost object perceiving apparatus.

Since the object perceiving apparatus can obtain a position of stable object, when an exposure value is calculated based on brightness information at the position of object, and exposure control is performed based on this exposure value, the exposure value following a change in brightness of the object can be realized, and can be stabilized.

Similarly, when the discrimination result of the focus state of an optical image corresponding to the object indicated by the above-mentioned position of object is used in focusing control, the focusing control following the movement of the object can be realized, and can be stabilized.

What is claimed is:

1. An exposure calculating apparatus comprising:
a light-metering device comprising a first predetermined number of light-metering elements corresponding to elementary areas obtained by dividing a field into said first predetermined number, said light-metering elements measuring a light intensity in said field;
a detecting device for detecting a position of an object in said field based on a direction of an eyeball of a photographer and for outputting the position of the object;
a classification processing circuit, into which said position of the object is input, for classifying said light-metering elements of said light-metering device into groups having predetermined numbers of light-metering elements less than said first predetermined number according to said position of the object; and
a calculating circuit for calculating an exposure value by weighting outputs of said light-metering elements of said groups of light-metering elements according to the group to which the light-metering elements belong.

2. An apparatus according to claim 1, wherein said classification processing circuit classifies said light-metering elements into concentric first and second circles with a center at said position of the object.

3. An apparatus according to claim 1, wherein said classification processing circuit includes:
a storing circuit for storing a boundary line of said field in order to classify said field into said groups of light-metering elements with a predetermined shape;
a displacement calculating circuit for calculating a displacement from a reference position in said field to said position of the object; and
a movement processing circuit for moving the boundary line stored in said storing circuit based on said displacement.

4. An apparatus according to claim 3, wherein said classification processing circuit includes a movement limiting circuit for limiting a movement range within which said boundary line is moved.

5. An exposure calculating apparatus comprising:
a light-metering device having a plurality of light-metering elements which respectively correspond to elementary areas obtained by dividing a field of an imaging optical system into the plurality;
a detecting device for detecting a position of an object in said field;
a first calculating circuit for calculating a first brightness value based on outputs of said light-metering elements within a predetermined range including said position of the object;
a distance detecting device for detecting an amount related to a distance between said imaging optical system and said object;
a changing circuit for changing, in accordance with said amount related to the distance, said predetermined range which is used in said first calculating circuit;
a second calculating circuit for calculating a second brightness value based on outputs of said light-metering elements in the whole of said field; and
an exposure calculating circuit for calculating an exposure value by weighting the second brightness value and the first brightness value based on outputs of the changed predetermined range.

6. An apparatus according to claim 5, wherein said detecting device detects a position of an object in said field on the basis of a direction of an eyeball of a photographer and outputs the position of the object.

7. An exposure calculating apparatus comprising:
a light-metering device having a plurality of light-metering elements which respectively correspond to elementary areas obtained by dividing a field of an imaging optical system into the plurality;
a detecting device for detecting a position of an object in said field;
a first calculating circuit for calculating a first brightness value based on outputs of said light-metering elements within a predetermined range including said position of the object;
a distance detecting device for detecting an amount related to a distance between said imaging optical system and said object;
a focal length detecting device for detecting an amount related to a focal length of said imaging optical system;

a changing circuit for changing, in accordance with said amount related to the distance and said amount related to the focal length, said predetermined range which is used in said first calculating circuit;

a second calculating circuit for calculating a second brightness value based on outputs of said light-metering elements in the whole of said field; and an exposure calculating circuit for calculating an exposure value by weighting the second brightness value and the first brightness value based on outputs of the changed predetermined range.

8. An apparatus according to claim 7, wherein said detecting device detects a position of an object in said field based on a direction of an eyeball of a photographer and outputs the position of the object.

* * * * *